US011031971B2

(12) United States Patent
Niakan et al.

(10) Patent No.: US 11,031,971 B2
(45) Date of Patent: *Jun. 8, 2021

(54) ADAPTIVE ANTENNA AND RADIO

(71) Applicant: Microsoft Technology Licensing, LLC, Redmond, WA (US)

(72) Inventors: Nahal Niakan, Issaquah, WA (US); Sean Russell Mercer, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,151

(22) Filed: May 29, 2020

(65) Prior Publication Data

US 2020/0336167 A1 Oct. 22, 2020

Related U.S. Application Data

(63) Continuation of application No. 16/003,574, filed on Jun. 8, 2018, now Pat. No. 10,707,914.

(51) Int. Cl.
*H04B 1/50* (2006.01)
*H04B 17/318* (2015.01)
(Continued)

(52) U.S. Cl.
CPC .............. *H04B 1/50* (2013.01); *H04B 1/1081* (2013.01); *H04B 17/318* (2015.01); *H04B 17/336* (2015.01); *H04W 72/082* (2013.01)

(58) Field of Classification Search
CPC ...... H04B 1/50; H04B 17/318; H04B 17/336; H04B 1/1081; H04B 17/20; H04W 72/082; H04W 16/14
See application file for complete search history.

(56) References Cited

U.S. PATENT DOCUMENTS 5,534,938 A * 7/1996 Citta ........................ H04N 7/56
348/495
8,437,790 B1 5/2013 Hassan et al.
(Continued)

FOREIGN PATENT DOCUMENTS

WO 2013109195 A1 7/2013

OTHER PUBLICATIONS

Kitsunezuka, et al., "11A 30MHz 2.4GHz CMOS Receiver With Integrated RF Filter and Dynamic-Range-Scalable Energy Detector for Cognitive Radio Systems", In Proceedings of the IEEE Radio Frequency Integrated Circuits Symposium, Jun. 5, 2011, 4 Pages.
(Continued)

*Primary Examiner* — Nizar N Sivji
(74) *Attorney, Agent, or Firm* — Holzer Patel Drennan

(57) ABSTRACT

A method and system for selecting a sub-band in a television white space frequency band may include configuring an antenna matching circuit based on the selected sub-band and configuring a bandpass filter based on the selected sub-band. The method may include receiving a first signal through a radio-frequency path including the antenna matching circuit and not including the bandpass filter, measuring a parameter of received first signal, and determining whether the selected sub-band is usable based on the measured parameter of the received first signal. The method may include receiving a second signal through radio-frequency path including the antenna matching circuit and the bandpass filter, measuring a parameter of the received second signal, and determining whether the selected sub-band is usable based on the measured parameter of the received second signal.

20 Claims, 64 Drawing Sheets

(51) Int. Cl.
 *H04B 17/336* (2015.01)
 *H04B 1/10* (2006.01)
 *H04W 72/08* (2009.01)

(56) References Cited

U.S. PATENT DOCUMENTS

| | | | |
|---|---|---|---|
| 8,861,452 B2 | 10/2014 | Barbieri et al. |
| 9,204,459 B2 | 12/2015 | Mueck |
| 9,386,558 B2 | 7/2016 | Hassan et al. |
| 9,516,603 B2 | 12/2016 | Kim |
| 9,722,660 B1 | 8/2017 | McCloskey et al. |
| 2003/0081694 A1 | 5/2003 | Wieck |
| 2004/0005871 A1 | 1/2004 | Saito et al. |
| 2004/0018824 A1 | 1/2004 | Fang et al. |
| 2006/0035620 A1 | 2/2006 | Millard et al. |
| 2010/0069013 A1 | 3/2010 | Chaudrhi et al. |
| 2010/0302459 A1 | 12/2010 | Zhang et al. |
| 2010/0309317 A1 | 12/2010 | Wu et al. |
| 2011/0043710 A1 | 2/2011 | Samarasooriya et al. |
| 2011/0159828 A1 | 6/2011 | Kasha et al. |
| 2011/0189959 A1* | 8/2011 | Rambeau ................ H04B 1/18 455/63.1 |
| 2011/0250858 A1 | 10/2011 | Jain et al. |
| 2011/0299433 A1 | 12/2011 | Darabi et al. |
| 2011/0312330 A1 | 12/2011 | Sadek et al. |
| 2012/0039284 A1 | 2/2012 | Barbieri et al. |
| 2012/0288043 A1 | 11/2012 | Chen et al. |
| 2013/0121257 A1 | 5/2013 | Tan et al. |
| 2013/0122949 A1 | 5/2013 | Tan et al. |
| 2013/0142129 A1 | 6/2013 | Rinne et al. |
| 2013/0156074 A1 | 6/2013 | Wang et al. |
| 2013/0188529 A1 | 7/2013 | Poulin et al. |
| 2013/0222075 A1 | 8/2013 | Reedy et al. |
| 2013/0315116 A1 | 11/2013 | Chen |
| 2013/0337741 A1 | 12/2013 | Hassan et al. |
| 2013/0337857 A1 | 12/2013 | Hassan et al. |
| 2014/0051467 A1 | 2/2014 | Tan et al. |
| 2014/0307565 A1 | 10/2014 | Samarasooriya et al. |
| 2015/0038097 A1 | 2/2015 | Lindoff et al. |
| 2015/0163080 A1 | 6/2015 | Li et al. |
| 2015/0282181 A1 | 10/2015 | Hassan et al. |
| 2016/0088486 A1 | 3/2016 | Taher et al. |
| 2016/0119019 A1 | 4/2016 | Pratt |
| 2016/0126618 A1 | 5/2016 | Strange |
| 2016/0302159 A1 | 10/2016 | Wong et al. |
| 2016/0353286 A1 | 12/2016 | Tajima et al. |
| 2018/0048345 A1 | 2/2018 | Pehlke et al. |
| 2018/0175805 A1 | 6/2018 | Sayilir et al. |
| 2018/0331703 A1 | 11/2018 | Horita et al. |
| 2019/0013789 A1 | 1/2019 | Mori |
| 2019/0146751 A1 | 5/2019 | Ballany |
| 2019/0181907 A1 | 6/2019 | Pfann et al. |
| 2019/0190481 A1 | 6/2019 | Mori |
| 2020/0107203 A1* | 4/2020 | Wu ....................... H04W 24/02 |

OTHER PUBLICATIONS

"International Search Report and Written Opinion Issued in PCT Application No. PCT/US2019/033640", dated Sep. 20, 2019, 12 Pages.

Antonoff, Michael, "How to Watch Free Tv on Your Computer without Wireless Broadband Even While Moving", Retrieved From: https://www.bhphotovideo.com/explora/portable-entertainment/tips-and-solutions/how-watch-free-tv-your-computer-without-wireless-broadband, Nov. 16, 2017, 2 Pages.

Bianchi, et al., "Electronically Tunable Bandpass Filter", Retrieved From: http://amsacta.unibo.it/2030/1/GAAS_90_042.pdf, 1990, pp. 251-256.

Park, et al., "Dual-Band Band-Pass Filter with Fixed Low Band and Fluidically-Tunable High Band", In Journal of Sensors, vol. 17, Aug. 16, 2017, pp. 1-10.

\* cited by examiner

ADAPTIVE ANTENNA AND RADIO

CROSS-REFERENCE TO RELATED APPLICATIONS

The present application is a Continuation of and claims benefit from or priority of U.S. patent application Ser. No. 16/003,574, filed Jun. 8, 2018, entitled "ADAPTIVE ANTENNA AND RADIO" which is specifically incorporated by reference for all that it discloses and teaches.

BACKGROUND

National governments assign (or license) frequency bands to users for particular purposes, such as television broadcasting. In some instances, the frequency bands have "white space" between the bands to prevent interference. In other instances, some of the frequency bands may be unoccupied in a given geographic region. For example, a frequency band may be licensed for use in Philadelphia for broadcasting television, while the same frequency band is not used in New York City.

In general, "white space" refers to frequencies, usually allocated to a broadcasting service, that are not being used in a given location. Various proposals, including IEEE 802.11af, IEEE 802.22, and those from the White Spaces Coalition, advocate using white space to provide wireless data services. Such "white-space devices" are designed to detect the presence of unused bands and use these otherwise unused bands for data connectivity.

DETAILED DESCRIPTION

Figure 1:
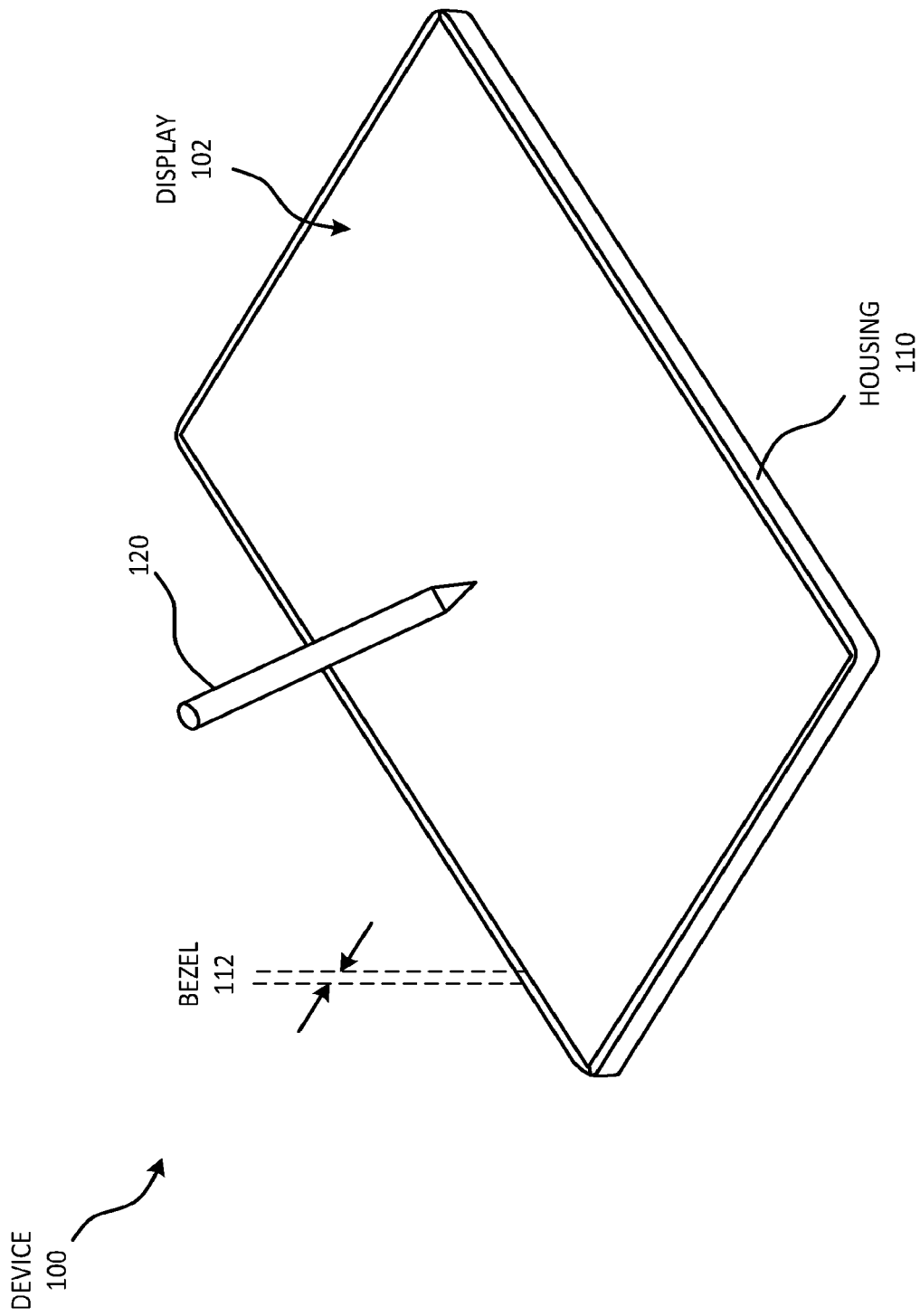
FIG. 1 is a perspective view of a tablet computer having an antenna and a radio front-end described herein.

Implementations disclosed herein relate to determining whether a frequency band (sometimes referred to as a sub-band) is occupied (or being used) by another user (such as a licensed user). As noted above, a radio that uses white space (a "white-space device") should avoid interfering with a licensed user.

In one implementation described below, a white-space device listens to the 'target' sub-band and avoids using it if the sub-band is already being used by a licensed user (also known as an "incumbent user"). After listening, if no licensed user is observed, the device may use the sub-band, while repeatedly checking for a licensed user. If another user is identified when checking, the device avoids (or desists from) using the sub-band and moves to another available sub-band, repeating this process. An alternative approach is for the device to select candidate channels or sub-bands from a list of known "white" or unused channels or sub-bands.

Examples below relate to television white spaces (TVWS) in the ultra-high frequency range of 470-790 MHz. Implementations may also use other frequency ranges, such as between 54 MHz and 470 MHz. Broadband antennas in this frequency range are usually physically large and not cosmetically pleasing in compact, mobile form factors (such as mobile phones, dongles, or tablets). Further, licensed users in this frequency range typically broadcast strong (large amplitude) signals. These strong licensed signals (in an adjacent sub-band) may overwhelm or desensitize (or saturate) a white-space device radio receiver attempting to determine whether a sub-band is occupied by a licensed user or not.

To reject the strong signals in an adjacent sub-band, a white-space device may employ a filter in one implementation. Unlike front-end filters in other devices (such as narrowband WiFi, GPS, or LTE receivers), however, a white-space device radio may cover a relatively wide bandwidth such as, for example, an octave of bandwidth. The low frequency range and wide bandwidth in the TVWS context usually translates into a physically large filter (to achieve manageable insertion loss and with useful stopband rejection). Such a physically large filter (like a physically large antenna) is not cosmetically pleasing and consumes valuable real estate in a device. Further, adding the ability to tune the filter only increase the size and cost of the filter.

Thus, it is a challenge is to design a physically small filter for a white-space device in the TVWS spectrum with a sufficiently low insertion loss (in the desired sub-band) and a sufficiently high rejection (in adjacent frequencies, i.e., the stopband). Implementations disclosed herein enable a white-space device with a footprint optimized (in one implementation) to address the TVWS spectrum in single chip (or multiple chip) solution. Implementations described herein also provide a bandpass filter that is electronically tunable to enable deployment in conjunction with the dynamic frequency allocation requirements of TVWS radios.

Implementations disclosed herein also enable a compact antenna for smaller modern devices (such as an antenna paired with a matching circuit). Implementations descried below also provide for adaptable and/or reconfigurable matching circuits for physically small, bandwidth-constrained antennas to enable their use in the TVWS frequency range. Implementations described below enable the rejection/attenuation of signals (such as interference signals) of these antenna matching solutions to reduce bandpass filter constraints (stopband rejection requirements) for strong interferers affecting TVWS radios.

Implementations described below also enable deployment of an adaptive/reconfigurable antenna matching circuit with an electronically tunable bandpass filter to deliver improved signal reception (in the desired sub-band) in the presence of strong out-of-band interference signals (i.e., the rejection/attenuation of signals in the stopband).

Other implementations described below enable a multiple chip solution for TVWS; a single-chip solution; a single-chip solution with external components (such as an inductor); and/or a multiple chip solution with external components (such as an inductor). One implementation shows possible chip pinout for TVWS chips for filtering and antenna matching circuits. One implementation described herein includes a tunable TVWS antennas in compact form factors. Implementations described below enable matching circuits and bandpass filters with analog components, such as capacitors and inductors. In other words, implementations described below enable matching circuits and bandpass filters for tuning and rejection while potentially eliminating, reducing the cost, and/or reducing the complexity of circuit components such as frequency converters, low-noise amplifiers, analog-to-digital converters, digital signal processors, and/or detection algorithms.

FIG. 1 is a block diagram of an example display device 100 that may include a radio and antenna (not shown) as described herein. Display device 100 includes a display 102, a housing 110, and a stylus 120. Display device 100 has the form factor of tablet computer and, as such, may communicate with other devices (not shown) using the radio and antenna. Display device 100 may take different forms, such as that of a mobile phone, a laptop, or a desktop device. Methods and systems described herein may also be incorporated into devices without a display 102, for example, such as in an "Internet of Things" device. Display device 100 may include the antenna in a bezel 112, which is the space between the edge of display 102 and housing 110. Bezel 112, however, may not allow for the ideal dimensions for an antenna for TVWS, particularly when display device 100 is small (such as in the form factor of a mobile phone).

Figure 2A:
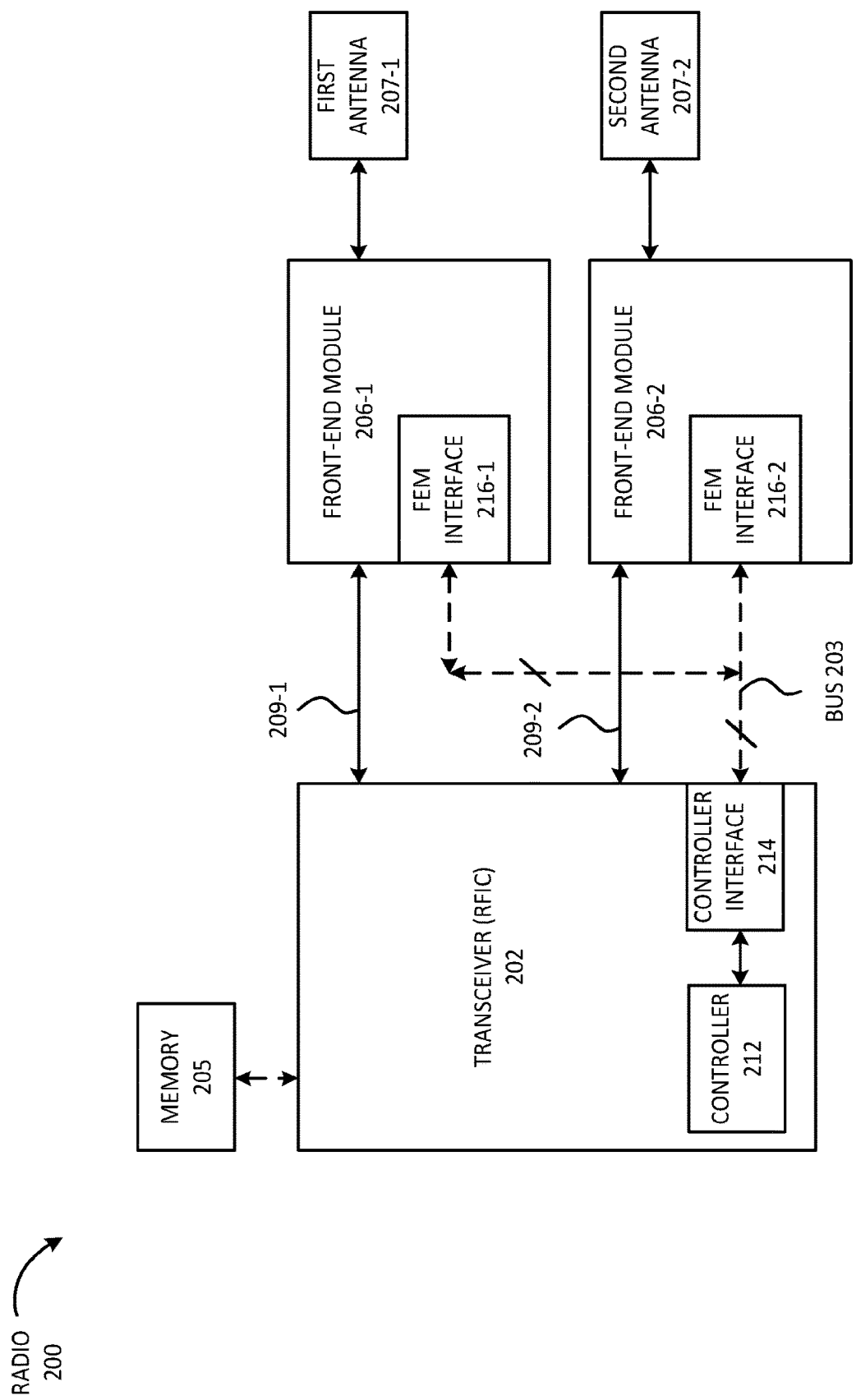
FIG. 2A is a block diagram of example components of the radio of the tablet computer of FIG. 1.

FIG. 2A is a block diagram of an example radio 200 in one implementation. Radio 200 in this implementation may be used for TVWS band and/or other frequencies. Radio 200 may also be considered more generally a "radio-frequency (RF) system 200." In this implementation, radio 200 includes a transceiver 202, a bus 203, front-end modules (FEMs) 206-1 and 206-2 (individually "FEM 206-$x$," collectively "FEMs 206"), antennas 207-1 and 207-2 (individually "antenna 207-$x$," collectively "antennas 207"), RF signal paths 209-1 and 209-2 (individually "RF signal path 209-$x$", collectively "RF signal paths 209"), and a memory 205.

Antennas 207 send and/or receive RF energy. Although two antennas 207 are shown in FIG. 2A, other implementations may include one antenna 207-$x$ or more than two antennas 207. Antennas 207 may be used, for example, in a full duplex radio, a multiple input multiple output (MIMO) radio, and/or a multiple-protocol radio. Antennas 207 may be used for diversity or to form part of a phased-array antenna with an aperture. If the size of antennas 207 were not constrained, then antennas 207 could range from 159 mm (quarter wavelength corresponding to 470 MHz) to 94 mm (quarter wavelength corresponding to 790 MHz).

In this implementation, transceiver 202 includes RF transceiver circuitry and may be implemented (and referred to) as an RF integrated circuit (RFIC) 202. Transceiver 202 may include a receiver and/or a transmitter for receiving and/or transmitting signals. Transceiver 202 may include a controller 212 for controlling FEMs 206 through a controller interface 214 over bus 203. In one implementation, controller 212 may control FEMs 206 through controller interface 214 using a standardized protocol, such as the radio front-end (RFFE) interface protocol developed by the Mobile Industry Processor Interface (MIPI) Alliance. This and other protocols are discussed in more detail below.

Bus 203 allows components of radio 200 to communicate with each other. In one implementation, bus 203 may carry its own power supply voltage as well as control signals. RF signal paths 209 carry RF signals to and/or from transceiver 202 to respective FEMs 206.

FEMs 206 may include amplifiers (such as low-noise amplifiers and/or power amplifiers), active antenna tuners, low noise amplifiers, lowpass filters, bandpass filters, highpass filters, stopgap filters, and RF switches, for example. FEMs 206 may include integrated circuits (ICs). FEMs may also include individual or lumped components, such as capacitors, inductors, resistors, and/or diodes. A FEM 206-$x$ may include a combination of one or more ICs and one or more lumped components. For example, FEM 206-$x$ may include capacitors internal to an IC and inductors external to an IC. In one implementation, inductors may be external to an IC to achieve a higher Q filter at a lower cost and size. In another implementation, inductors may be internal to the IC when design constraints allow. In yet another implementation, FEM 206-$x$ may include switches that may be internal to the IC and/or external to the IC.

Each FEM 206-$x$ may include a FEM interface 216-$x$ for receiving control signals from controller 212 through controller interface 214 over bus 203. In one implementation, FEMs 206 may receive power, for example, over bus 203. In one implementation, FEM 206-$x$ and FEM interface 216-$x$ may implement a different protocol, such as a general-purpose input/output (GPIO) protocol.

Radio 200 may have many selectable and configurable components (such as in FEMs 206) for different frequencies, signal paths, and/or protocols. Radio 200 may control these components by controller 212 issuing commands through controller interface 214 over bus 203 to FEM interface 216-$x$ of FEM 206-$x$. For example, switching logic in FEM 206-$x$ may control the state of RF switches to switch components into and out of different circuits. In one implementation, radio 200 includes logic tables to influence the settings of FEMs 206. The logic table can influence the state of RF switches in FEMs 206 to adjust filter component values, for example. These logic tables may be stored by memory 205. Memory 205 may include a non-volatile memory, a volatile memory, a read-only memory (ROM), and/or a random-access memory (RAM).

In one implementation, radio 200 determines which TVWS channel and/or sub-band to use. When that channel or sub-band is no longer acceptable, transceiver 202 (using an intelligent channel scanning algorithm, or predetermined allowed channel list) may scan other allowable channels and/or sub-bands to determine a suitable channel. FEM 206-$x$ (implementing a band-pass filter) may adapt a passband in lockstep with the channel assignment algorithm. Transceiver 202 may use logic tables stored in memory 205 to influence the settings of filter component values that may be internal or external to an IC that forms FEM 206-$x$.

As noted above, controller 212 may control FEMs 206 through controller interface 214 using a standardized protocol, such as the RFFE protocol developed by the MIPI Alliance. Controller interface 214, bus 203, and FEM interface 216-$x$ may also implement the RFFE protocol. This RFFE protocol may provide a low-complexity interface for controlling FEMs 206. Radio 200 may employ additional or different protocols other than the RFFE protocol, such as one that employs a GPIO protocol.

Figure 2B:
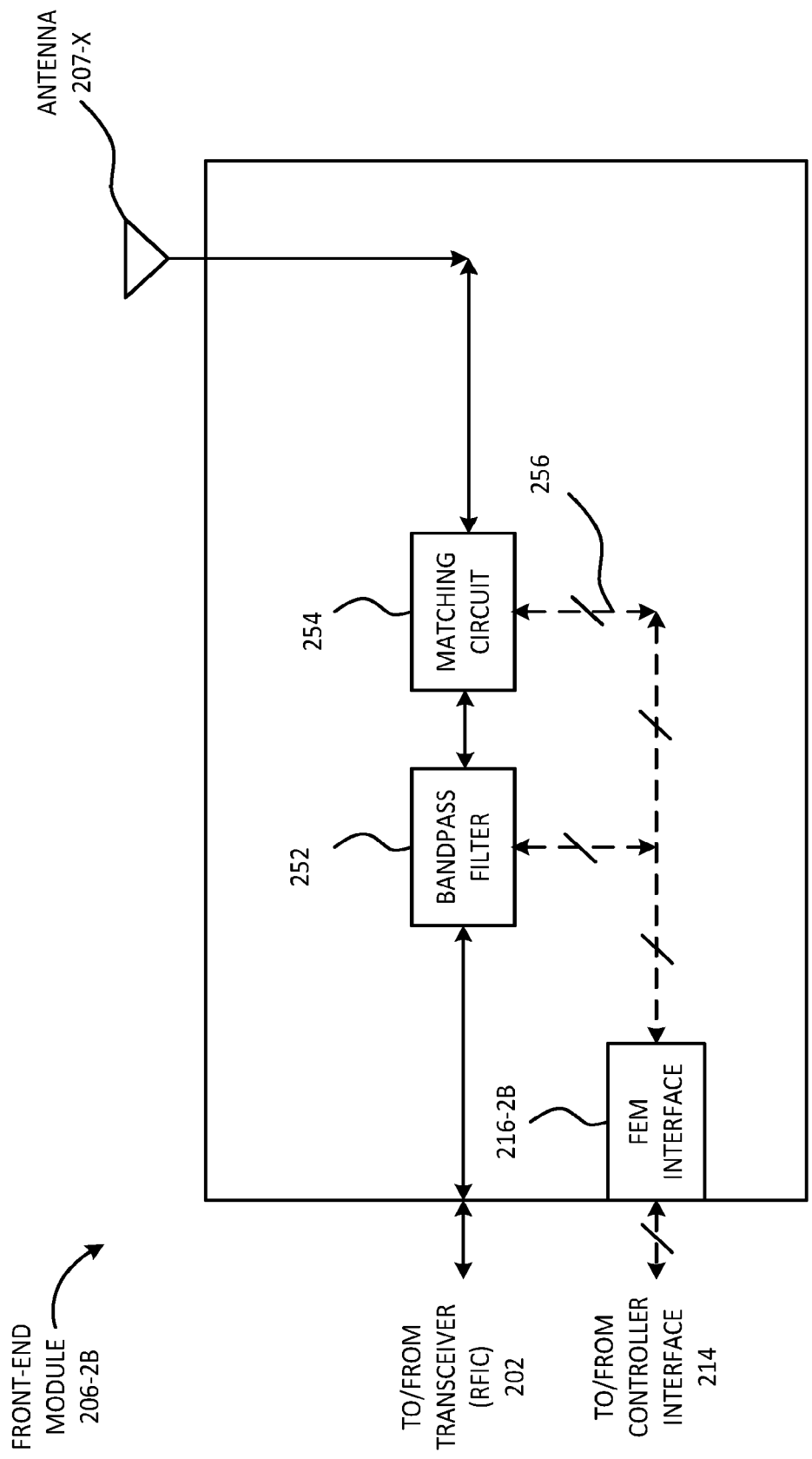
FIG. 2B is a block diagram of example components of a front-end module of the radio of FIG. 2A.

FIG. 2B is a block diagram of an example FEM 206-$x$ in one implementation. FEM 206-2B may include a bandpass filter 252, a matching circuit 254, and FEM interface 216-$x$. FEM 206-2B may include additional, fewer, or a different arrangement of components than shown in FIG. 2B. For example, FEM 206-2B may omit bandpass filter 252 or matching circuit 254. In another implementation, bandpass filter 252 and/or matching filter may be fixed, meaning that they are not controllable by controller 212 through FEM interface 216-$x$.

As discussed above, antenna 207-$x$ may not be the ideal length for receiving signals of interest (such as TVWS signals). As a result, matching circuit 254 may tune antenna 207-$x$ so that it receives signals in the TVWS frequencies (such as 470 MHz to 790 MHz) while attenuating (that is rejecting to a degree) frequencies outside that range. Antenna matching circuit 254 may also be tunable so that antenna 207-$x$ (in combination with matching circuit 254) receives signals on specific channels (or sub-bands) within the TVWS frequencies while attenuating/rejecting frequencies (to a degree) outside the channel (or sub-band). To tune matching circuit 254, controller 212 may switch in and out components as commanded from controller 212. The frequency response of different antenna matching circuits 254 paired with different antennas 207 is discussed more below.

Bandpass filter 252 may provide additional attenuation/rejection of some frequencies. In one implementation, bandpass filter 252 may attenuate/reject frequencies from adjacent channels when matching circuit 254, paired with antenna 207-*x*, is tuned to a particular channel. In one implementation, bandpass filter 252 may be bypassed entirely and removed from the RF path between antenna 207-*x* and transceiver 202. In this implementation, for example, bandpass filter 252 may be switched out of the RF path during transmission and switched into the RF path during receiving. In another implementation, bandpass filter 252 may be switched into the RF path when radio 200 is detecting the presence of RF energy (from a licensed user) on a particular channel.

Like matching circuit 254, bandpass filter 252 may be adjustable by switching in and out components as commanded from controller 212. In one implementation, bandpass filter 252 can be switched into the circuit when receiving signals and/or when determining if a signal is present on a particular channel while rejecting signal (noise) on an adjacent channel.

As described above, FEM interface 216-2B may receive commands over bus 203 from transceiver 202 (such as for configuring bandpass filter 252 and/or matching circuit 254). Control signals pass through FEM interface 216-2B to bandpass filter 252 and/or matching circuit 254 for configuring bandpass filter 252 and/or matching circuit 254.

Figure 2C:
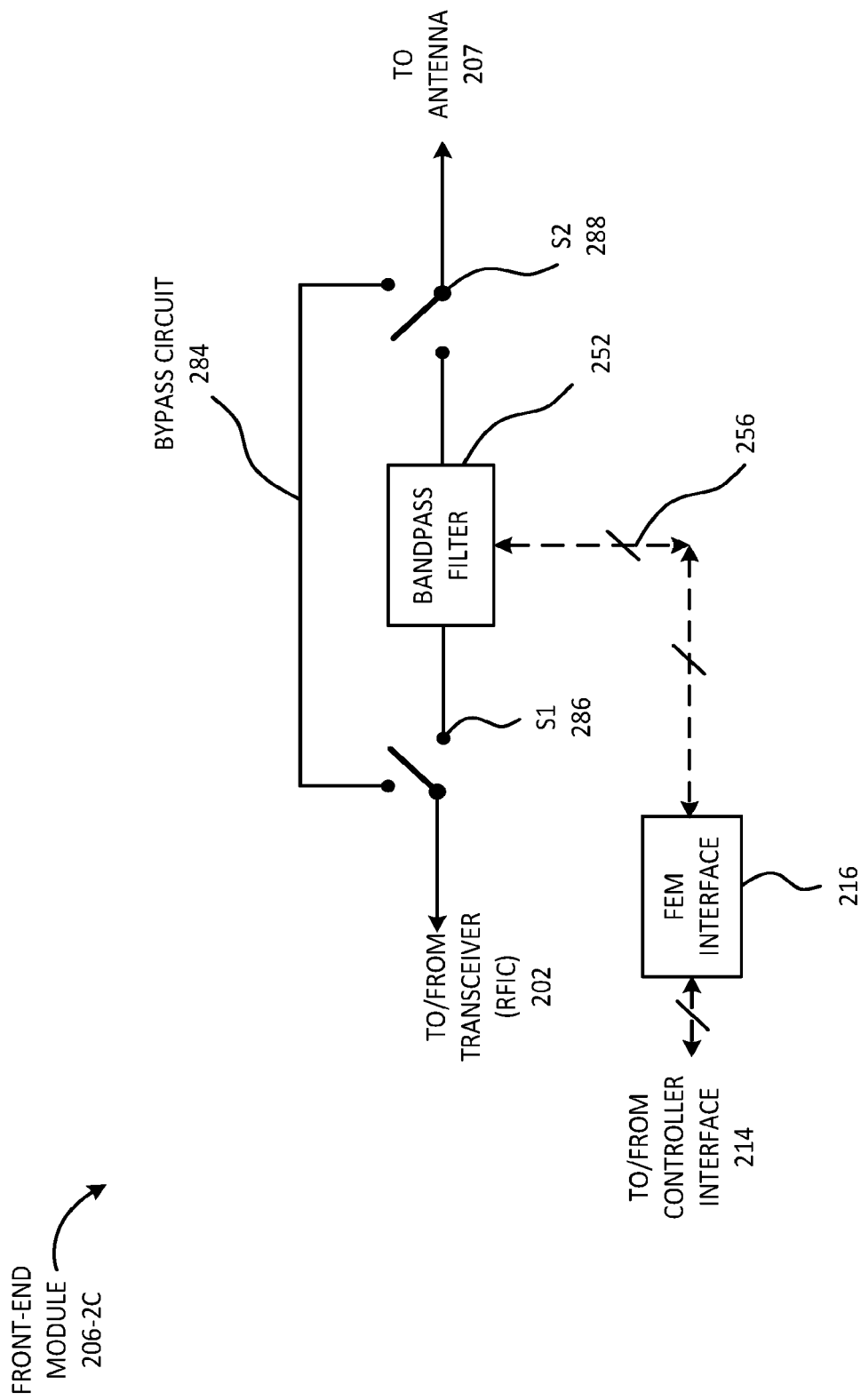
FIG. 2C is a circuit diagram of an example front-end module.

FIG. 2C is a circuit diagram of an example FEM 206-2E including bandpass filter 252 and a bypass circuit 284 in one implementation. In this implementation, bypass circuit 284 may be used to bypass bandpass filter 252. Bypass circuit 284 includes two switches S1 286 and S2 288 to remove bandpass filter 252 from the RF path or to include bandpass filter 252 into the RF path. In one implementation, bandpass filter 252 is included in the RF path when receiving signals (and not included in the RF path when transmitting signals) to provide additional signal rejection of signals in adjacent channels.

Figure 2D:
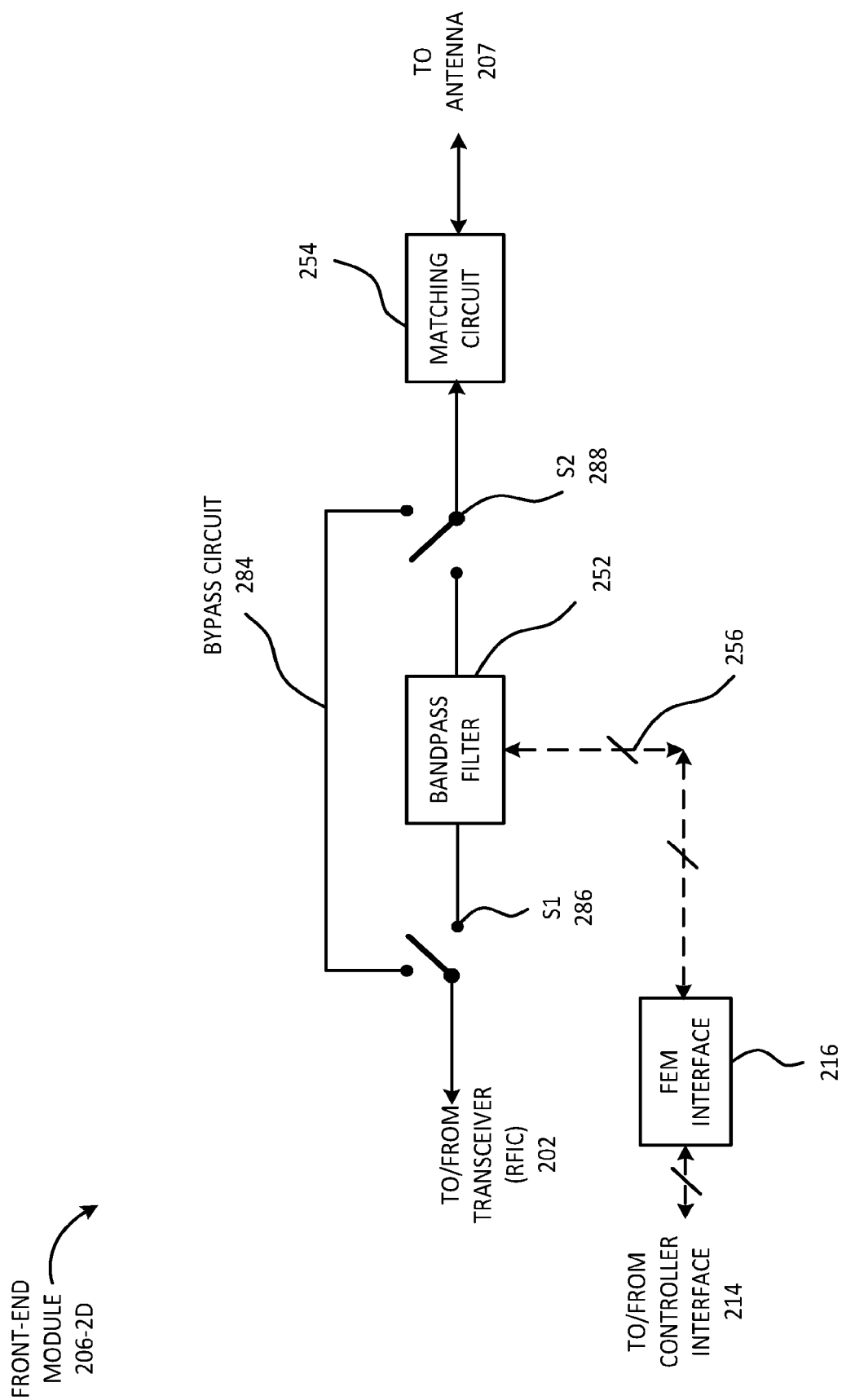
FIG. 2D is a circuit diagram of an example front-end module.
Figure 2E:
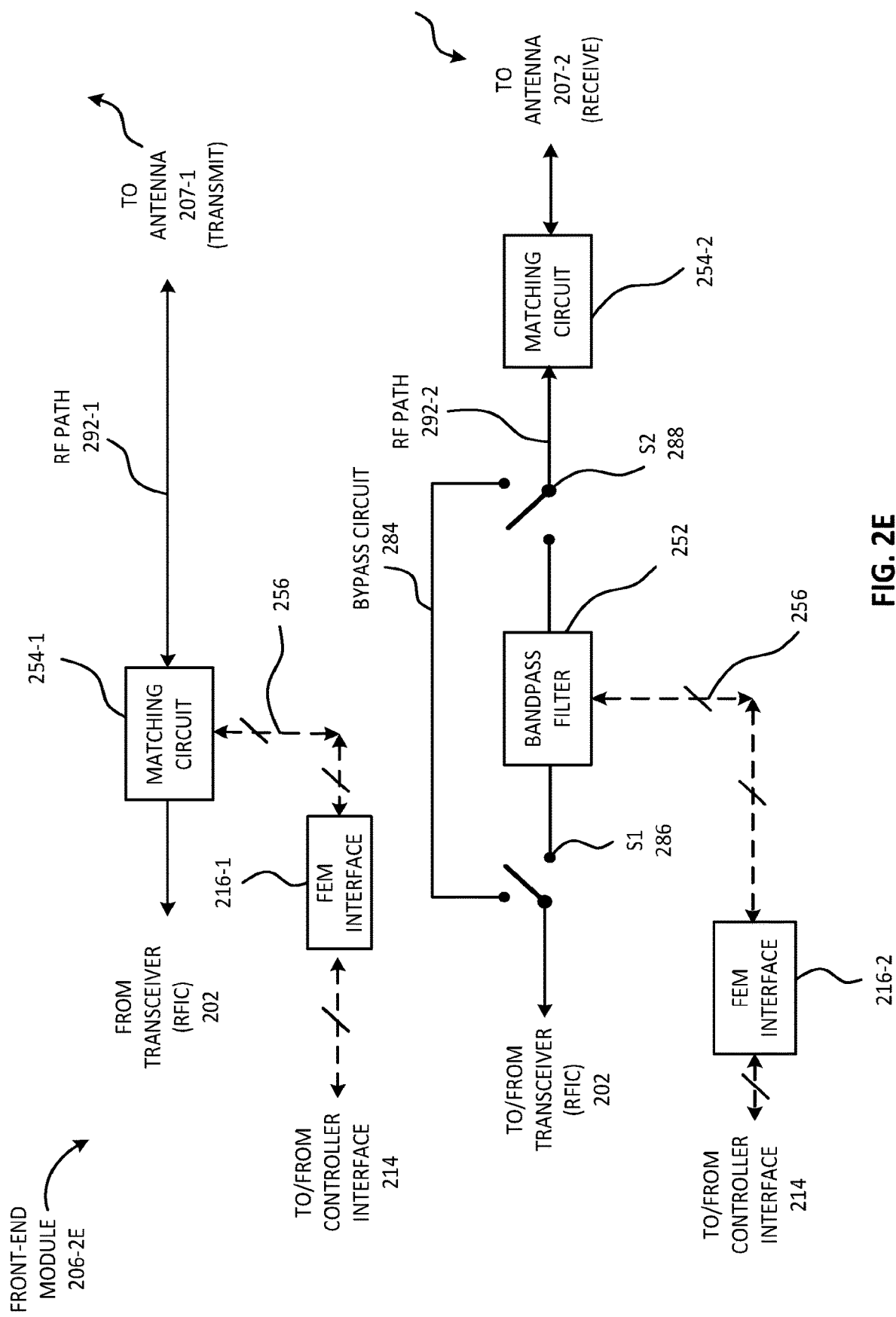
FIG. 2E is a circuit diagram of a front-end module.

FIG. 2D is a circuit diagram of an example FEM 206-2D in another implementation. FEM 206-2D includes a single transmit and receive path with a tunable match filter 254 and a tunable bandpass filter 252, which may be used for noise rejection. In this example, FEM 206-2D (like FEM-2C) includes a bypass circuit 284 that can switch bandpass filter 252 into the RF path or out of the RF path. In one implementation, bandpass filter 252 is included in the RF path when receiving signals (and not included in the RF path when transmitting signals) to provide additional signal rejection of signals in adjacent channels in some instances FIG. 2E is a circuit diagram of an example FEM 206-*x* in another implementation. FEM 206-2E includes two RF paths: one that may be used as a transmit path 292-1, and a second that may be used as a receive path 292-2. FEM 206-2E includes a first matching circuit 254-1 paired with a transmit antenna 207-1 for the transmit RF path 292-1 and a second matching circuit 254-2 paired with a receive antenna 207-2 for the receive RF path 292-2. First matching circuit 254-1 and/or second matching circuit 254-2 may be tunable in this implementation. The receive RF path 292-2 also includes a bandpass filter 252. Bandpass filter 252 may also be tunable in this implementation. FEM 206-2E (like FEM-2C and FEM-2B) includes a bypass circuit 284 that can switch bandpass filter 252 into the receive RF path 292-2 or out of the receive RF path 292-2. In one implementation, bandpass filter 252 is selectively included in the receive RF path 292-2 to provide additional signal rejection of signals in adjacent channels.

In the example of FEM 206-2E, transmit path 292-1 includes dynamic antenna matching (via matching circuit 254-1 paired with transmit antenna 207-1) under logic control (from controller 212). The receive antenna 207-2 also features dynamic matching (via matching circuit 254-2 paired with transmit antenna 207-2) in addition to a tunable and bypassable bandpass filter 252. Antenna matching circuits 254-1 and 254-2 can be dynamically adjusted as controlled by the channel selection criteria (via controller 212) in radio 200. In one implementation, the list of allowed channels (as assessed by TVWS standard IEEE 802.11af) can then be further assessed for an optimum signal to noise ratio (SNR) by switching the appropriately tuned bandpass filter 252 in and out of circuit. In the presence of strong out-of-band signals (such as other legitimate broadcast signal at different channels or other noise sources), the inclusion of bandpass filter 252 may ameliorate radio receiver compression and diction effects and deliver improved SNR. An algorithm may check SNR with and without bandpass filter 252 to deliver the best SNR for a particular channel. In one implementation, for radio channels and/or locations where strong interference signals do not exist, the insertion loss of bandpass filter 252 can be avoided by bypassing it.

To enable (adaptable) bandpass filter 252 on the receive path 292-2 (such as to mitigate noise and interference), FEM 206-2E employs bypass circuit 284 that can bypass the bandpass filter 252 (when switched appropriately) or can include the bandpass filter 252 (when switched appropriately). In this implementation, bandpass filter 252 can be switched into receive path 292-2. In another implementation, radio 200 employs two antennas 207 (one for transmitting and one for receiving) and two FEMs 206: one FEM 206-*x* employs an antenna matching circuit 254 and a second FEM 206-*x* employs an antenna matching circuit 254 and a bandpass filter 252. In yet another implementation, radio 200 employs two antennas 207 (one for transmitting and one for receiving) and two FEMs 206: one FEM 206-*x* employs an antenna matching circuit 254, and a second FEM 206-*x* employs an antenna matching circuit 254 and a bandpass filter 252 with a bypass circuit.

Figure 3A:
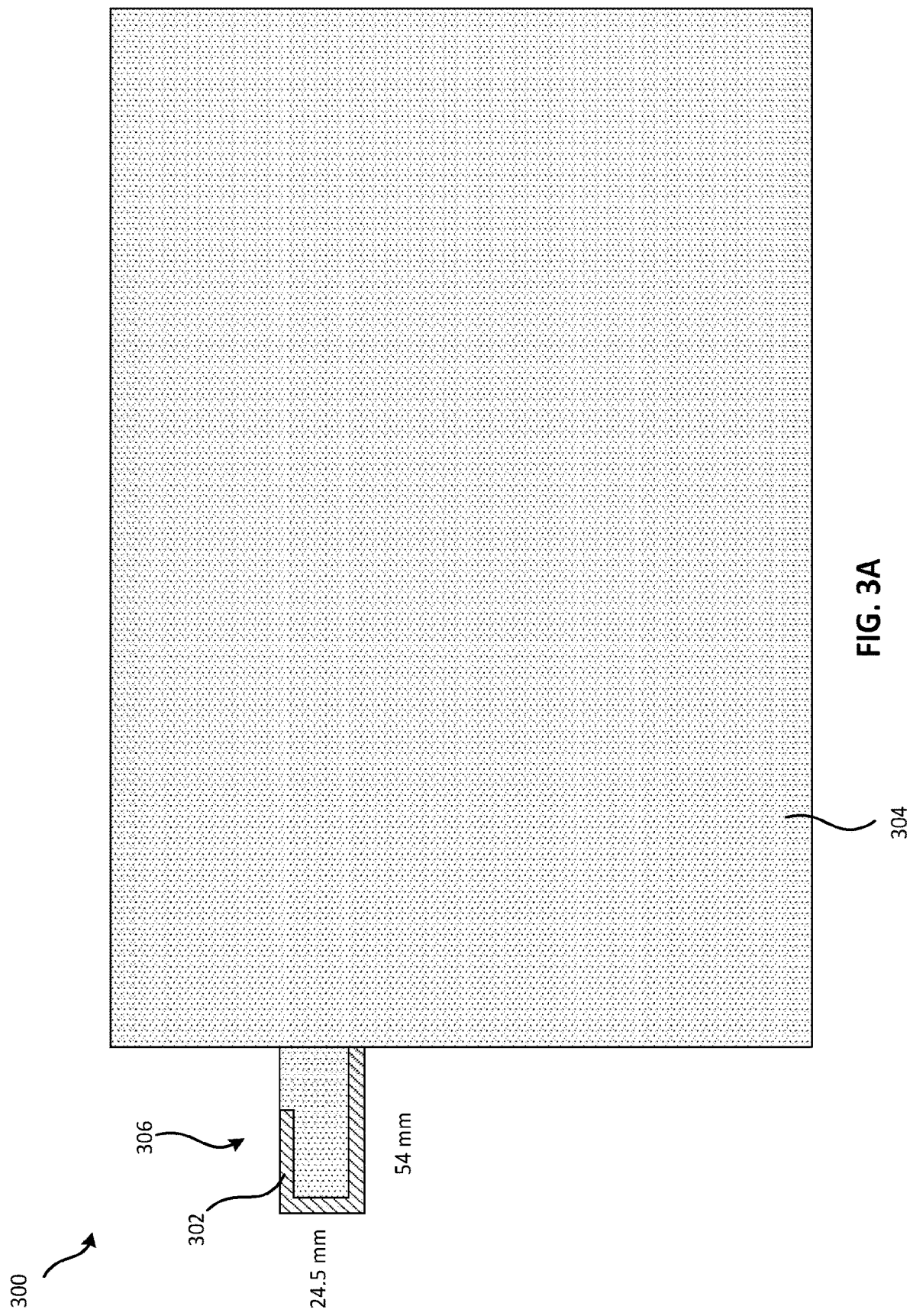
FIG. 3A is a block diagram of an example antenna connected to a laptop ground plane.

FIG. 3A is a block diagram of an example system 300 having an antenna 302 with the form factor of a USB dongle 306, which may be coupled to device 100 using a USB interface. Antenna 302 may correspond to antenna 207-*x* in radio 200, for example. USB dongle 306 may have an area of approximately 24.5 mm by 54 mm. If the size of antenna 302 were not constrained, then antenna 302 could range from 159 mm (quarter wavelength corresponding to 470 MHz) to 94 mm (quarter wavelength corresponding to 790 MHz). The size of antenna 302 in this implementation, however, is constrained to the size of USB dongle 306. In this case, antenna 302 may travel the periphery of dongle 306 and be approximately 74 mm in length. In the case of the lower TVWS frequency of 470 MHz (quarter wavelength of 159 mm), antenna 302 is 46% of its ideal length. In the case of the higher TVWS frequency of 790 MHz (quarter wavelength of 94 mm), antenna 302 is 78% of its ideal length. In one implementation, antenna 302 may be associated with its own ground plane approximately the size of dongle 306, such as 24.5 mm by 54 mm.

Antenna 302 may be tuned to TVWS frequencies (i.e., 470-790 MHz when paired with other components, such as bandpass filter 252 and/or matching circuit 254). Antenna 302 may connect to a ground plane 304 of a larger device, such as a laptop or tablet computer (see FIG. 1), when dongle 306 is plugged into device 100. Ground plane 304 may have the dimensions of 350 mm by 220 mm, but other dimensions are possible in other implementations.

System 300 is an example implementation and may include additional, fewer, or a different arrangement of components. The dimensions of antenna 302, dongle 306, and ground plane 304 are examples and other dimensions are possible.

Figure 3B:
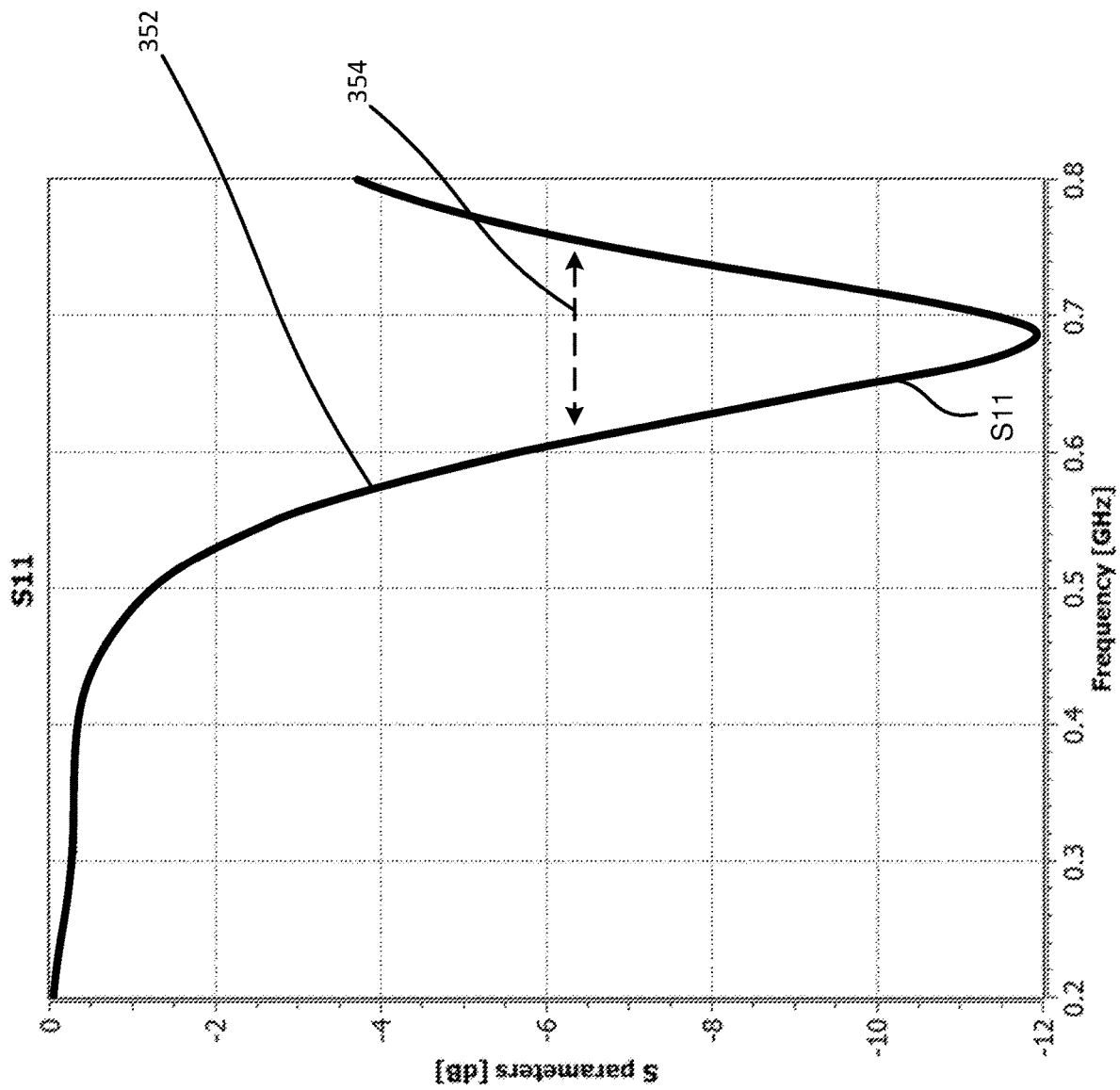
FIG. 3B is a plot of the return loss of the antenna of FIG. 3A.
Figure 3C:
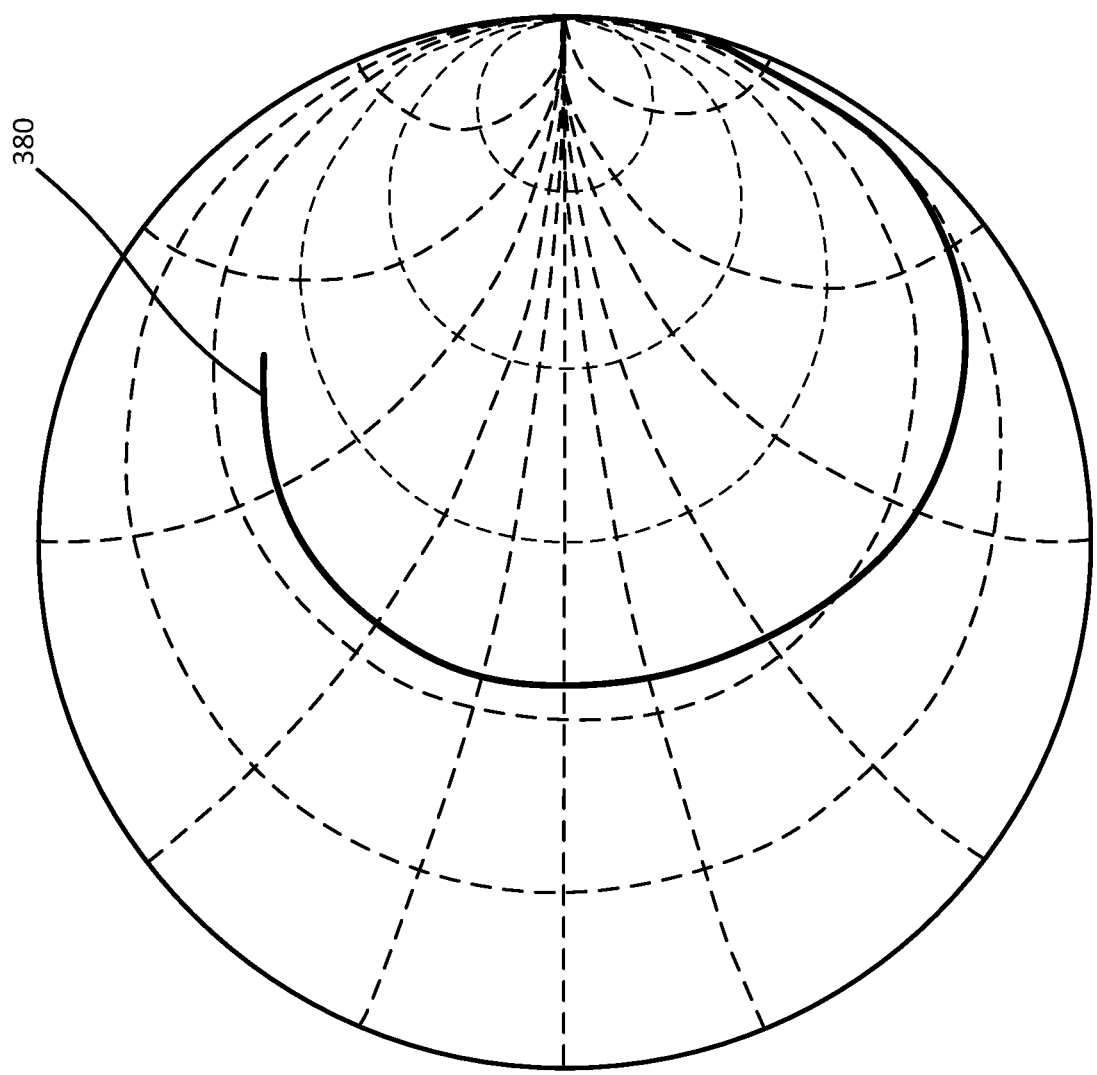
FIG. 3C is a Smith-chart plot of the reflection coefficient of the antenna of FIG. 3A.

Because antenna 302 is relatively small (it can fit on a USB dongle 306), its size may make it less than ideal to operate over the TVWS frequency range (470-790 MHz). The less-than-ideal characteristics are illustrated in FIGS. 3B and 3C. FIG. 3B is a plot of return loss (S11) 352 of antenna 302. FIG. 3C is a Smith-chart plot of the reflection coefficient 380 of antenna 302 over the same frequency range shown in FIG. 3B with a reference impedance of 50Ω (i.e., the characteristic impedance of a transmission line feeding antenna 302 is 50Ω). The inherent characteristics of antenna 302 result in a relatively narrow band 354 (compared to the 470-790 MHz TVWS frequency range) that may not sufficiently cover the desired 470-790 MHz TVWS frequency range.

FIGS. 4A, 5A, 6A, 7A, 8A, and 9A show antenna 302 paired with different matching circuits 400, 500, 600, 700, 800, and 900 for tuning to four different sub-bands in the 470-790 MHz TVWS range. These sub-bands include 470-500 MHz (for the matching circuits of FIGS. 4A and 5A), 500-600 MHz (for the matching circuit of FIG. 6A), 600-700 MHz (for the matching circuit of FIGS. 7A and 8A), and 700-800 MHz (for the matching circuit of FIG. 9A). These sub-bands (and matching circuits) described below are exemplary and other sub-bands and matching circuits are possible. Matching circuits 400, 500, 600, 700, 800, and 900 may each correspond to matching circuit 254 shown in FIG. 2B.

Figure 4A:
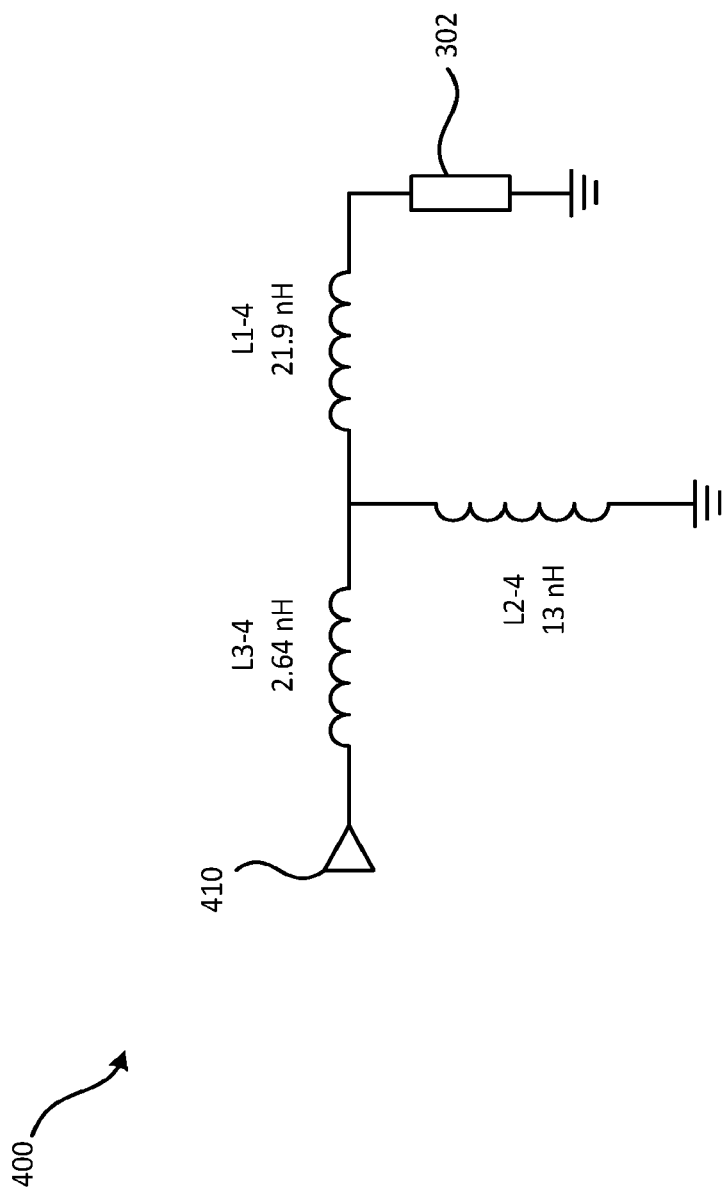
FIG. 4A is a circuit diagram of an example matching circuit, associated with a sub-band, for the antenna of FIG. 3A.

FIG. 4A is a circuit diagram of an example matching circuit 400 paired to antenna 302 of FIG. 3A. Matching circuit 400 may be incorporated into dongle 306 adjacent to antenna 302, for example. Matching circuit 400 includes a T topology having three inductors L1-4, L2-4, and L3-4. Inductor L1-4 is in the RF path with an inductor L3-4 between port 410 and antenna 302. An inductor L2-4 connects the node between inductor L1-4 and L3-4 to ground. In this implementation, inductor L3-4 is 2.64 nH, inductor L1-4 is 21.9 nH, and inductor L2-4 is 13 nH.

Figure 4B:
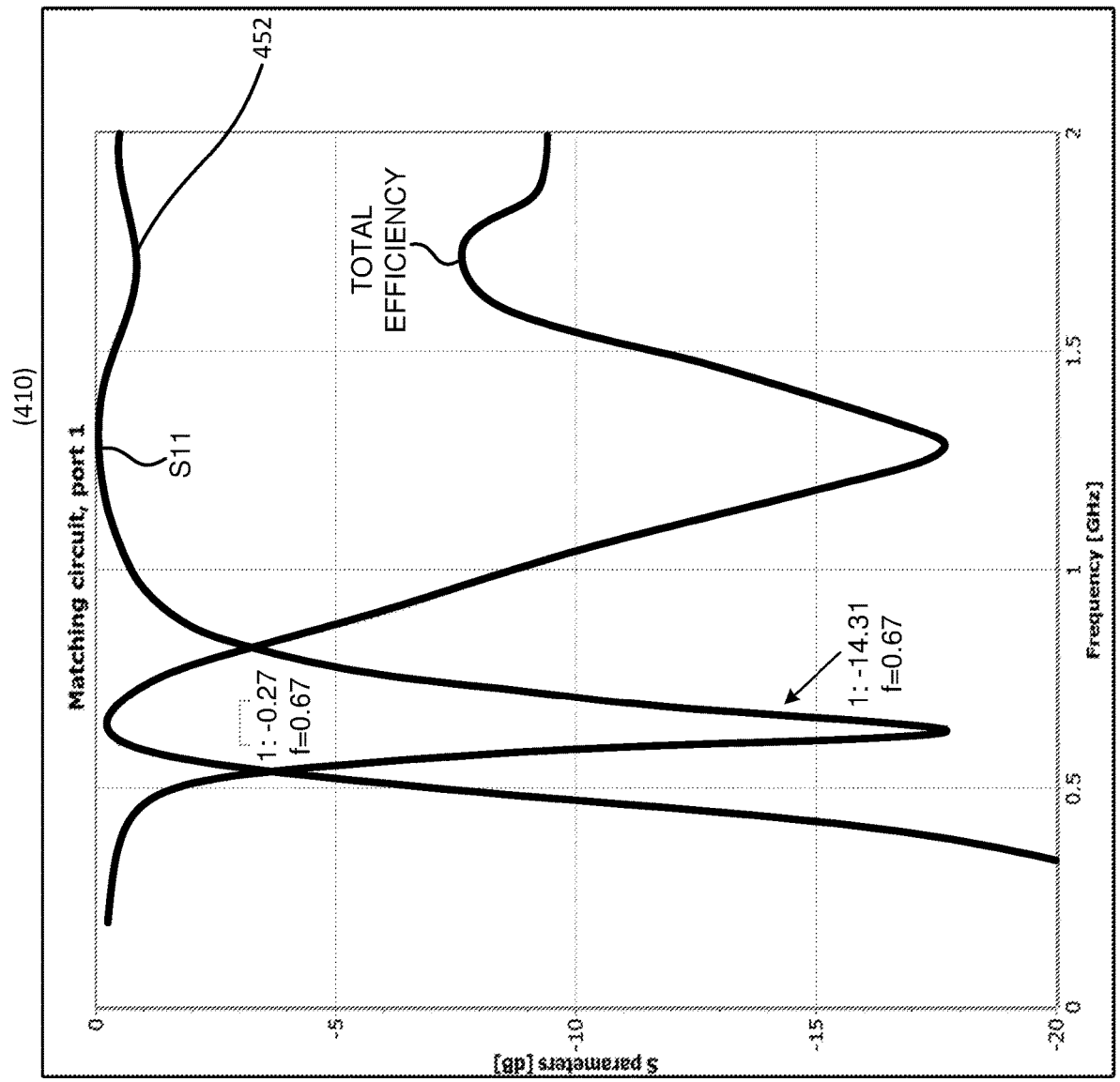
FIG. 4B is a plot of the return loss of the antenna of FIG. 3A paired with the matching circuit of FIG. 4A.
Figure 4C:
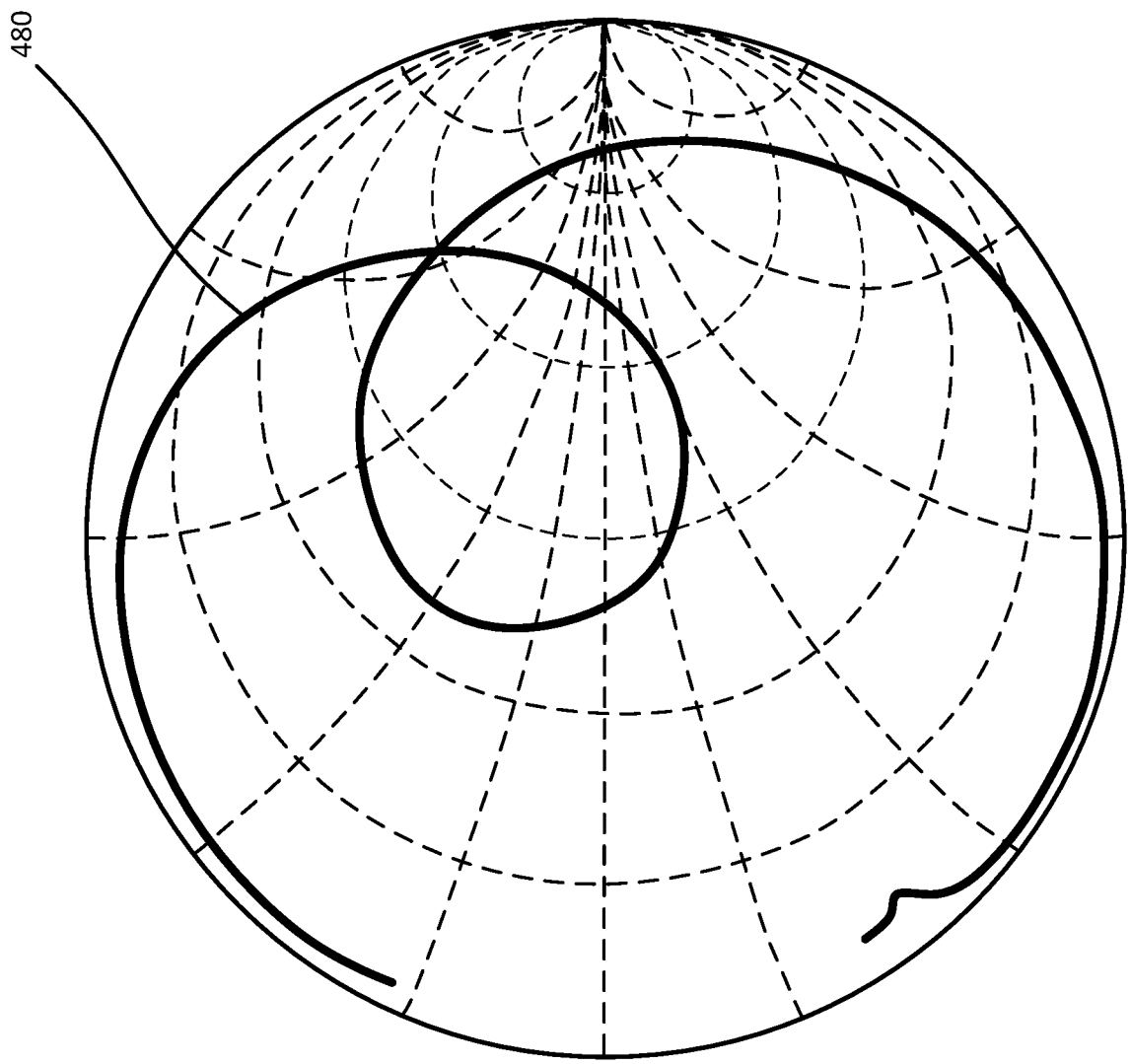
FIG. 4C is a Smith-chart plot of the reflection coefficient of the of the antenna of FIG. 3A paired with the matching circuit of FIG. 4A.

FIG. 4B is a plot of return loss (S11) 452 of antenna 302 of FIG. 3A paired with the matching circuit 400. FIG. 4C is a Smith-chart plot of the reflection coefficient 480 (with a reference impedance of 50Ω) of antenna 302 paired with the matching circuit 400. As shown in FIGS. 4B and 4C, matching circuit 400, when coupled to antenna 302, may be suited to the 470-500 MHz frequency range.

Figure 5A:
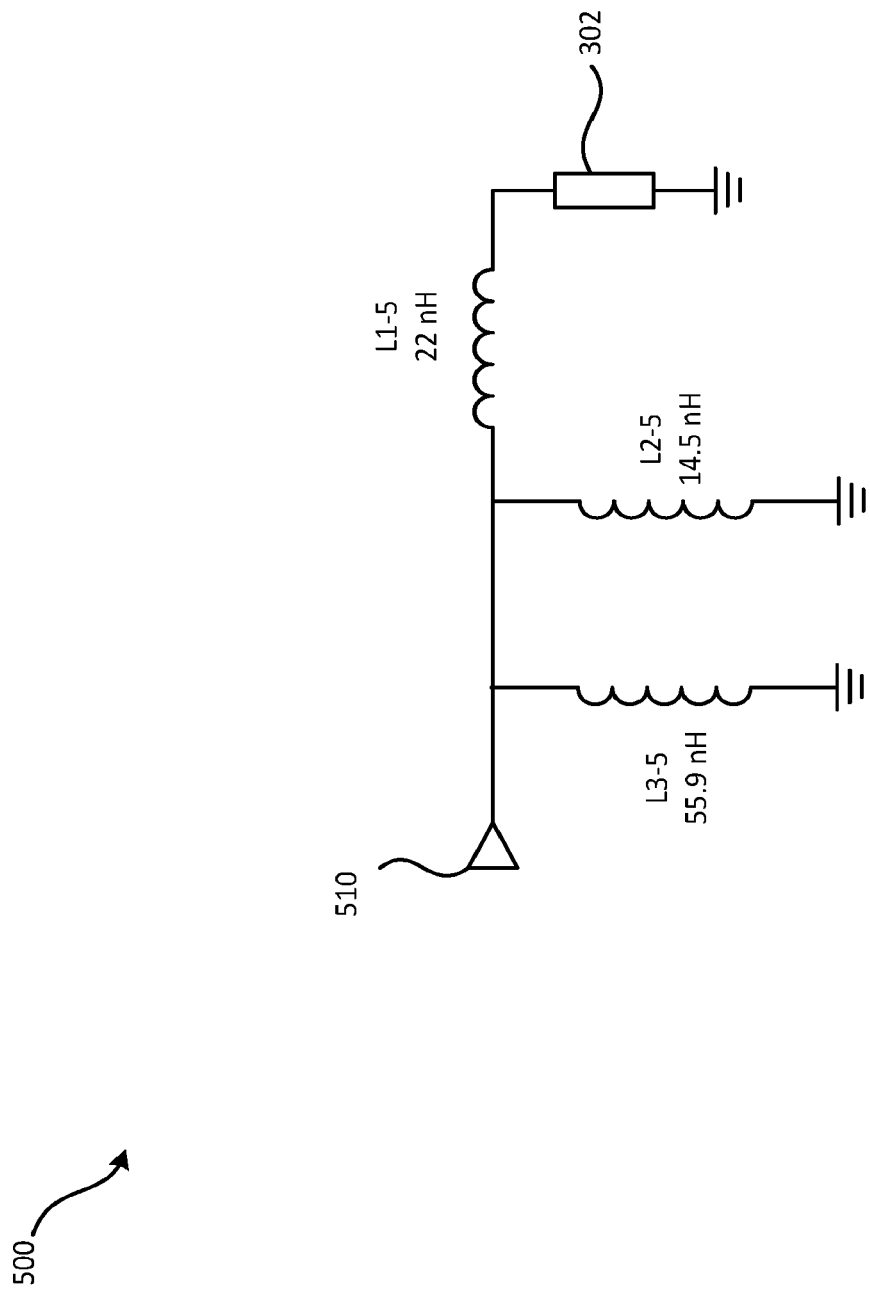
FIG. 5A is a circuit diagram of an example matching circuit, associated with a sub-band, for the antenna of FIG. 3A.

Matching circuit 400 may include additional, fewer, or a different arrangement of components. For example, FIG. 5A is a circuit diagram of an example alternative matching circuit 500 for pairing to antenna 302 for operating on the same sub-band of the TVWS spectrum as FIG. 4A (i.e., 470-500 MHz). Matching circuit 500 may be incorporated into dongle 306 adjacent to antenna 302, for example.

Matching circuit 500 illustrates an alternative circuit topology (compared to the topology of matching circuit 400) for the same frequency range. Matching circuit 500, like matching circuit 400, includes three inductors. Matching circuit 500 includes an inductor L1-5 connected between port 510 and antenna 302. Matching circuit 500 also includes an inductor L2-5 and an inductor L3-5, each between port 510 and ground. In this implementation, as shown in FIG. 5A, inductor L1-5 is 22 nH, inductor L2-5 502 is 14.5 nH, and inductor L3-5 55.9 nH.

Figure 5B:
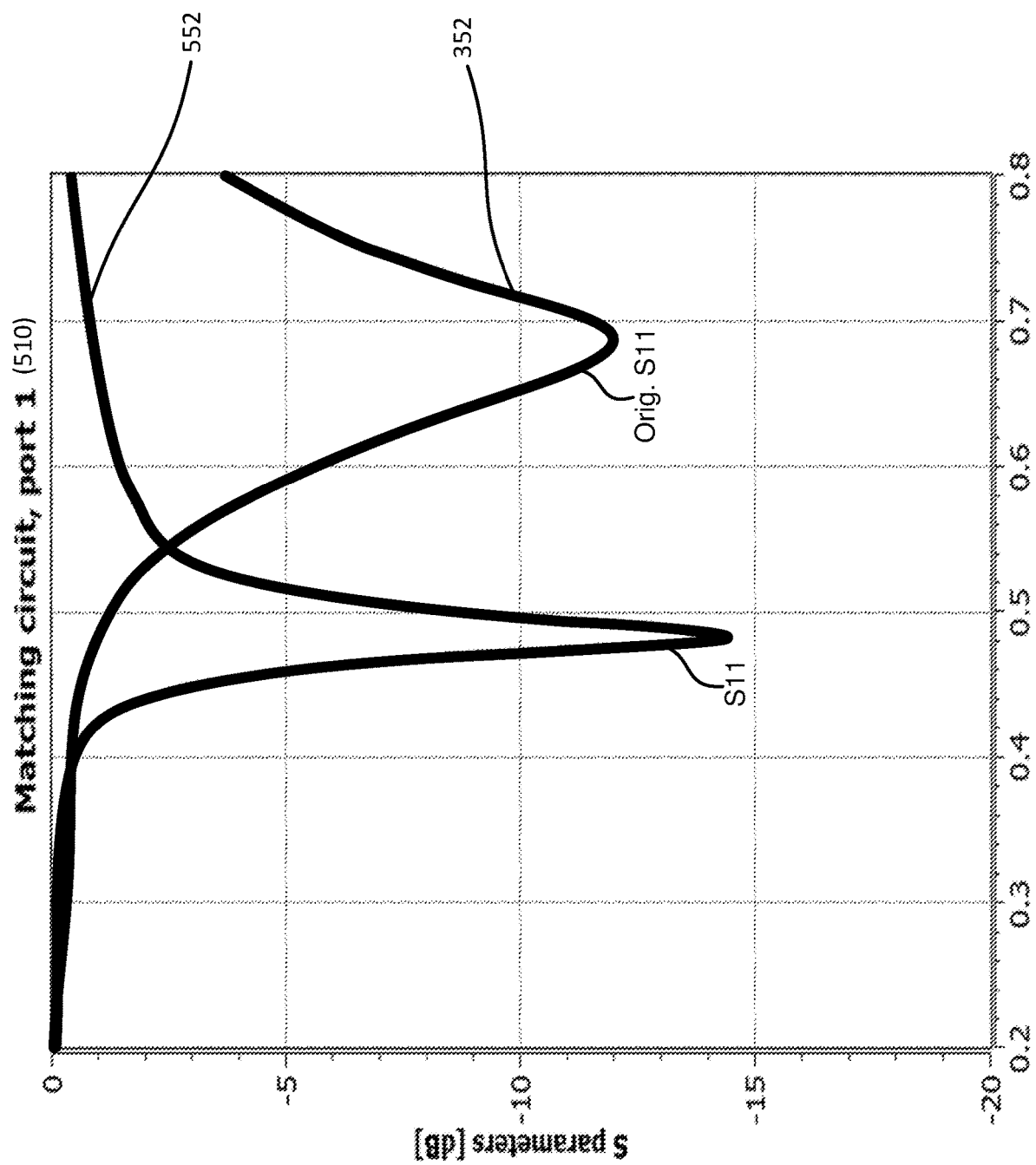
FIG. 5B is a plot of the return loss of the antenna of FIG. 3A paired with the matching circuit of FIG. 5A.
Figure 5C:
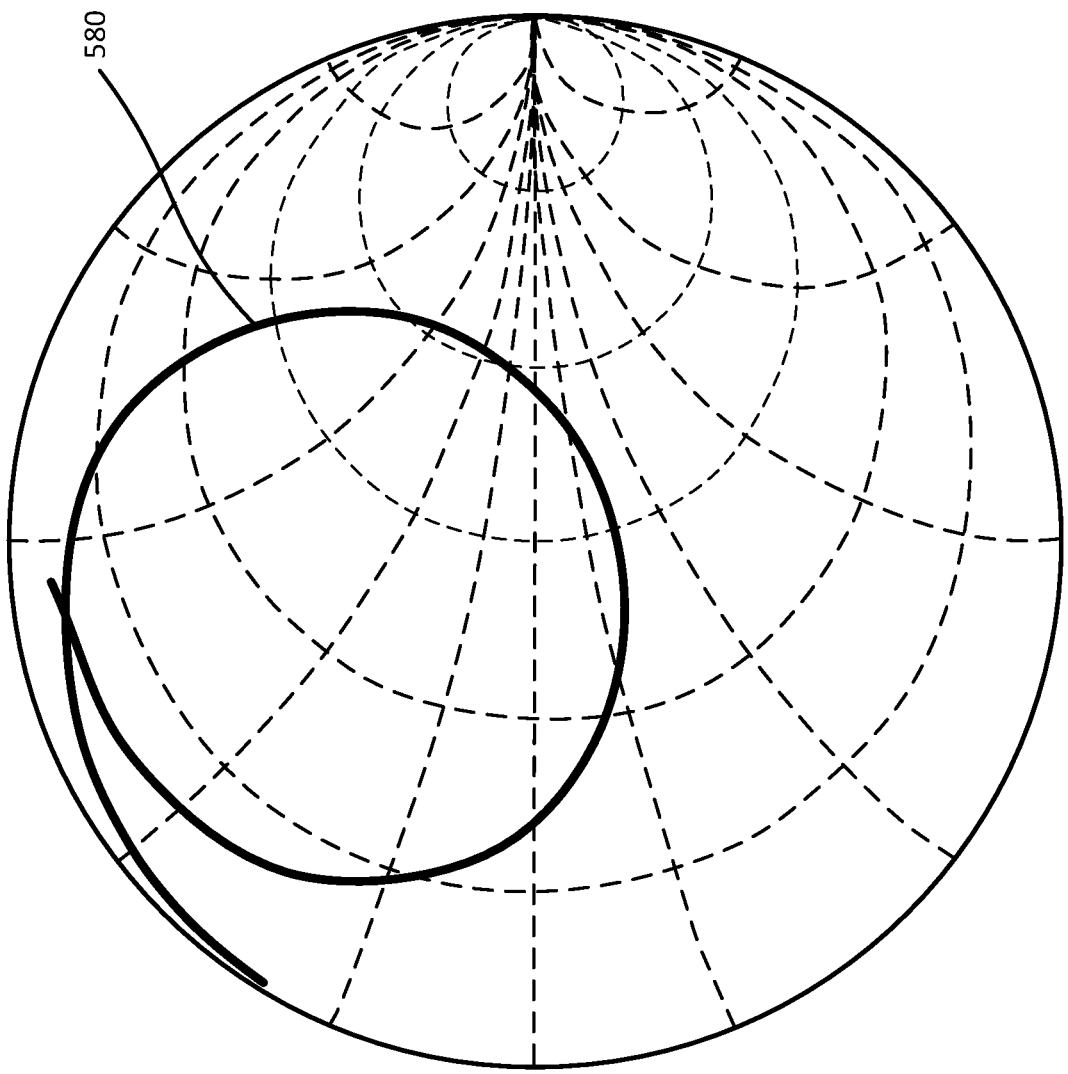
FIG. 5C is a Smith-chart plot of the reflection coefficient of the of the antenna of FIG. 3A paired with the matching circuit of FIG. 5A.

FIG. 5B is a plot of the return loss 552 over a sub-band (470-500 MHz) of antenna 302 of FIG. 3A paired with matching circuit 500. FIG. 5C is a Smith-chart plot of the reflection coefficient 580 (over a sub-band of 470-500 MHz) of antenna 403 paired with matching circuit 500 with a reference impedance of 50Ω. As shown in FIGS. 5B and 5C, matching circuit 500 has similar performance metrics to matching circuit 400. Both matching circuits 400 and 500 are suited for the 470-500 MHz range.

Figure 6A:
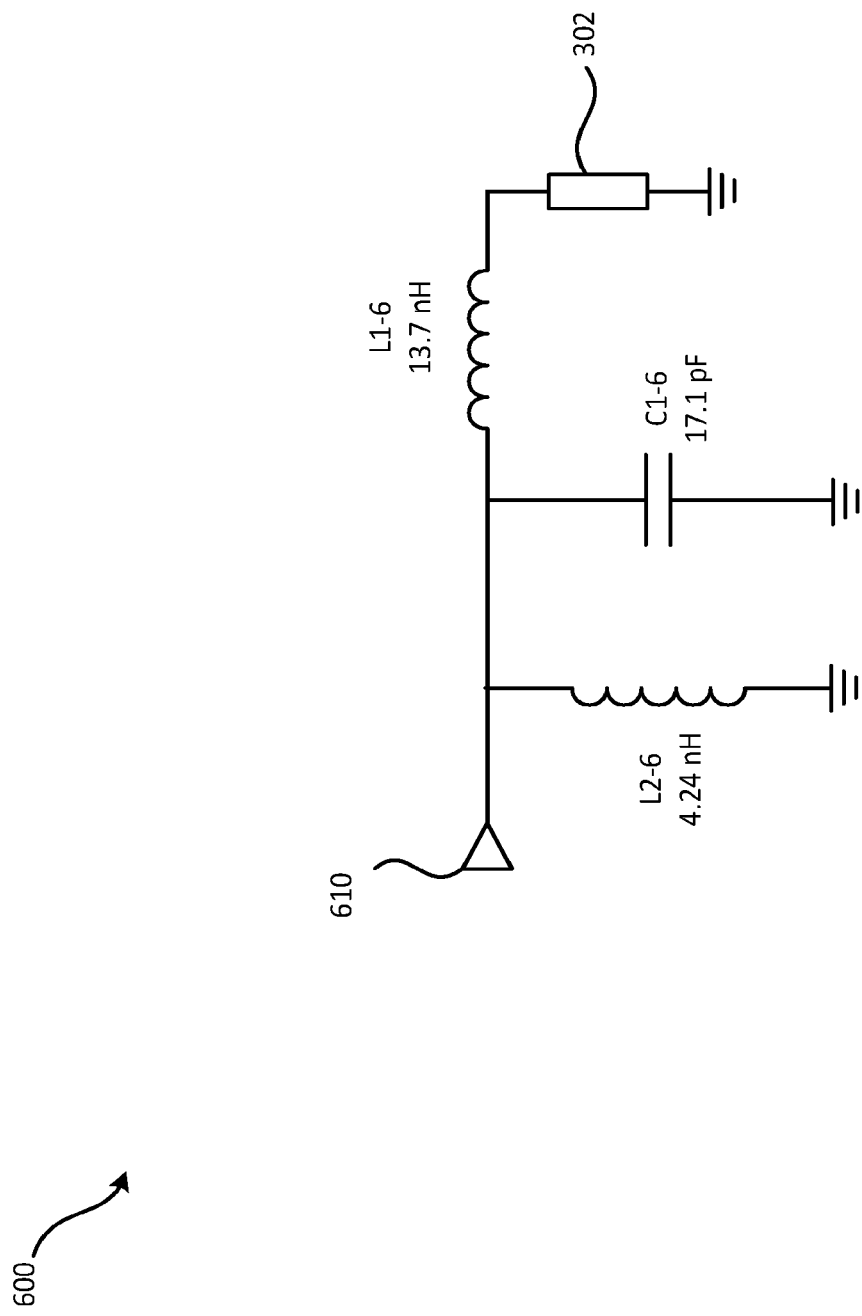
FIG. 6A is a circuit diagram of an example matching circuit, associated with a sub-band, for the antenna of FIG. 3A.
Figure 6B:
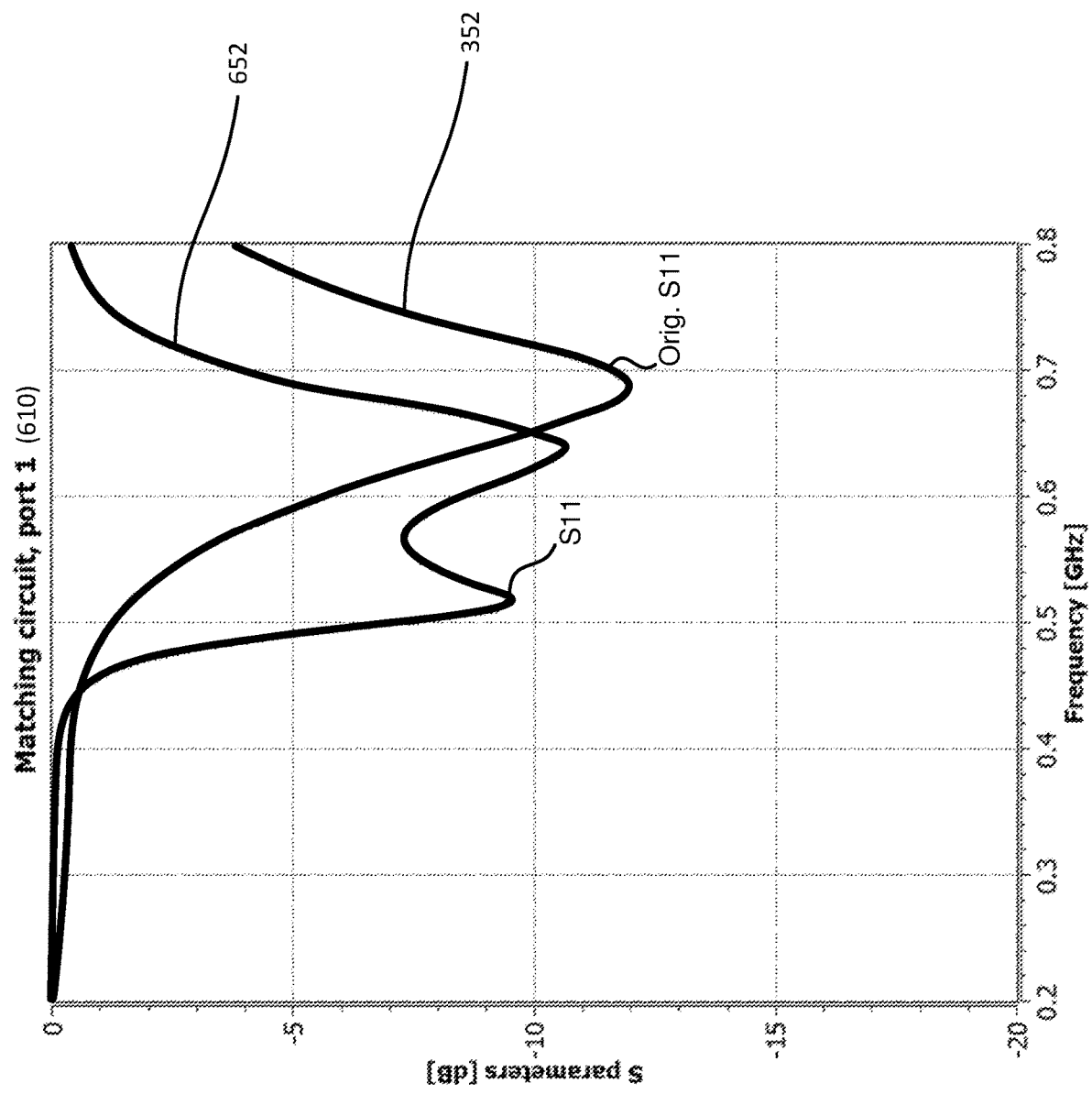
FIG. 6B is a plot of the return loss of the antenna of FIG. 3A paired with the matching circuit of FIG. 6A.
Figure 6C:
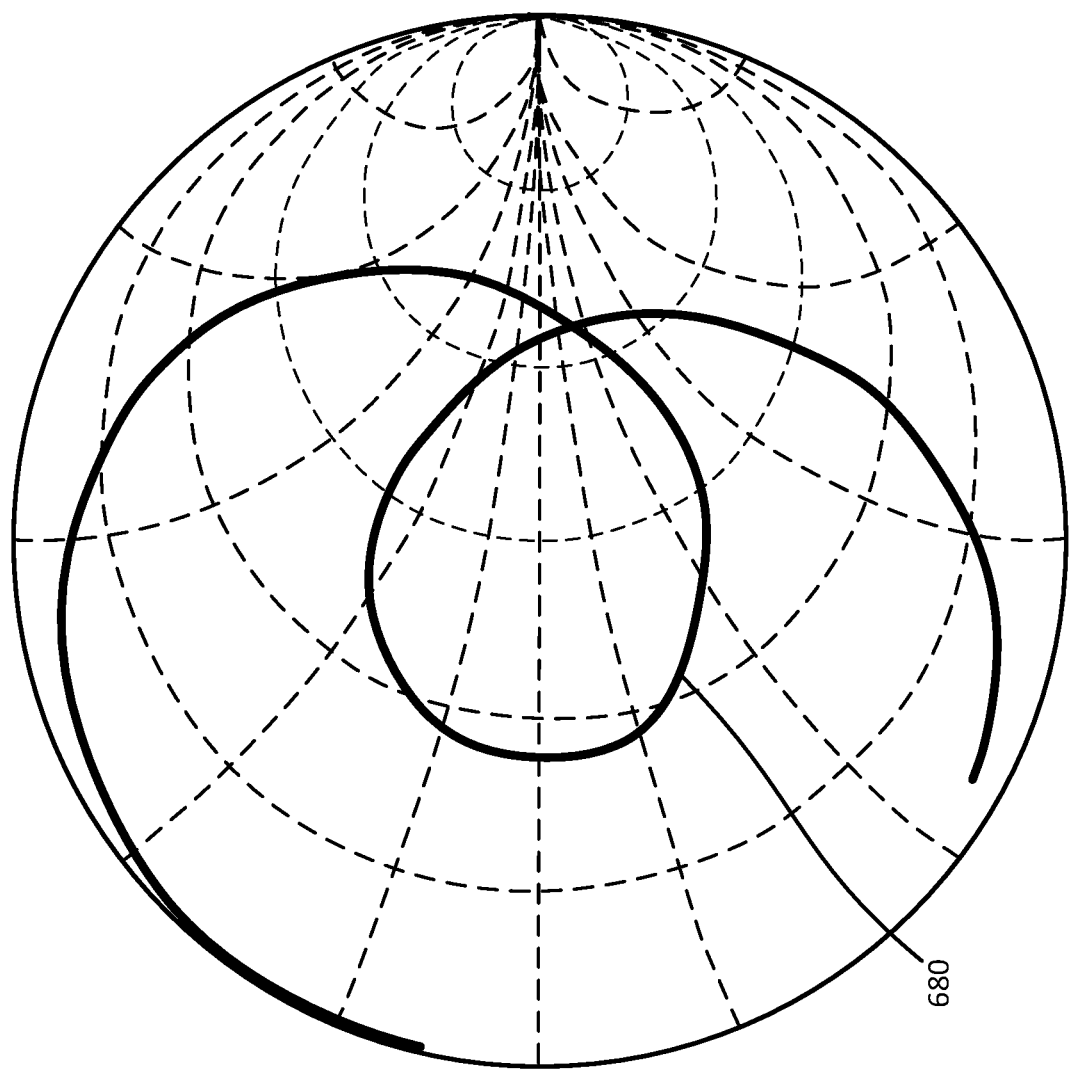
FIG. 6C is a Smith-chart plot of the reflection coefficient of the of the antenna of FIG. 3A paired with the matching circuit of FIG. 6A.

FIG. 6A is a circuit diagram of an example matching circuit 600 for antenna 302 of FIG. 3A. FIG. 6B is a plot of the return loss 652 (over the sub-band of 500-600 MHz) of antenna 302 paired with matching circuit 600. FIG. 6C is a Smith-chart plot of the reflection coefficient 680 (over the sub-band of 500-600 MHz) of antenna 302 paired with matching circuit 600 with a reference impedance of 50Ω. As demonstrated in FIGS. 6B and 6C, matching circuit 600 paired with antenna 302 is suitable for the 500-600 MHz frequency range. Matching circuit 600 may be incorporated into dongle 306 adjacent to antenna 302, for example.

As shown in FIG. 6A, the topology of matching circuit 600 is similar to the topology of matching circuit 500 (see FIG. 5A), but the component values themselves are different for the different operating frequency ranges. Matching circuit 600 includes two inductors and a capacitor. An inductor L1-6 is connected between port 610 and antenna 302. Matching circuit 600 also includes an inductor L2-6 and a capacitor C1-6, each connected between input port 610 and ground. In this implementation, as shown in FIG. 6A, inductor L1-6 is 13.7 nH, inductor L2-6 is 4.24 nH, and capacitor C1-6 is 17.1 pF.

Figure 7A:
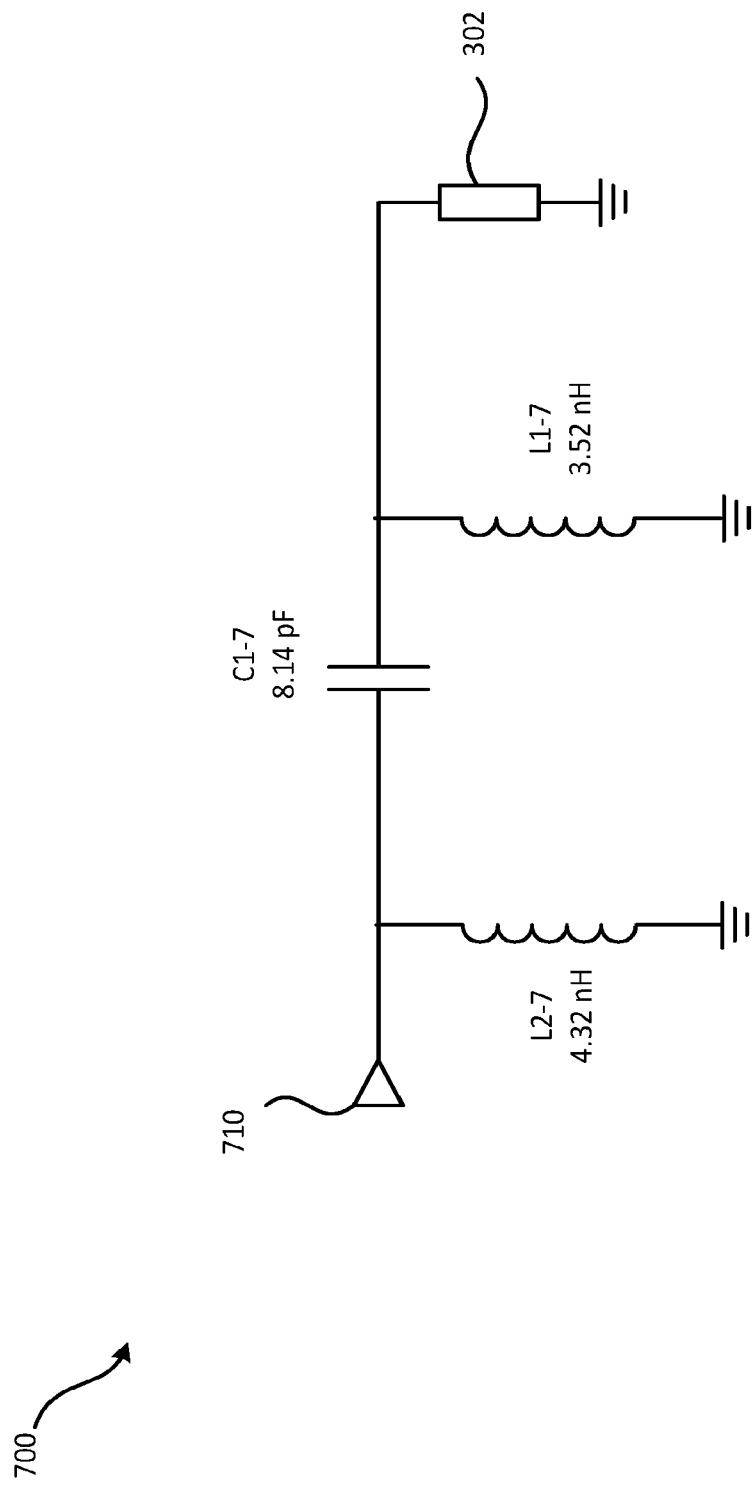
FIG. 7A is a circuit diagram of an example matching circuit, associated with a sub-band, for the antenna of FIG. 3A.
Figure 7B:
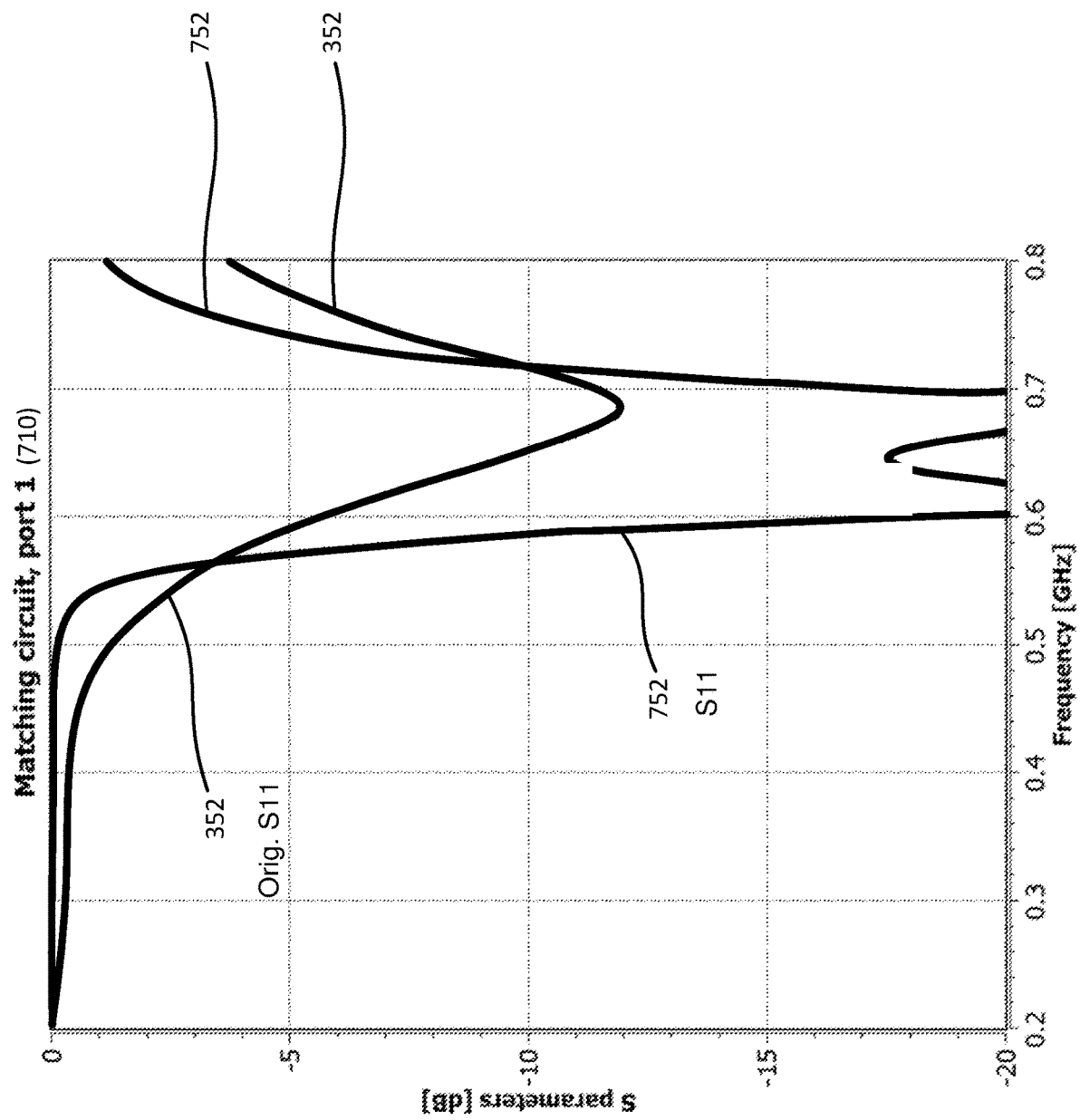
FIG. 7B is a plot of the return loss of the antenna of FIG. 3A paired with the matching circuit of FIG. 7A.
Figure 7C:
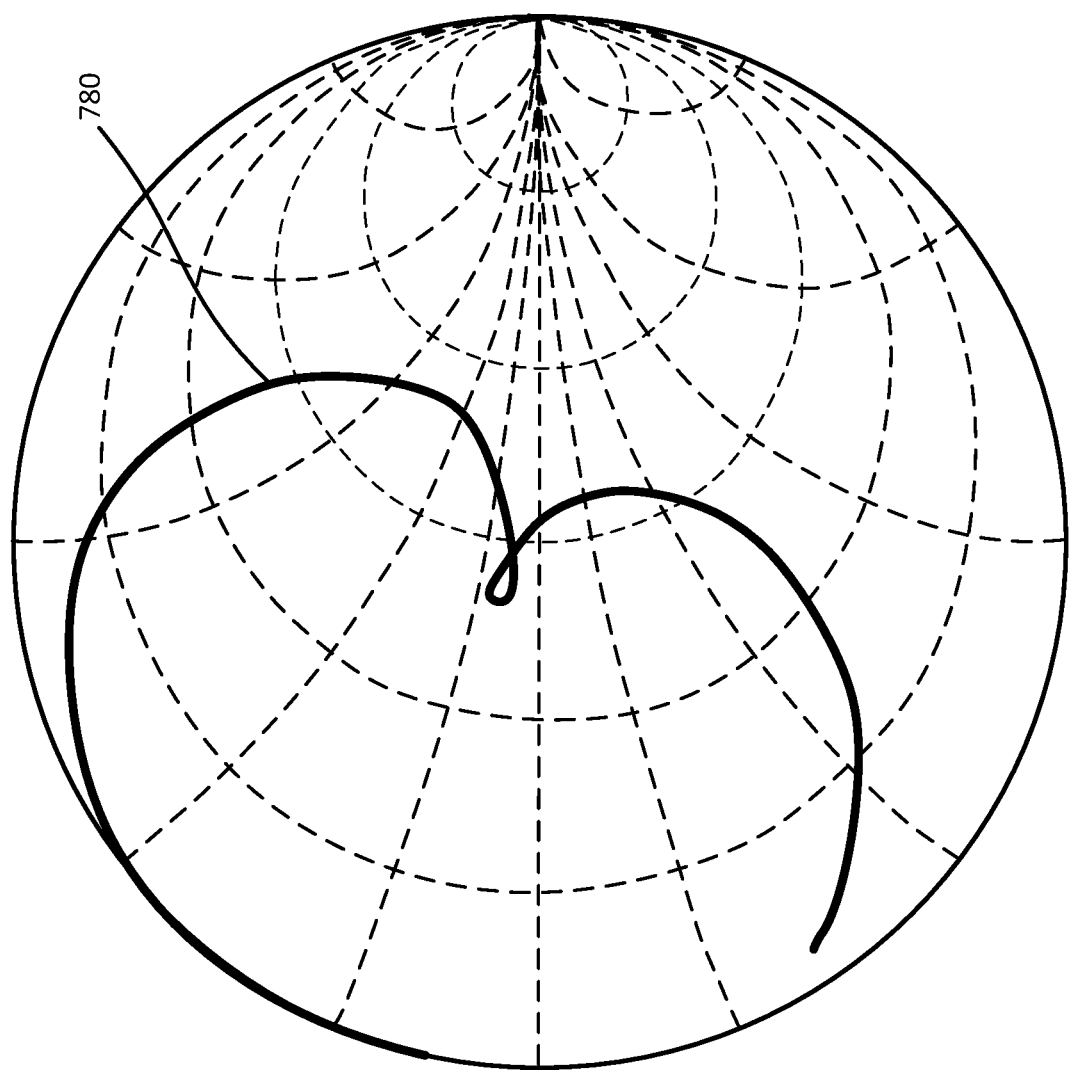
FIG. 7C is a Smith-chart plot of the reflection coefficient of the of the antenna of FIG. 3A paired with the matching circuit of FIG. 7A.

FIG. 7A is a circuit diagram of an example matching circuit 700 for antenna 302 of FIG. 3A. FIG. 7B is a plot of the return loss 752 (over the sub-band of 600-700 MHz) of antenna 302 paired with matching circuit 700. FIG. 7C is a Smith-chart plot of the reflection coefficient 780 (over the sub-band of 600-700 MHz) of antenna 302 paired with matching circuit 700 with a reference impedance of 50Ω. As demonstrated in FIGS. 7B and 7C, matching circuit 700 paired with antenna 302 is suitable for the 500-600 MHz frequency range. Matching circuit 700 may be incorporated into dongle 306 adjacent to antenna 302, for example.

Matching circuit 700 includes two inductors and a capacitor. An inductor L2-7 is connected between port 610 and ground. A capacitor C1-7 is connected between port 610 and antenna 302. An inductor L1-7 is connected to a node (between capacitor C1-7 and antenna 302) and ground. In this implementation, as shown in FIG. 7A, inductor L1-7 is 3.52 nH, inductor L2-7 is 4.32 nH, and capacitor C1-7 is 8.14 pF.

Figure 8A:
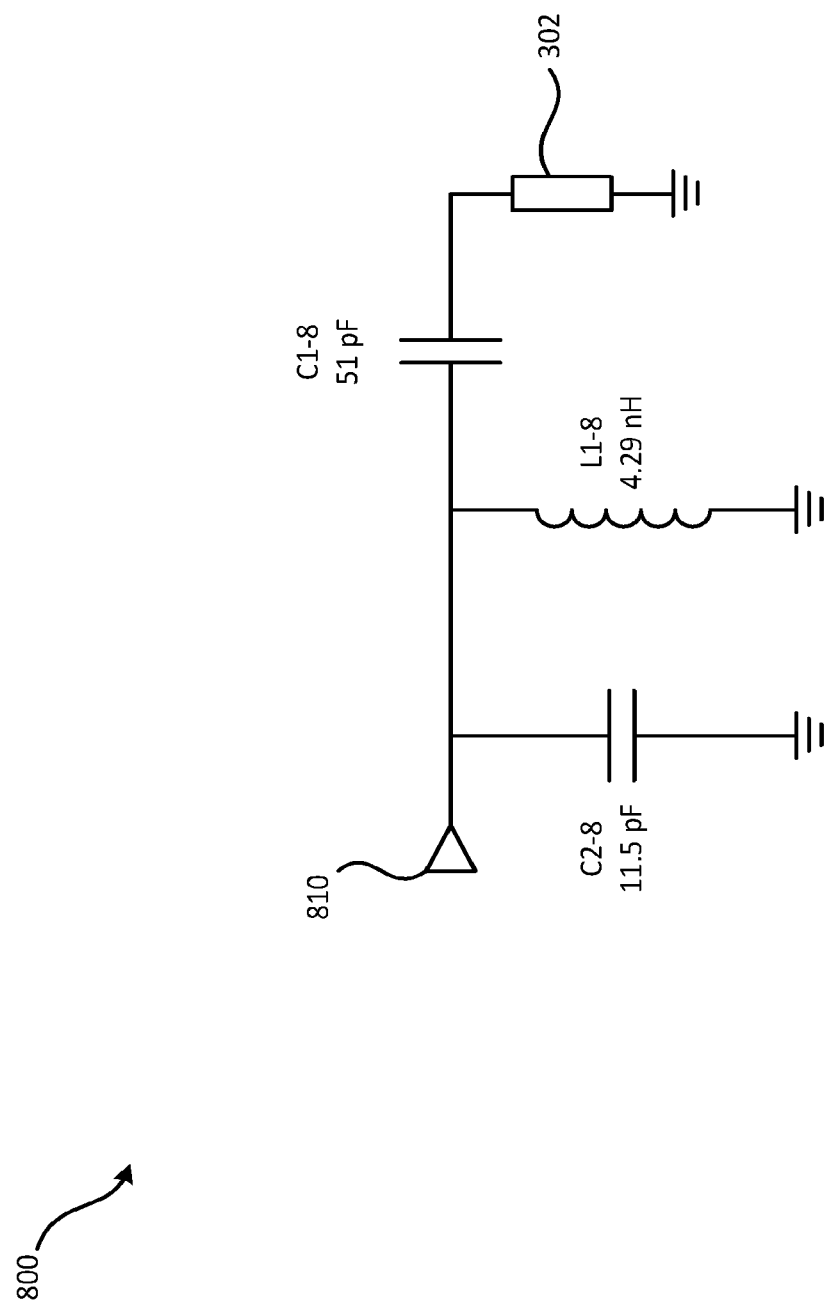
FIG. 8A is a circuit diagram of an example matching circuit, associated with a sub-band, for the antenna of FIG. 3A.
Figure 8B:
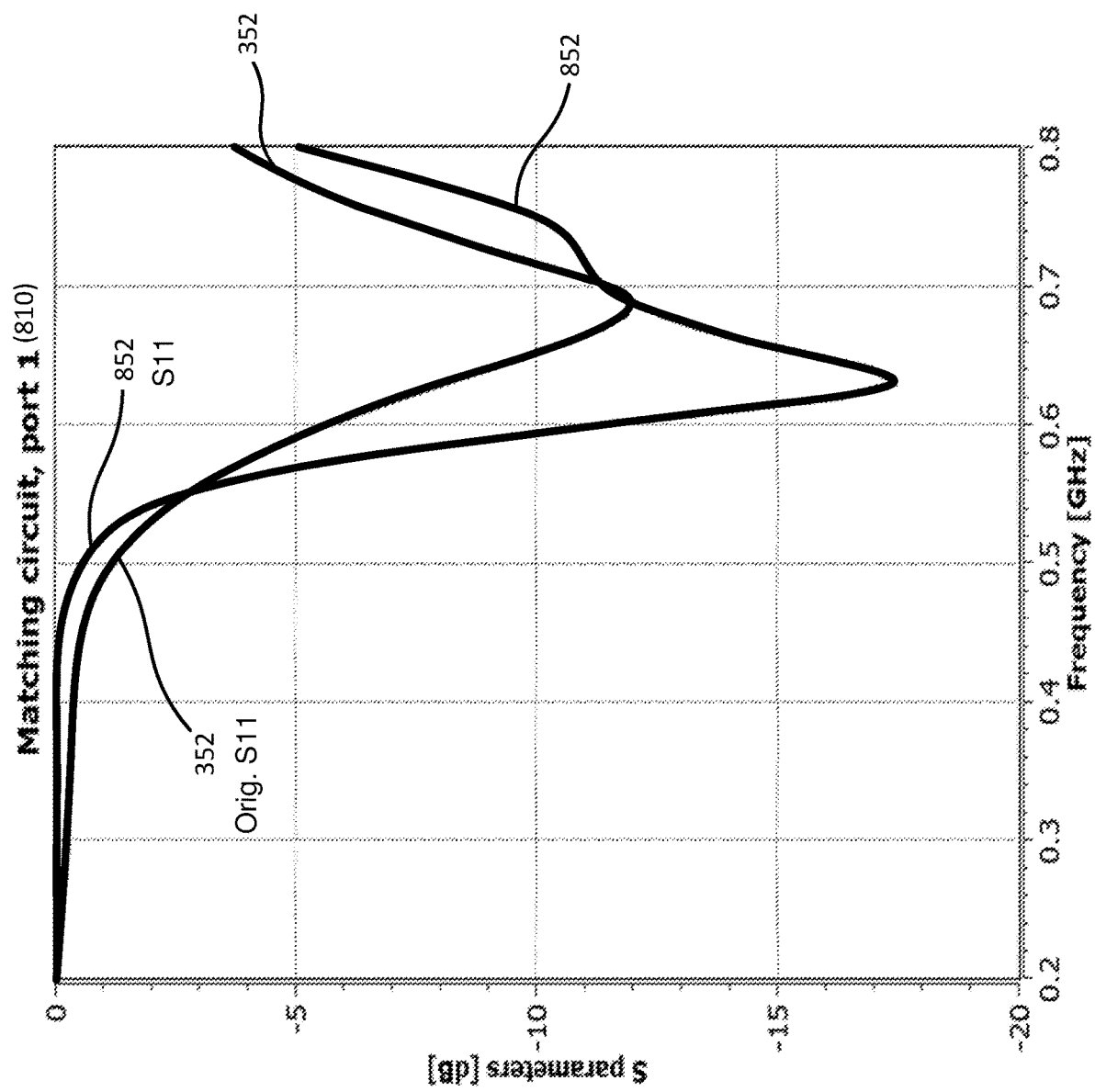
FIG. 8B is a plot of the return loss of the antenna of FIG. 3A paired with the matching circuit of FIG. 8A.
Figure 8C:
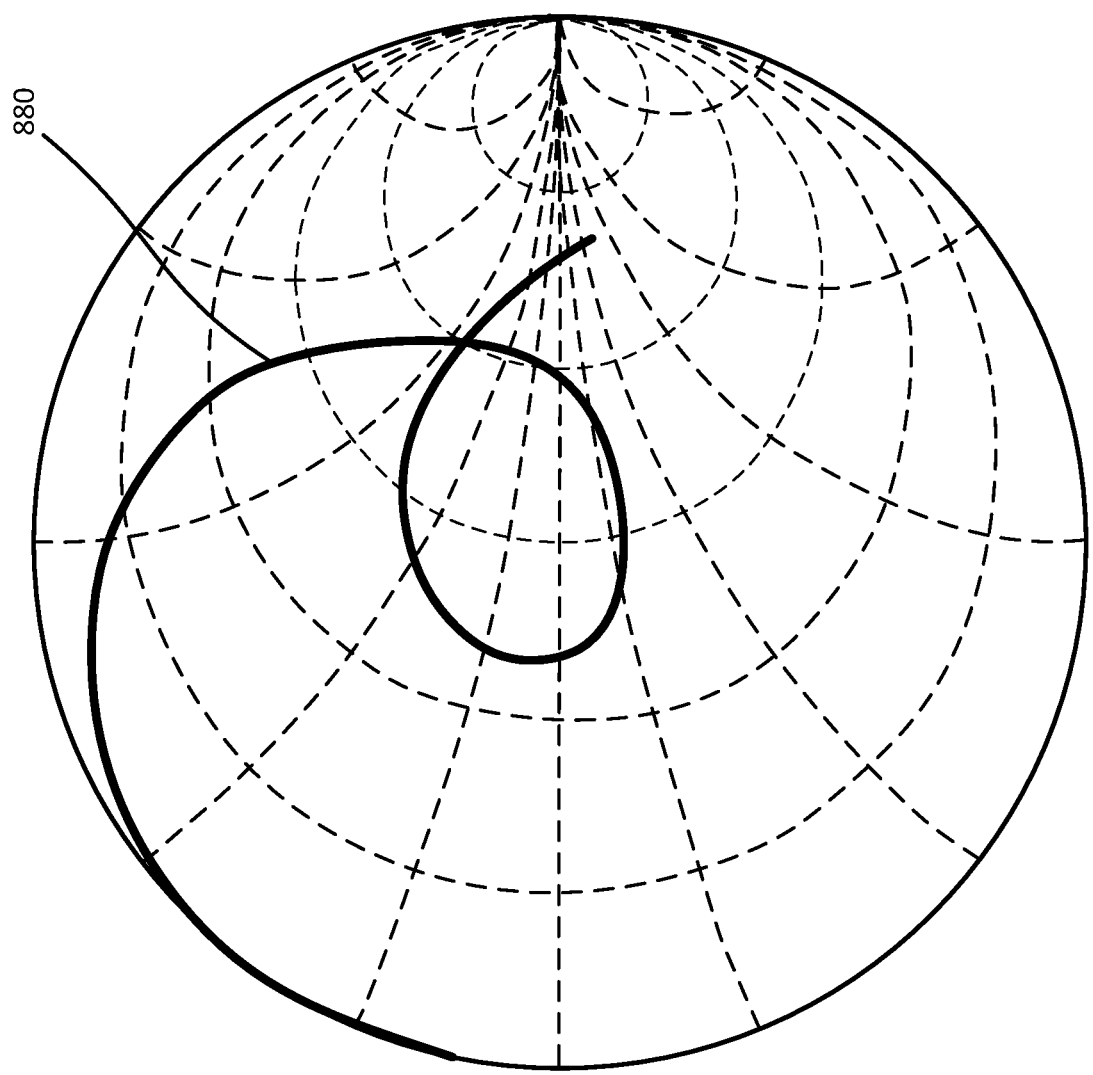
FIG. 8C is a Smith-chart plot of the reflection coefficient of the of the antenna of FIG. 3A paired with the matching circuit of FIG. 8A.

FIG. 8A is a circuit diagram of an example matching circuit 800 for antenna 302 of FIG. 3A. FIG. 8B is a plot of the return loss 852 (over the sub-band of 600-700 MHz) of the matching circuit 800 paired with antenna 302. FIG. 8C is a Smith-chart plot of the reflection coefficient 880 (over the sub-band of 600-700 MHz) of matching circuit 800 paired with antenna 302 with a reference impedance of 50Ω. As demonstrated in FIGS. 8B and 8C, matching circuit 800 paired with antenna 302 is suitable for the 500-600 MHz frequency range. Matching circuit 800 may be incorporated into dongle 306 adjacent to antenna 302, for example.

Matching circuit 800 includes two capacitors and an inductor. An inductor L1-8 is connected between port 810 and ground. A capacitor C2-8 is also connected between port 810 and ground. A capacitor C1-8 is connected between port 810 and antenna 302. In this implementation, as shown in FIG. 8A, inductor L1-8 is 4.29 nH, capacitor C2-8 is 11.5 pF, and capacitor C1-8 is 51 pF.

Figure 9A:
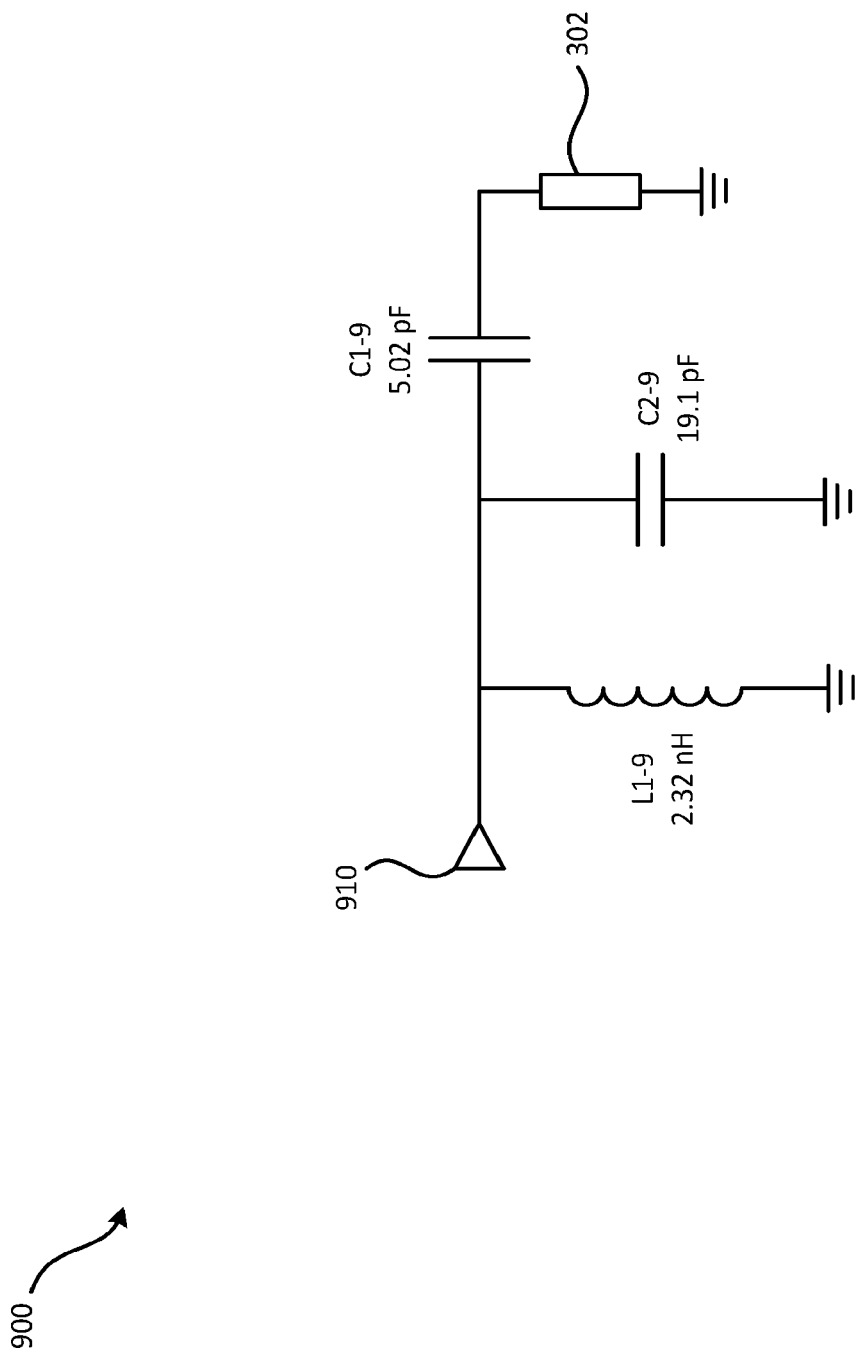
FIG. 9A is a circuit diagram of an example matching circuit, associated with a sub-band, for the antenna of FIG. 3A associated with a sub-band.
Figure 9B:
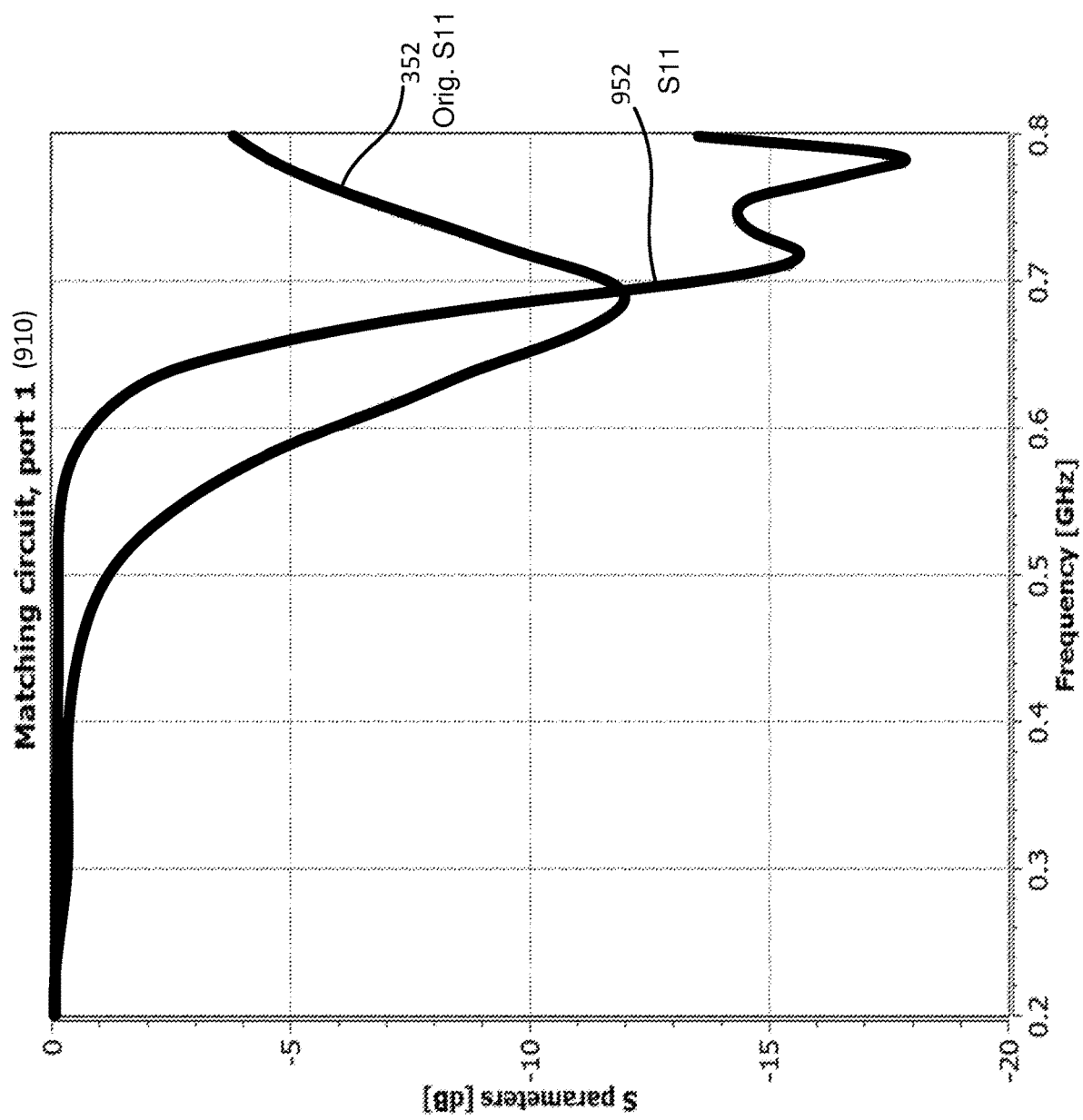
FIG. 9B is a plot of the return loss of the antenna of FIG. 3A paired with the matching circuit of FIG. 5A.
Figure 9C:
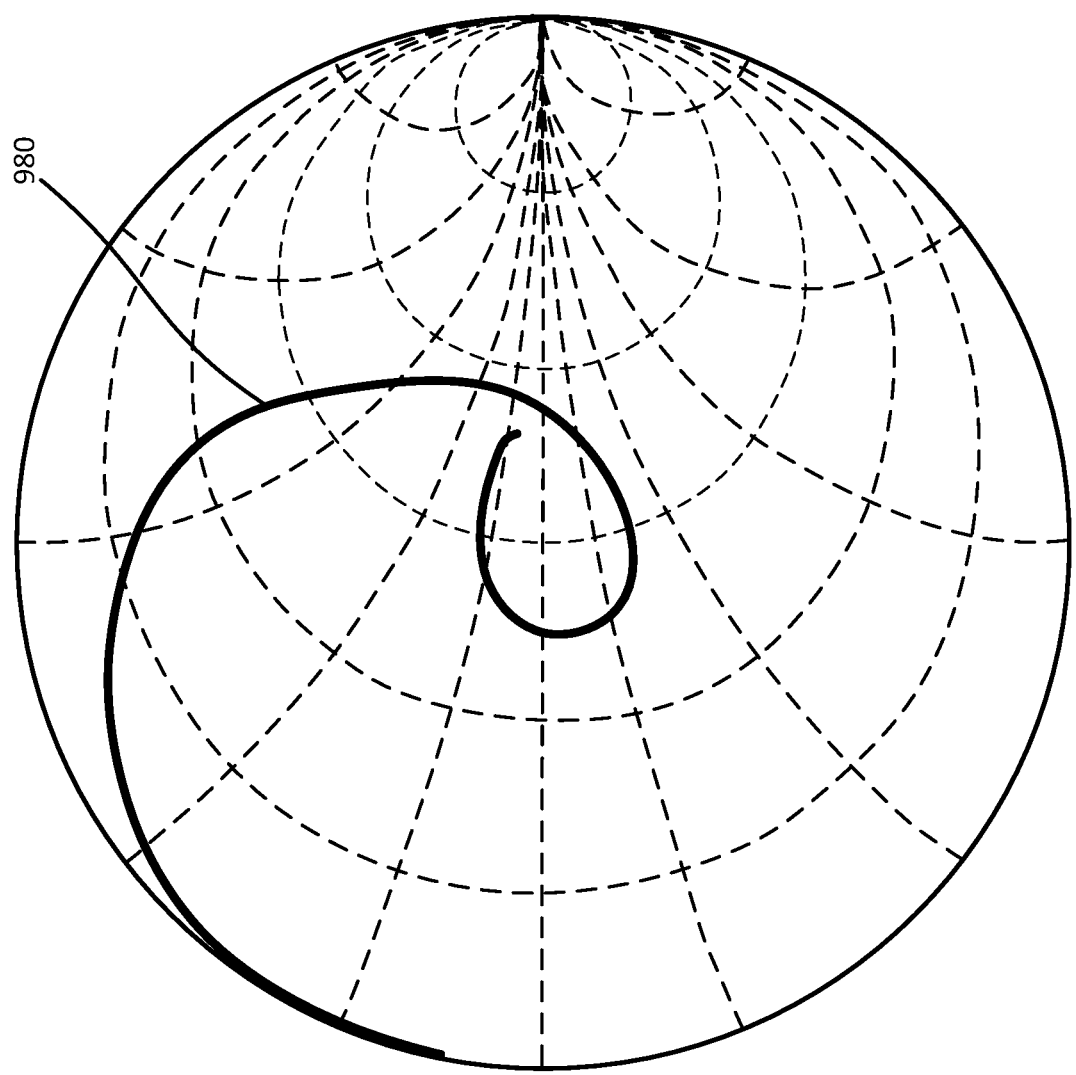
FIG. 9C is a Smith-chart plot of the reflection coefficient of the of the antenna of FIG. 3A paired with the matching circuit of FIG. 9A.

FIG. 9A is an example matching circuit 900 for antenna 302 of FIG. 3A. FIG. 9B is a plot of the return loss 952 (over the sub-band of 700-800 MHz) of matching circuit 900 paired with antenna 302 of FIG. 3A. FIG. 9C is a Smith-chart plot of the reflection coefficient 980 (including the sub-band of 700-800 MHz) of matching circuit 900 paired with antenna 302 with a reference impedance of 50Ω. As demonstrated in FIGS. 9B and 9C, matching circuit 900 paired with antenna 302 is suitable for the 700-800 MHz frequency range. Matching circuit 900 may be incorporated into dongle 306 adjacent to antenna 302, for example.

Matching circuit 900 includes two capacitors and an inductor. An inductor L1-9 is connected between port 910 and ground. A capacitor C2-9 is also connected between port 910 and ground. A capacitor C1-8 is connected between port 910 and antenna 302. In this implementation, as shown in FIG. 9A, inductor L1-9 is 2.32 nH, capacitor C2-9 is 19.1 pF, and capacitor C1-9 is 5.02 pF.

Thus, as shown in in FIGS. 4A through 9C, antenna 302 may be well matched across the full desired frequency range (such as 470 MHz to 790 MHz) by pairing it with matching circuits for various sub-bands. The operating frequency range of antenna 302 may be extended upwards by introducing an additional matching circuit, such as for the sub-band of 800-860 MHz. In one implementation, a matching circuit may be selected from various different matching circuits (such as matching circuits 400, 500, 600, 700, 800 and/or 900).

Figure 10:
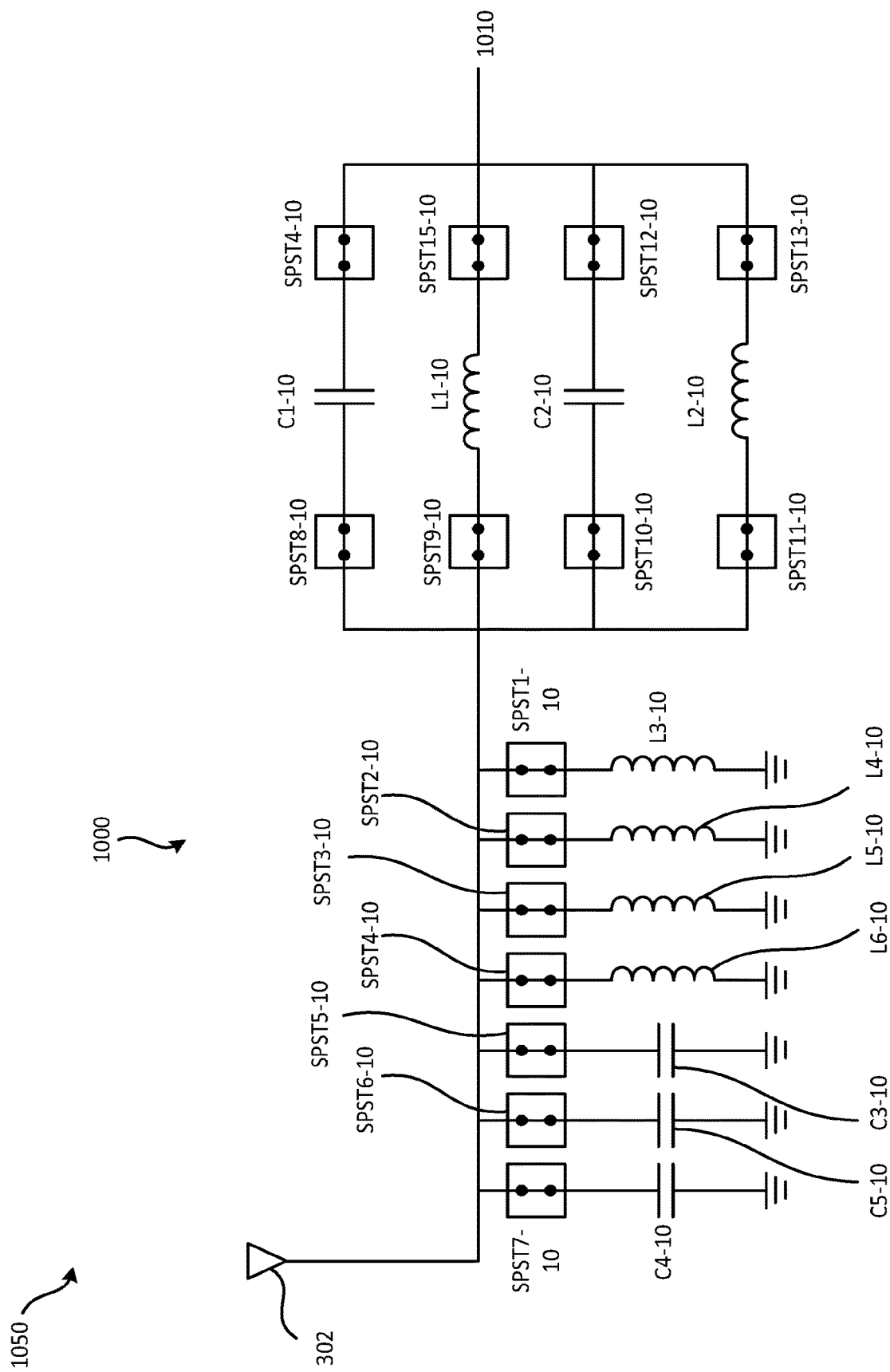
FIG. 10 is a circuit diagram of an example reconfigurable matching circuit for the antenna of FIG. 3A.

FIG. 10 is a circuit diagram of an example reconfigurable matching circuit 1000 for antenna 302 of FIG. 3A. Antenna 302 paired with matching circuit 1000 may be referred to as antenna system 1050 and configured to cover frequency ranges between 470 and 800 MHz, for example. Matching circuit 1000 may provide a highly-flexible implementation for reconfiguring a matched circuit for different sub-bands. In the implementation of FIG. 10, matching circuit 1000 includes fifteen single-pole, single-throw (SPST) switches to either include or exclude components. These switches, when closed, provide a short circuit to pass the relevant RF frequency signals (such as 470-800 MHz) through the switch with little or no loss (such as approximately 0.5 dB insertion loss). The switches, when open, provide an open circuit to exclude the adjacent component from the matching circuit. Whether a switch is on or off may be determined by a controller, with the state of TRUE commanding the switch to be closed, and the state of FALSE commanding the switch to be open. Radio 200 (see FIG. 2) may correspond to radio system 1050. As such, antenna 207-x may include antenna 302; FEM 206-x may include matching circuit 1000; and switches SPST may be controlled over bus 203 by controller 212 (see FIG. 2).

Matching circuit 1000 includes seven components connected between antenna 302 and ground: three capacitors C3-10, C4-10, and C5-10 and four inductors L3-10, L4-10, L5-10, and L6-10. Each of these components (C3-10, C4-10, C5-10, L3-10, L4-10, L5-10, and L6-10) can be switched into or out of antenna system 1050 by switches SPST 1-10, SPST 2-10, SPST 3-10, SPST 4-10, SPST 5-10, SPST 6-10, and SPST 7-10, respectively, as a shunt to ground. Matching circuit 1000 also includes four components connected between antenna 302 and port 1010: two capacitors C1-10 and C2-10 and two inductors L1-10 and L2-10. Each of these components (C1-10, C2-10, L1-10, and L2-10) can be switched into or out of the circuit by switches SPST 8-10, SPST 9-10, SPST 10-10, SPST 11-10, SPST 12-10, SPST 13-10, SPST 14-10, and SPST 15-10. In particular, switches SPST 8-10 and SPST 14-10 are on each side of and are configured to include or exclude capacitor C1-10 from the circuit. Switches SPST 9-10 and SPST 15-10 are on each side of and are configured to include or exclude inductor L1-10 from the circuit. Switches SPST 10-10 and SPST 12-10 are on each side of and are configured to include or exclude capacitor C2-10 from the circuit. Switches SPST 11-10 and SPST 13-10 are on each side of and are configured to include or exclude inductor L2-10 from the circuit. These components (C1-10, C2-10, L1-10, and L2-10) may each be considered in the RF signal path because each is connected between antenna 302 and port 1110.

As an example, controller 212 may configure antenna system 1050 for the 470-500 MHz frequency range. To do so, controller 212 may switch L5-10, L6-10 and L1-10 into the circuit of antenna system 1050. To switch L5-10 into the circuit, controller 212 commands switch SPST 3-10 closed. To switch L6-10 into the circuit, controller 212 commands switch SPST 4-10 closed. To switch L1-10 into the circuit, controller 212 commands switch SPST 9-10 and SPST 15-10 closed. In this example, L1-10 may have the value of 22 nH, L5-10 may have a value of 55.9 nH, and L6-10 may have the value of 14.5 nH, thus providing a circuit similar to that shown in FIG. 5A. Further, in this example, all other components (L2-10, L3-10, L4-10, C1-10, C2-10, C3-10, C4-10, and C5-10) are switched out of the circuit of antenna system 1050. To do so, controller 212 commands switches SPST 7-10, SPST 6-10, SPST 5-10, SPST 8-10, SPST 14-10, SPST 10-10, SPST 12-10, SPST 11-10, and SPST 13-10 to be open.

Controller 212 may command switches SPST to different states to achieve alternative frequency ranges, such as the ranges discussed above. In matching circuit 1000, multiple shunt inductors (L3-10, L4-10, L5-10, and L6-10) can be switched in or out by controller 212 to achieve an inductive value different than any of the individual inductors. Likewise, multiple shunt capacitors (C3-10, C4-10, and C5-10) can be switched in or out by controller 212 to achieve a capacitive value different than any of the individual capacitors. Further, different shunt capacitors and inductors can be switched in or out by controller 212 to achieve a reactive value (a composite value) different than the reactive value of any individual circuit component.

In addition, in matching circuit 1000, multiple inductors (L1-10 and L2-10) in the RF signal path between antenna 302 and port 1010 can be switched in or out by controller 212 to achieve an inductive value different than any of the individual inductors (L1-10 or L2-10). Likewise, multiple capacitors (C3-10, C4-10, and C5-10) in the RF signal path between antenna 302 and port 1010 can be switched in or out by controller 212 to achieve a capacitive value different than any of the individual capacitors (C1-10 or C2-10). Further, different capacitors and inductors (L1-10, L2-10, C1-10, and/or C2-10) can be switched in or out by controller 212 to achieve a reactive value in the RF signal path different than any reactive value of any individual circuit component.

The component values in matching circuit 1000 may correspond to the component values in matching circuits 500, 600, 800, and 900. As such, adjustable matching circuit 1000 may be configured to correspond any of matching circuits 600, 600, 800, or 900. For example, with respect to shunt component values: capacitor C4-10 may be 17.1 pF (see matching circuit 600), capacitor C5-10 may be 11.5 pF (see matching circuit 800), capacitor C3-10 may be 19.1 pF (see matching circuit 900), inductor L6-10 may be 11.51 nH (see matching circuit 500, i.e., the parallel combination of L3-5 and L2-5), inductor L5-10 may be 4.24 nH (see matching circuit 600), inductor L4-10 may be 4.29 nH (see matching circuit 800), and inductor L3-10 may be 2.32 nH (see matching circuit 900); with respect to other component values: capacitor C1-10 may be 51 pF (see matching circuit 800), capacitor C2-10 may be 5.02 pF (see matching circuit 900), inductor L1-10 may be 22 nH (see matching circuit 500), and inductor L2-10 may be 13.7 nH (matching circuit 600).

Figure 11:
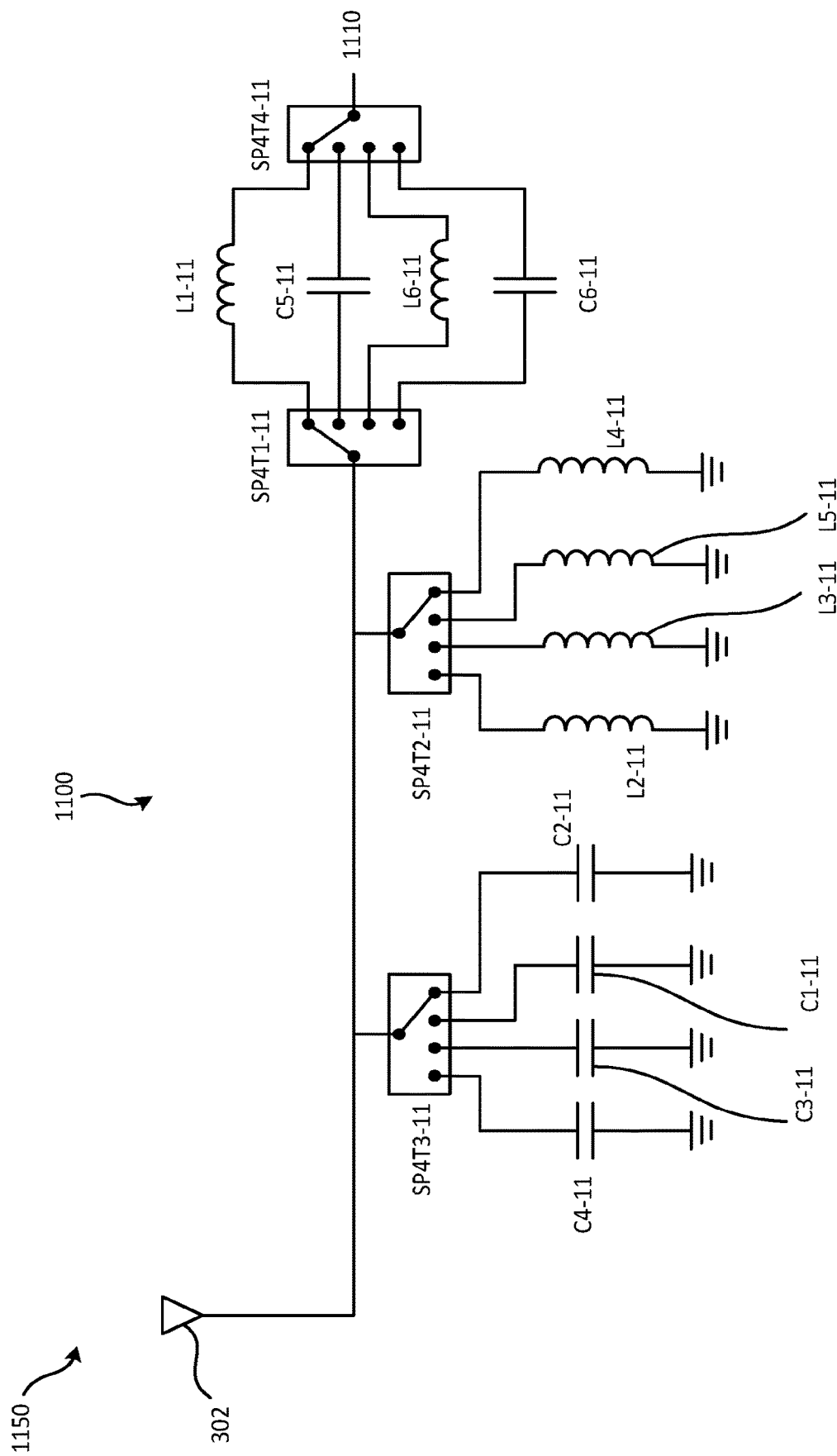
FIG. 11 is a circuit diagram of an example reconfigurable matching circuit for the antenna of FIG. 3A.

FIG. 11 is a circuit diagram of an example reconfigurable matching circuit 1100 for antenna 302 of FIG. 3A. Antenna 302 paired with matching circuit 1100 may be referred to as antenna system 1150 and configured to cover various frequency ranges between 470 and 800 MHz, for example. Matching circuit 1100 may provide a highly-flexible implementation for reconfiguring a matched circuit for different sub-bands.

In the implementation of FIG. 11, matching circuit 1100 includes four single-pole, quadruple-throw (SP4T) switches to either include or exclude components. These switches provide a short circuit to pass the relevant RF frequency signals (such as 470-800 MHz) through the switch with little or no loss (such as approximately 0.5 dB insertion loss). The switches also provide an open circuit to exclude adjacent components from antenna system 1150. The state of a switch may be determined by controller 212, with the four states commanding the switch to be closed in one of four different possibilities and open in the remaining three. Radio 200 (see FIG. 2) may correspond to radio system 1150. As such, antenna 207 may include antenna 302; FEM 206-x may include matching circuit 1100; and switches SPST may be controlled over bus 203 by controller 212 (see FIG. 2). The topology of matching circuit 1100 (including single-pole, quadruple-throw switches as compared to matching circuit 1000) may provide simpler switch control logic implementations (e.g. fewer logic lines) by controller 212, for example.

Matching circuit 1100 includes eight components connected between antenna 302 and ground: four capacitors C1-11, C2-11, C3-11, and C4-11 and four inductors L2-11, L3-11, L4-11, and L5-11. One of the four capacitors (C1-11, C2-11, C3-11, or C4-11) can be switched into antenna system 1150 by controller 212 commanding switch SP4T 3-11, while the remaining three capacitors are switched out of antenna system 1150. One of the three inductors (L2-11, L3-11, L4-11, or L5-11) can be switched into antenna system 1150 by switch SP4T 2, while the remaining three inductors are switched out of antenna system 1150.

Matching circuit 1100 also includes four components connected between antenna 302 and port 1110: two capacitors C5-11 and C6-11 and two inductors L1-11 and L6-11. One of these components (C5-11, C6-11, L1-11, or L6-11) can be switched into antenna system 1150 by controller 212 commanding switches SP4T 1-11 and SP4T 4-11, while the remaining three components are switched out of antenna system 1150. These components (C5-11, C6-11, L1-11, and L6-11) are each in the RF signal path as each is connected between antenna 302 and port 1110.

Matching circuit 1100 may provide an alternative implementation of the same reconfigurable matching circuit as circuit 1000, offering the same degrees of matching flexibility with respect to circuit topology, but using four switches rather than fifteen. Matching circuit 1100 employs four single-pole quadruple-throw (SP4T) switches. The topology of matching circuit 1100 may provide simpler switch control logic implementations (e.g. fewer logic lines) for controller 212. In this implementation, each switch SP4T allows one of four states to be used at a time. In this implementation, parallel combinations of inductors L2-11, L3-11, L5-11 and L4-11 (for shunting to ground) are not supported because only one of inductors L2-11, L3-11, L4-11, and L5-11 can be selected at a time. Likewise, parallel combinations of capacitors C1-11, C2-11, C3-11, and C4-11 (for shunting to ground) are not supported because only one of capacitors C1-11, C2-11, C3-11, and C4-11 can be selected at a time.

The component values in matching circuit 1100 may correspond to the component values in matching circuits 500, 600, 800, and 900. As such, adjustable matching circuit 1100 may be configured to correspond any of matching circuits 500, 600, 800, or 900. For example, with respect to shunt component values: capacitor C4-11 may be 17.1 pF (see matching circuit 600), capacitor C1-11 may be 11.5 pF (see matching circuit 800), capacitor C3-11 may be 19.1 pF (see matching circuit 900), and capacitor C2-11 may be absent (see matching circuit 500), inductor L2-11 may be 11.51 nH (see matching circuit 500, i.e., the parallel combination of L3-5 and L2-5), inductor L3-11 may be 4.24 nH (see matching circuit 600), inductor L5-11 may be 4.29 nH (see matching circuit 800), and inductor L4-11 may be 2.32 nH (see matching circuit 900). With respect to other component values: capacitor C6-11 may be 51 pF (see matching circuit 800), capacitor C5-11 may be 5.02 pF (see matching circuit 900), inductor L1-11 may be 22 nH (see matching circuit 500), and inductor L6-11 may be 13.7 nH (matching circuit 600).

Figure 12:
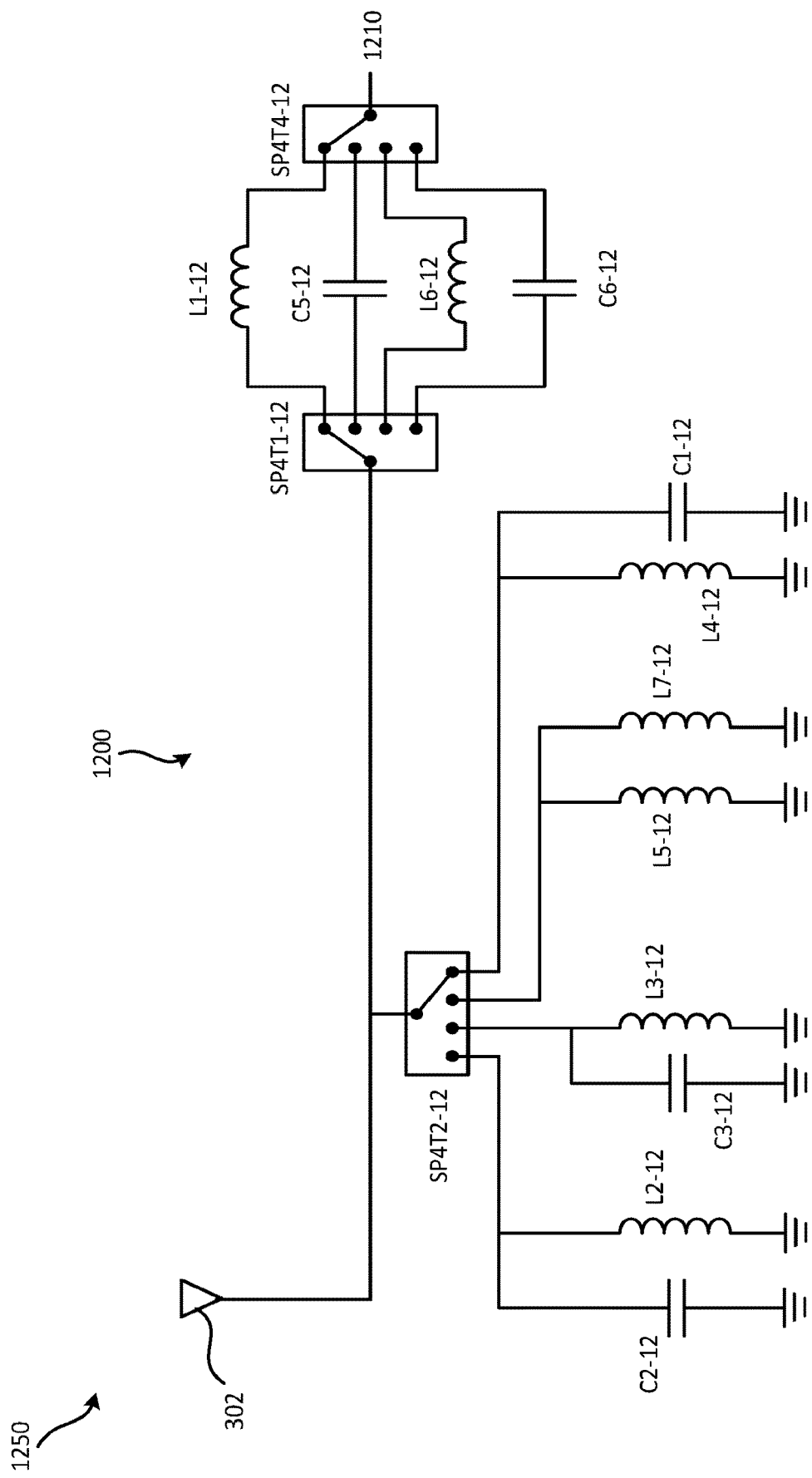
FIG. 12 is a circuit diagram of an example reconfigurable matching circuit for the antenna of FIG. 3A.

FIG. 12 is a circuit diagram of an example reconfigurable matching circuit 1200 for antenna 302 of FIG. 3A. Antenna 302 paired with matching circuit 1200 may be referred to as antenna system 1250 and configured to cover frequency ranges between 470 and 800 MHz, for example. Matching circuit 1200 may provide a highly-flexible implementation for reconfiguring a matched circuit for different sub-bands.

In the implementation of FIG. 12, matching circuit 1200 includes three single-pole, quadruple-throw (SP4T) switches to either include or exclude components. These switches provide a short circuit to pass the relevant RF frequency signals (such as 470-800 MHz) through the switch with little or no loss (such as approximately 0.5 dB insertion loss). The switches also provide an open circuit to exclude an adjacent component from antenna system 1250.

Radio 200 (see FIG. 2) may correspond to radio system 1250. As such, antenna 207 may include antenna 302; FEM 206-x may include matching circuit 1200; and switches SPST may be controlled over bus 203 by controller 212 (see FIG. 2). The state of a switch in matching circuit 1200 may be determined by controller 212, with the four states commanding the switch to be closed in one of four different possibilities and open in the remaining three. This topology (including single-pole, quadruple-throw switches) may provide simpler switch control logic implementations (e.g. fewer logic lines) by controller 212, for example, as compared to matching circuit 1000.

Matching circuit 1200 includes four pairs of components connected between antenna 302 and ground: a capacitor C2-12 and an inductor L2-12, a capacitor C3-12 and an inductor L3-12, two inductors L5-12 and L7-12, and a capacitor C1-12 and an inductor L4-12. One pair (of the four pairs) of components can be switched into antenna system 1250 by controller 212 commanding switch SP4T 2-12, while the remaining three pairs of components are switched out of antenna system 1250.

Matching circuit 1200 also includes four components connected between antenna 302 and port 1210: two capacitors C5-12 and C6-12 and two inductors L1-12 and L6-12. One of these components (C5-12, C6-12, L1-12, or L6-12) can be switched into antenna system 1250 by controller 212 commanding switches SP4T 1-12 and SP4T 4-12, while the remaining three components are switched out of antenna system 1250. These components (C5-12, C6-12, L1-12, and L6-12) each is connected in the RF signal path between antenna 302 and port 1210.

Reducing the number of switches (such as in matching circuit 1200) can reduce the cost of circuitry (fewer switches) as well as reduce the complexity (such as reducing the number of control states for controller 212).

The component values in matching circuit 1200 may correspond to the component values in matching circuits 500, 600, 800, and 900. As such, adjustable matching circuit 1100 may be configured to correspond any of matching circuits 500, 600, 800, or 900. For example, with respect to shunt component values: inductor L5-12 may be 55.9 nH and L7-12 may be 14.5 nH (see matching circuit 500); inductor L2-12 may be 4.24 nH and capacitor C2-12 may be 17.1 pF (see matching circuit 600); capacitor C3-12 may be 11.5 pF and inductor L3-12 may be 4.29 nH (see matching circuit 800); inductor L4-12 may be 2.32 nH and capacitor C4-12 may be 19.1 pF (see matching circuit 900). With respect to other component values: capacitor C5-12 may be 51 pF (see matching circuit 800), capacitor C6-12 may be 5.02 pF (see matching circuit 900), inductor L1-12 may be 22 nH (see matching circuit 500), and inductor L6-12 may be 13.7 nH (matching circuit 600).

Figure 13:
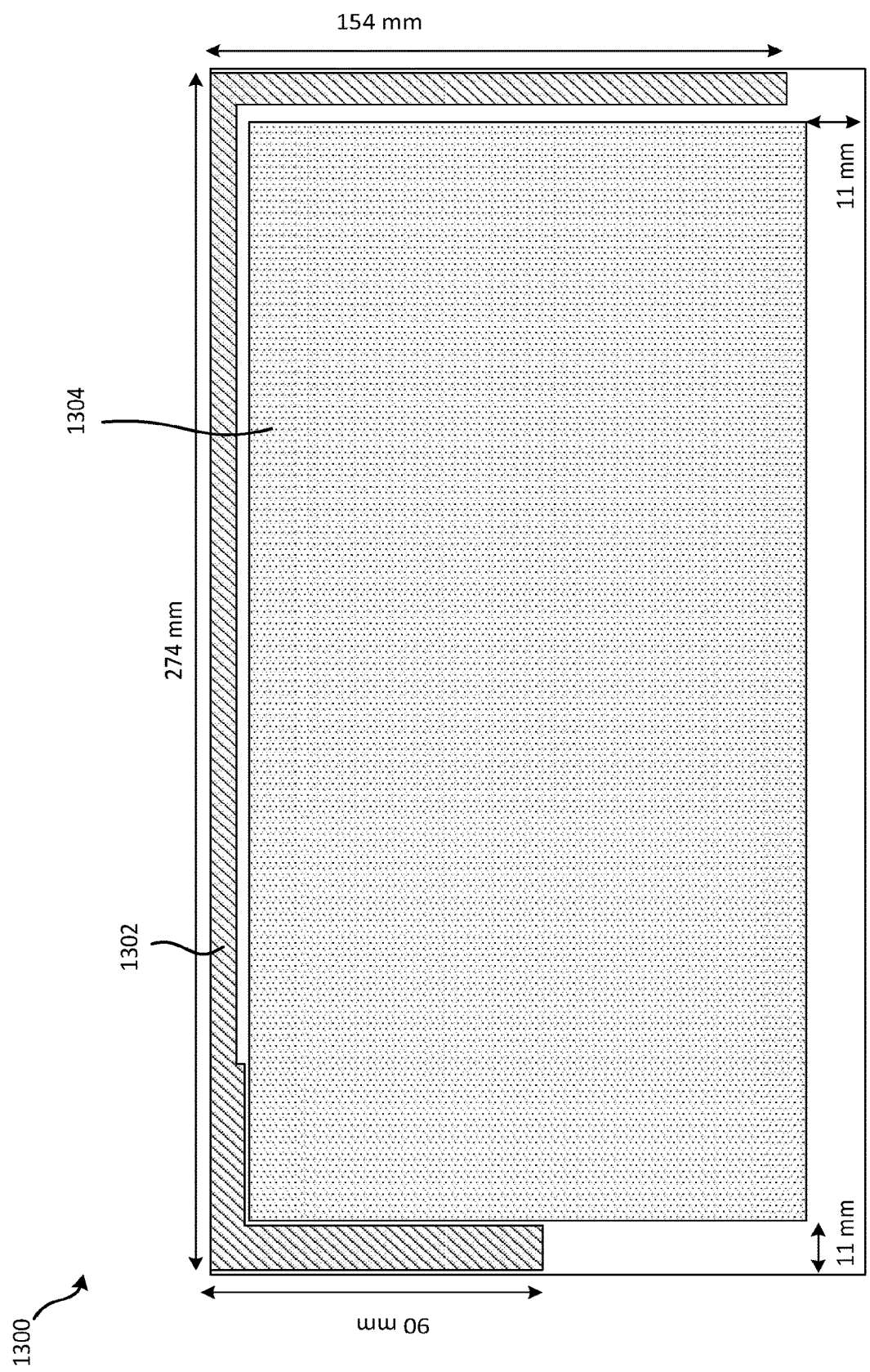
FIG. 13 is a block diagram of an example antenna within a bezel of a tablet computer.

As noted, different configurations or form factors of antenna 302 are possible (i.e., other than a USB stick form factor). For example, FIG. 13 is a block diagram of an example antenna 1302 within a bezel of a tablet computer 1300. Antenna 1302 may correspond to antenna 207 in radio 200, for example. Antenna 1302 may be suited for bezel 1306 of tablet computer 1300, particularly for TVWS frequencies. Antenna 1302 can be integrated into tablet computer 1300 without compromising industrial design requirements (such as fitting in the bezel area). In one implementation described below, antenna 1302 may be fit into a bezel width of 11 mm or 7 mm. Many other implementation options are possible, with the complexity of controller 212 potentially increasing with the reduction of the size of antenna 1302.

Tablet 1300 may have an area of approximately 154 mm by 274 mm with a bezel width of approximately 11 mm. If the size of antenna 1302 were not constrained, then antenna 1302 could range from 159 mm (quarter wavelength corresponding to 470 MHz) to 94 mm (quarter wavelength corresponding to 790 MHz). The size of antenna 1302, however, is constrained to the size of edge of tablet 1300. In this case, antenna 1302 may travel the periphery of tablet 1300 and be approximately 518 mm (90 mm+274 mm+154 mm) in length. In the form factor of a small tablet or phone, antenna 207-x may be 200 mm. In one implementation, antenna 1302 may be associated with its own ground plane 1304 approximately the size of tablet 1300.

Tablet 1300 is example and may include additional, fewer, or a different arrangement of components. The dimensions of antenna 1302, tablet 1300, and ground plane 1304 are exemplary and other dimensions are possible.

Just as with antenna 302, the size and shape of antenna 1302 may make it less than ideal to operate over the TVWS frequency range (470-790 MHz). Antenna 1302 may also be paired with a matching circuit to improve the performance of tablet 1300 for TVWS frequencies and particular TVWS sub-bands. FIGS. 14A, 15A, 16A, and 17A show antenna 1302 paired with different matching circuits 1400, 1500, 1600, and 1700 for tuning to four different sub-bands in the 470-790 MHz TVWS range. These sub-bands include 470-550 MHz (for matching circuit 1400 of FIG. 14A), 550-630 MHz (for matching circuit 1500 of FIG. 15A), 630-730 MHz (for matching circuit 1600 of FIG. 16A), and 730-790 MHz (for matching circuit 1700 of FIG. 17A). These sub-bands (and matching circuits) described below are exemplary and other sub-bands and matching circuits are possible. Matching circuits 1400, 1500, 1600, and 1700 may each correspond to matching circuit 254 shown in FIG. 2B.

Figure 14A:
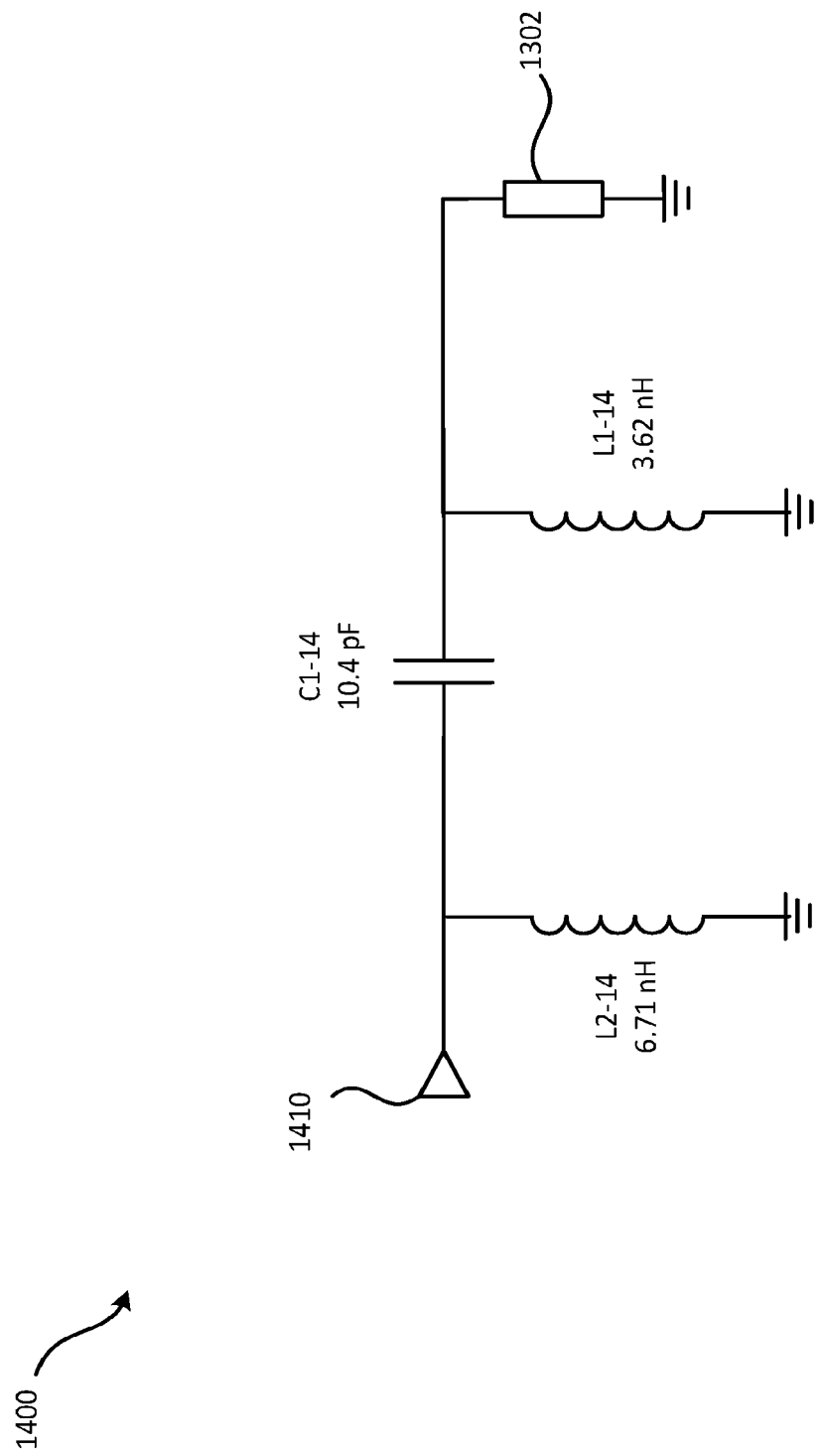
FIG. 14A is a circuit diagram an example matching circuit for the antenna of FIG. 13.
Figure 14B:
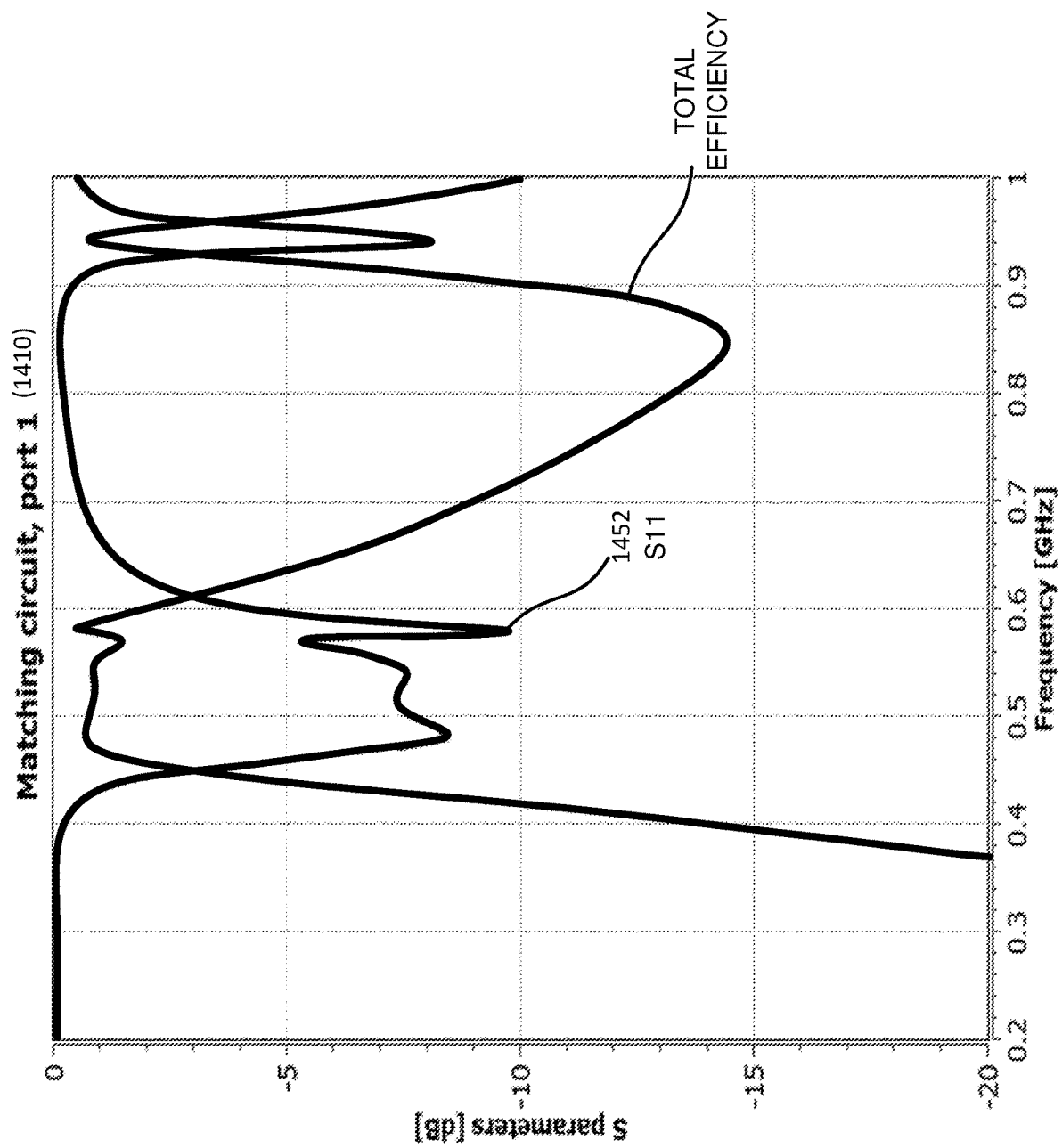
FIG. 14B is a plot of the return loss of the antenna of FIG. 13 paired with the matching circuit of FIG. 14A.

FIG. 14A is an example matching circuit 1400 for antenna 1302 of FIG. 13. FIG. 14B is a plot of the return loss 1452 (over the sub-band of 470-550 MHz) of antenna 1302 paired with matching circuit 1400. As demonstrated in FIG. 14B, matching circuit 1400 paired with antenna 1302 is suitable for the 470-550 MHz frequency range. In matching circuit 1400, inductor L1-14 is 3.62 nH, inductor L2-14 is 6.71 nH, and capacitor C1-14 is 10.4 pF.

Figure 15A:
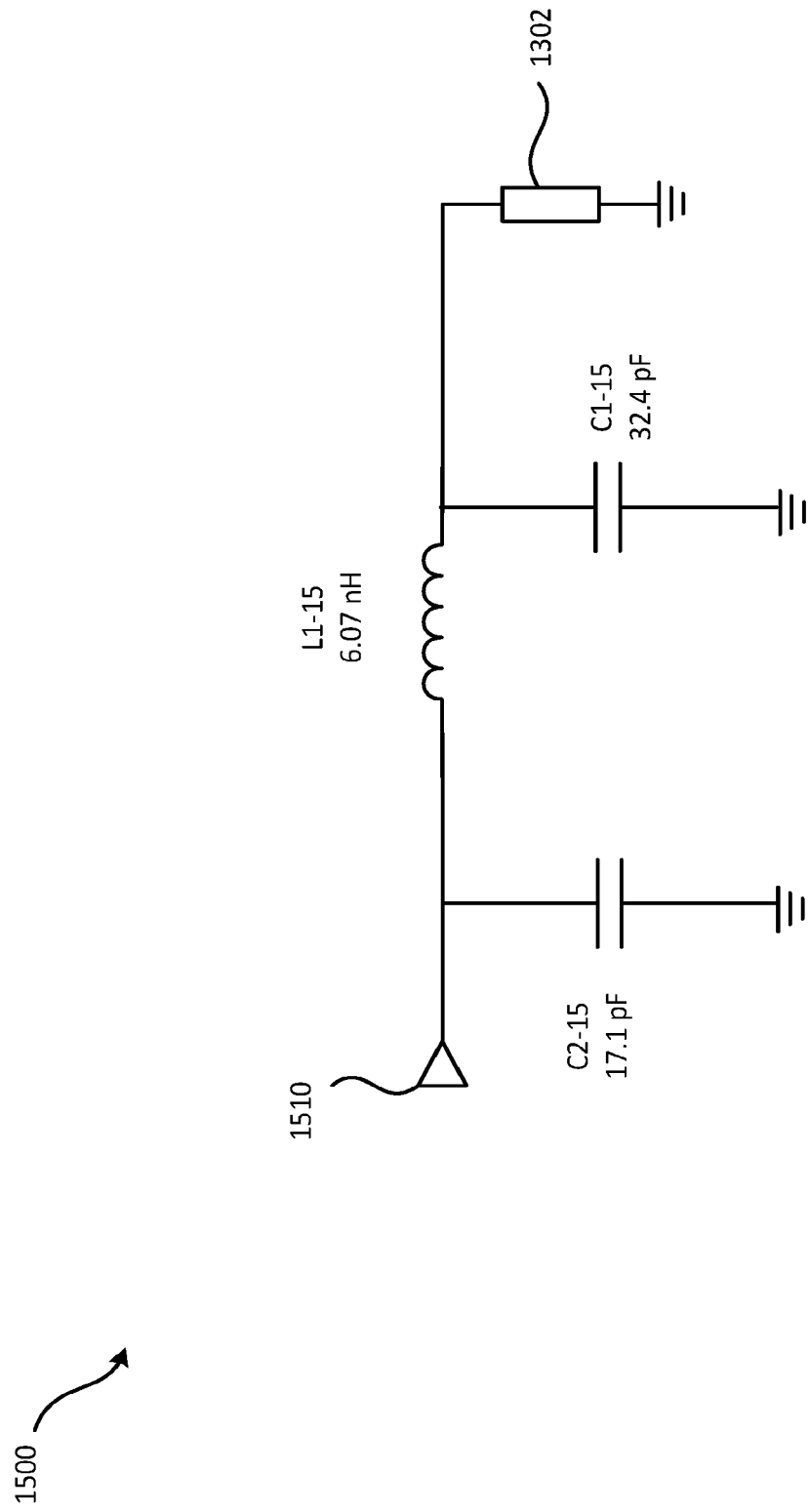
FIG. 15A is a circuit diagram of an example matching circuit for the antenna of FIG. 13.
Figure 15B:
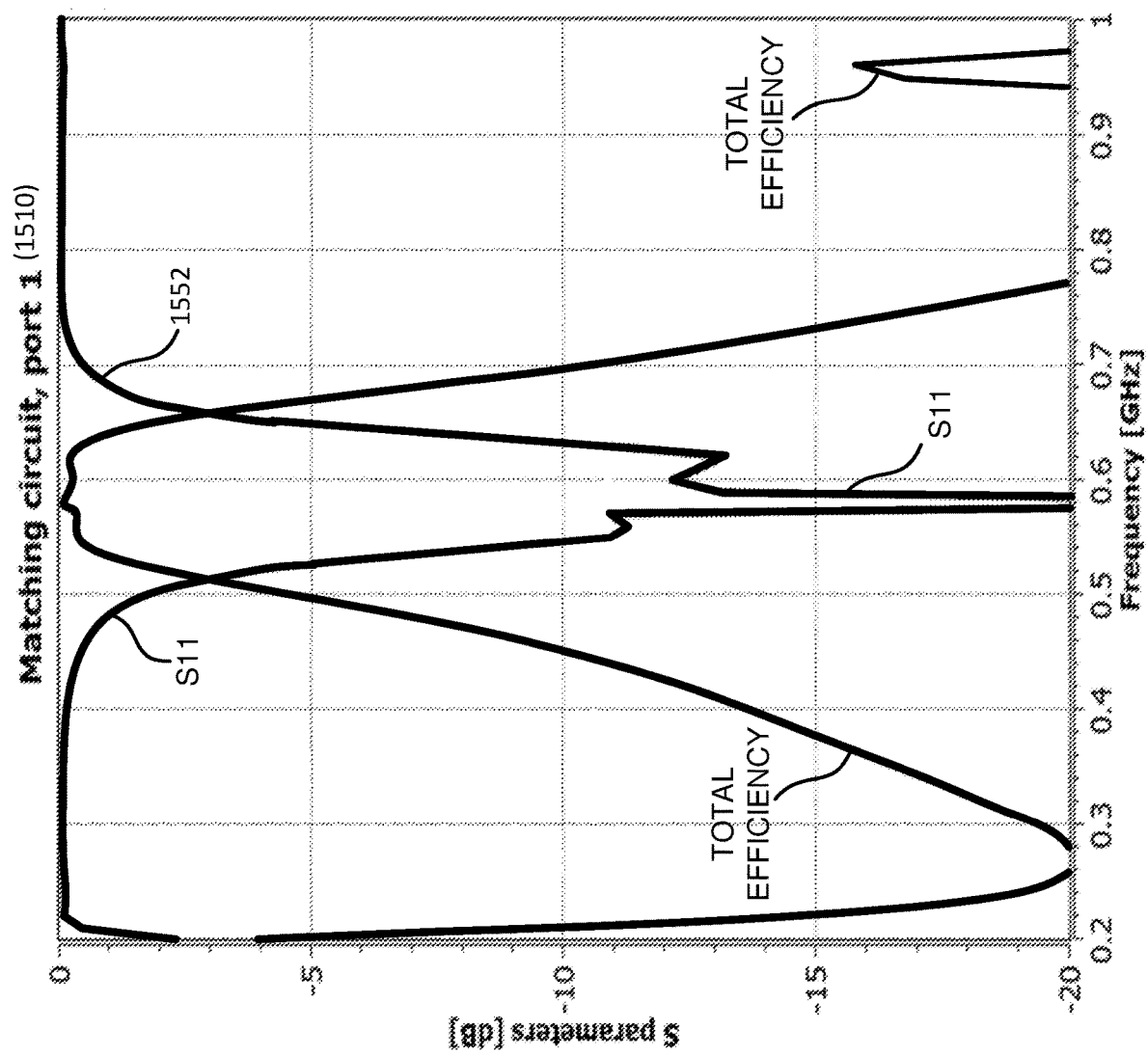
FIG. 15B is a plot of the return loss of the antenna of FIG. 13 paired with the matching circuit of FIG. 15A; 1500.

FIG. 15A is an example matching circuit 1500 for antenna 1302 of FIG. 13. FIG. 15B is a plot of the return loss 1552 (over the sub-band of 550-630 MHz) of antenna 1302 paired with matching circuit 1500. As demonstrated in FIG. 15B, matching circuit 1500 paired with antenna 1302 is suitable for the 550-630 MHz frequency range. In matching circuit 1500, inductor L1-15 is 6.07 nH, capacitor C1-15 is 32.4 pF, and capacitor C2-15 is 17.1 pF.

Figure 16A:
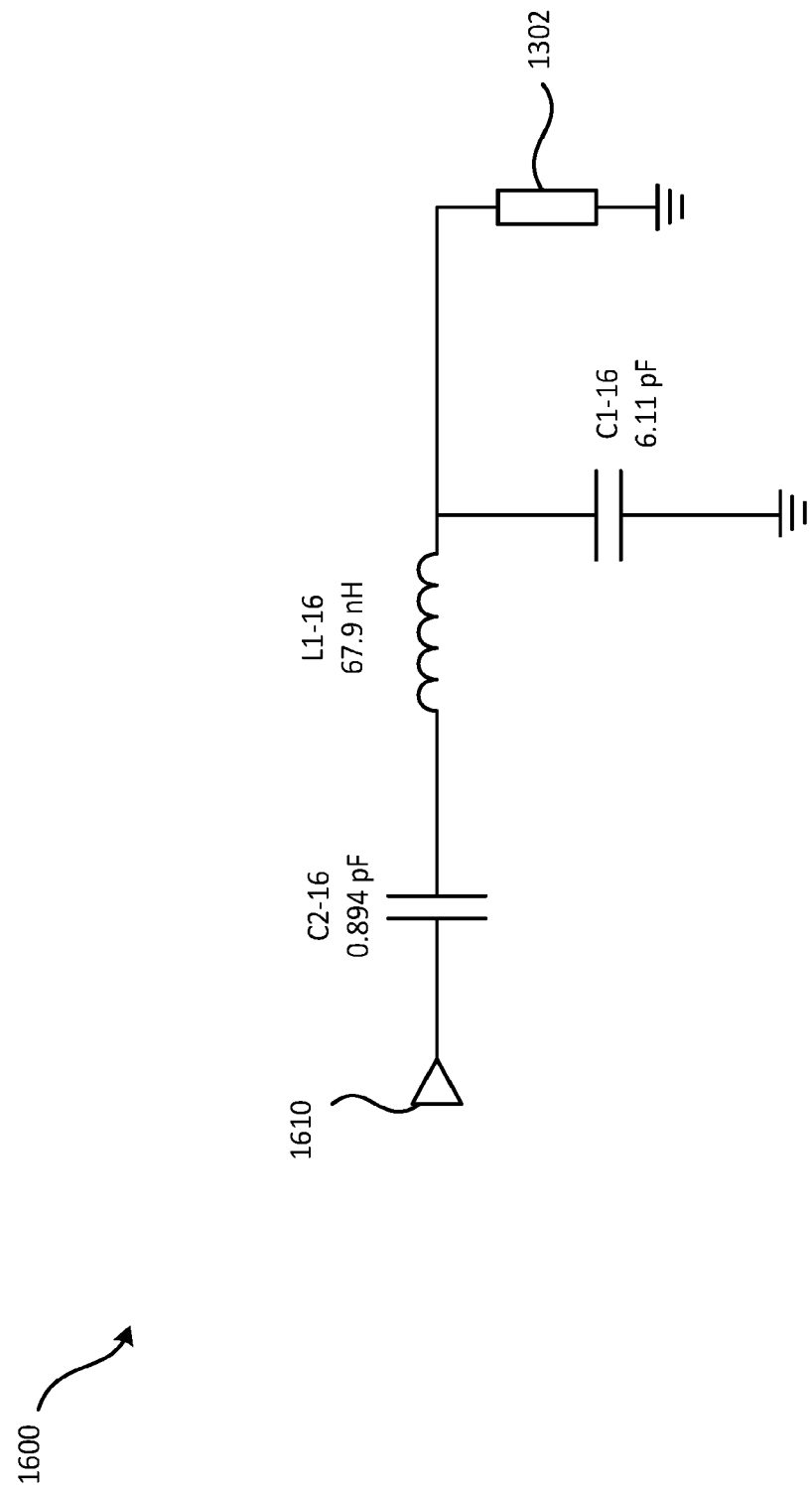
FIG. 16A is a circuit diagram of an example matching circuit for antenna of FIG. 13.
Figure 16B:
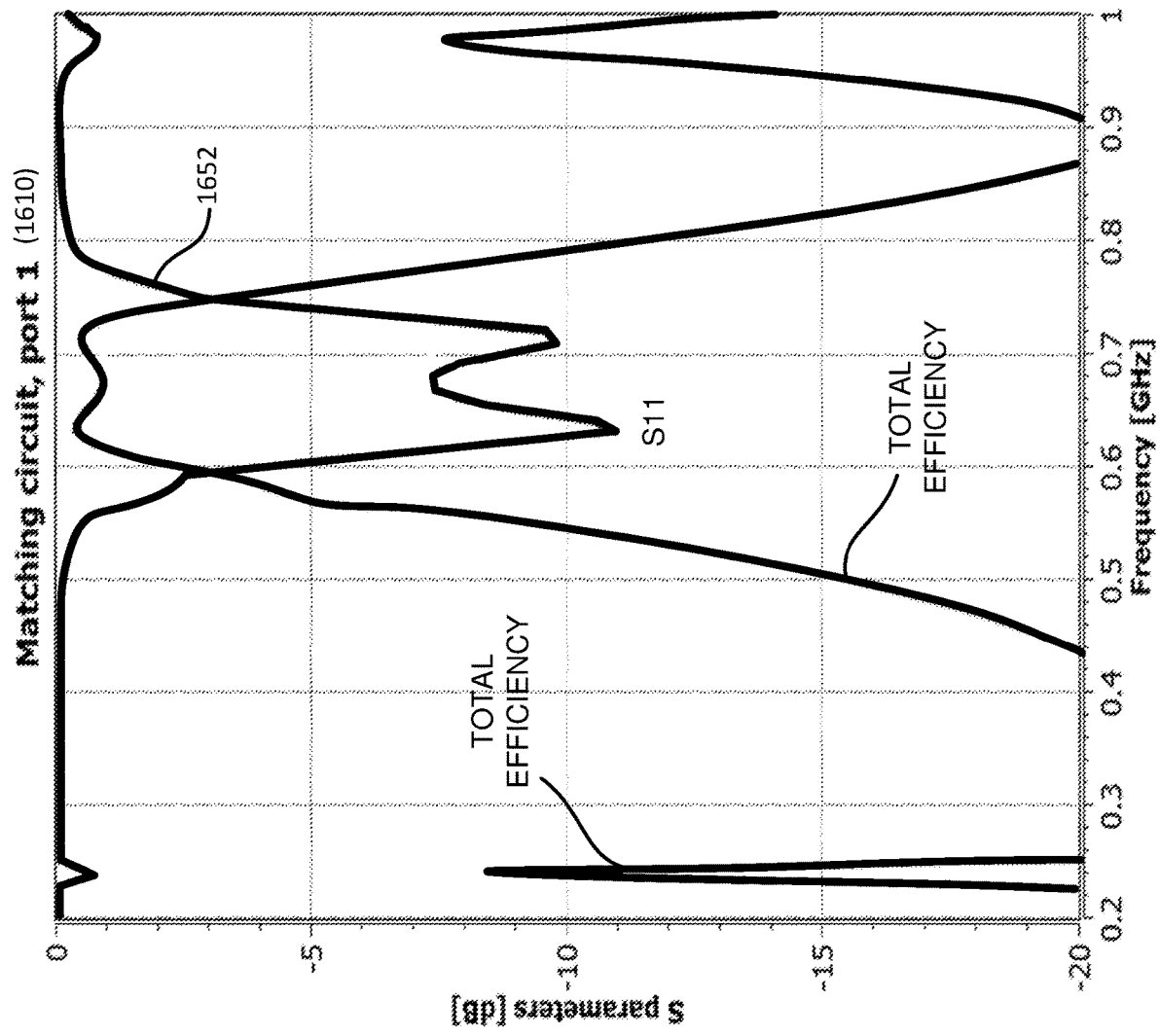
FIG. 16B is a plot of the return loss of the antenna of FIG. 13 paired with the matching circuit of FIG. 16A.

FIG. 16A is an example matching circuit 1600 for antenna 1302 of FIG. 13. FIG. 16B is a plot of the return loss 1652 (over the sub-band of 630-730 MHz) of antenna 1302 paired with matching circuit 1600. As demonstrated in FIG. 16B, matching circuit 1600 paired with antenna 1302 is suitable for the 630-730 MHz frequency range. In matching circuit 1600, inductor L1-16 is 67.9 nH, capacitor C1-16 is 6.11 pF, and capacitor C2-16 is 0.894 pF.

Figure 17A:
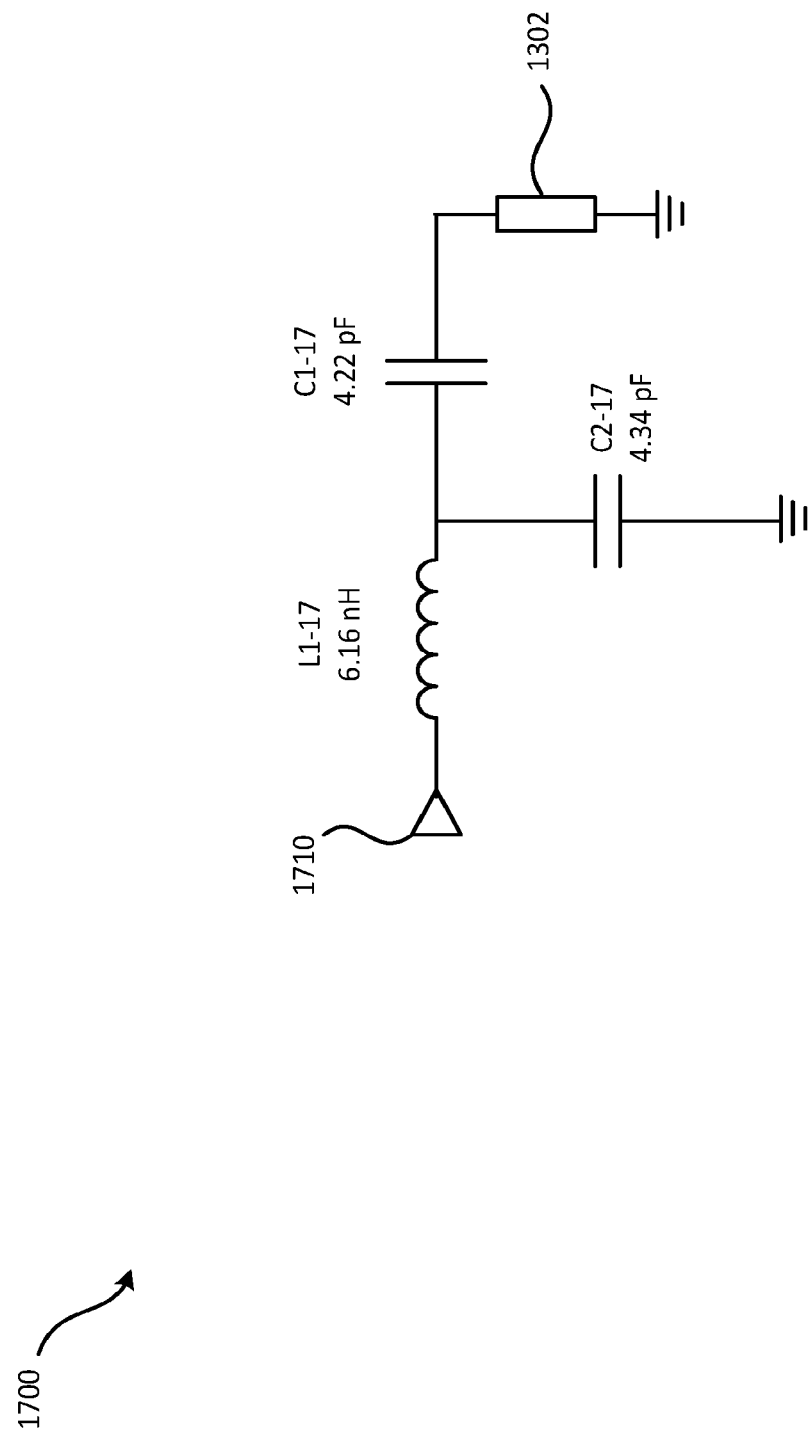
FIG. 17A is a circuit diagram of an example matching circuit for antenna of FIG. 13.
Figure 17B:
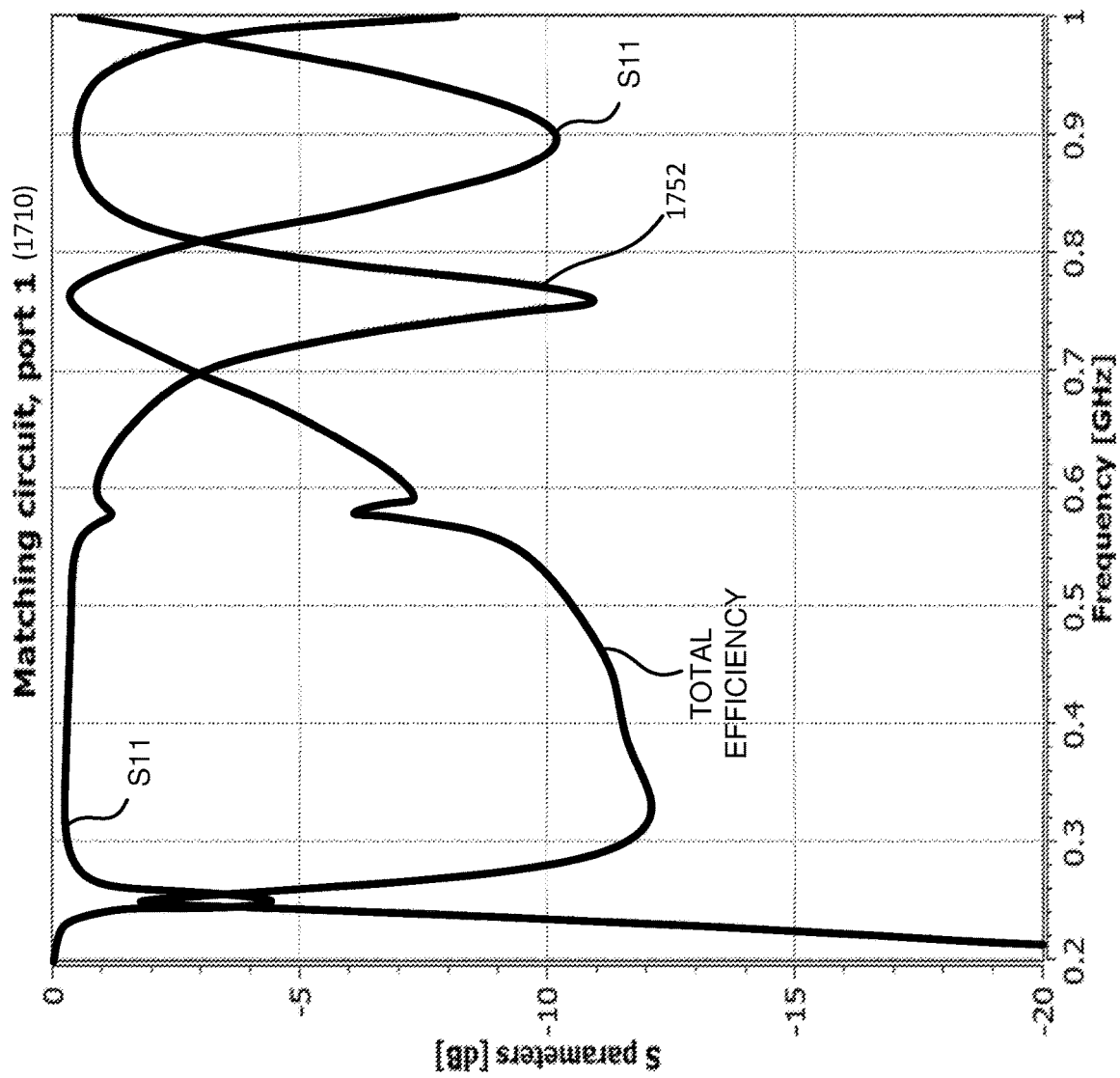
FIG. 17B is a plot of the return loss of the antenna of FIG. 13 paired with the matching circuit of FIG. 17A.

FIG. 17A is an example matching circuit 1700 for antenna 1302 of FIG. 13. FIG. 17B is a plot of the return loss 1752 (over the sub-band of 730-790 MHz) of antenna 1302 paired with matching circuit 1700. As demonstrated in FIG. 17B, matching circuit 1700 paired with antenna 1302 is suitable for the 730-790 MHz frequency range. In matching circuit 1500, inductor L1-17 is 6.16 nH, capacitor C1-17 is 4.22 pF, and capacitor C2-17 is 4.34 pF.

As shown in FIGS. 14A through 17B, four different matching circuits are suited for the antenna of FIG. 13 for different TVWS frequency ranges. Matching circuits 1400, 1500, 1600, and 1700 can be amalgamated into a single, broadband antenna matching solution using switches such as those shown as matching circuit 1000, 1100, or 1200.

FIGS. 4A through 12 and FIGS. 14A to 17B relate to matching circuits 254 paired with different antennas 207 (such as antenna 302 and/or antenna 1302). As noted, matching circuit 254 may itself be paired with a bandpass filter 252. FIGS. 18A through 25 relate to examples of bandpass filters 252.

A TV channel may have a bandwidth of 6 MHz bandwidth, such as for an ATSC broadcast signal. In other instances, a TV channel may have a bandwidth of up to 8 MHz (depending, for example, on geography and broadcast standard). Bandpass filter 252 enables low amplitude desired signals in the passband to be "heard" (passed through relatively unimpeded) while substantially rejecting (or attenuating) out-of-band signals (even of large amplitude). Implementations disclosed herein, for use in a TVWS application, allows passband signals to be heard and offers stopband rejection appropriate to enable an interference-resistant system.

One challenge for bandpass filter 252 with narrow passbands and good stopband rejection (a high Q filter) is the desire for low-loss filter components and tight component tolerances. Discrete components coupled to an IC of FEM 206-*x* potentially offer better narrow passband and aggressive stopband performance (as compared to components within an IC) and generally offer higher Q filters. In other words, discrete components may be better suited to meet narrow passband and aggressive stopband criteria. That is, smaller inductance values and/or smaller capacitance values, such as those found within an integrated circuit, may be less desirable (for Q value) in filter topologies.

Figure 18A:
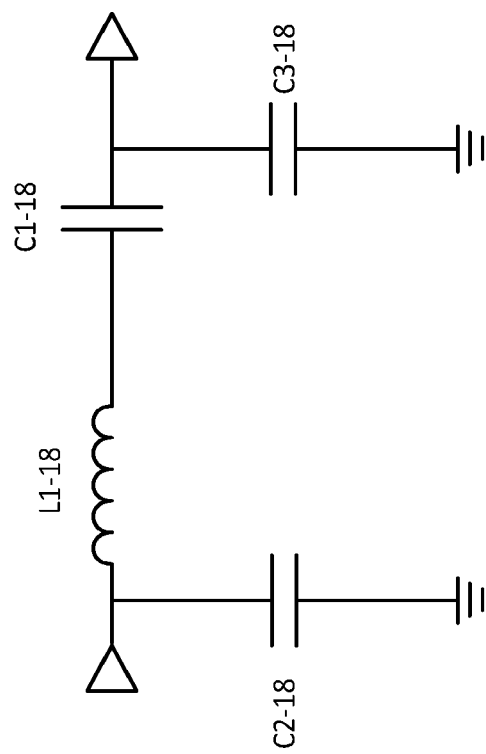
FIG. 18A is a circuit diagram of an example filter.

FIG. 18A is a circuit diagram of an example filter 1800 in one implementation. Filter 1800 may correspond, for example, to bandpass filter 252. Filter 1800 includes a shunt capacitor C2-18 between the input port and ground; and a shunt capacitor C3-18 between the output port and ground. Filter 1800 also includes an inductor L1-18 and a capacitor C1-18 between the input port and the output port. Filter 1800 is a fixed passband filter in that its components (in this implementation) are fixed. The topology and components of filter 1800 can be considered a "single-section" filter because it includes one stage (one inductor L1-18 and one capacitor C1-18) between the input and output without any intervening shunts to ground.

Figure 18B:
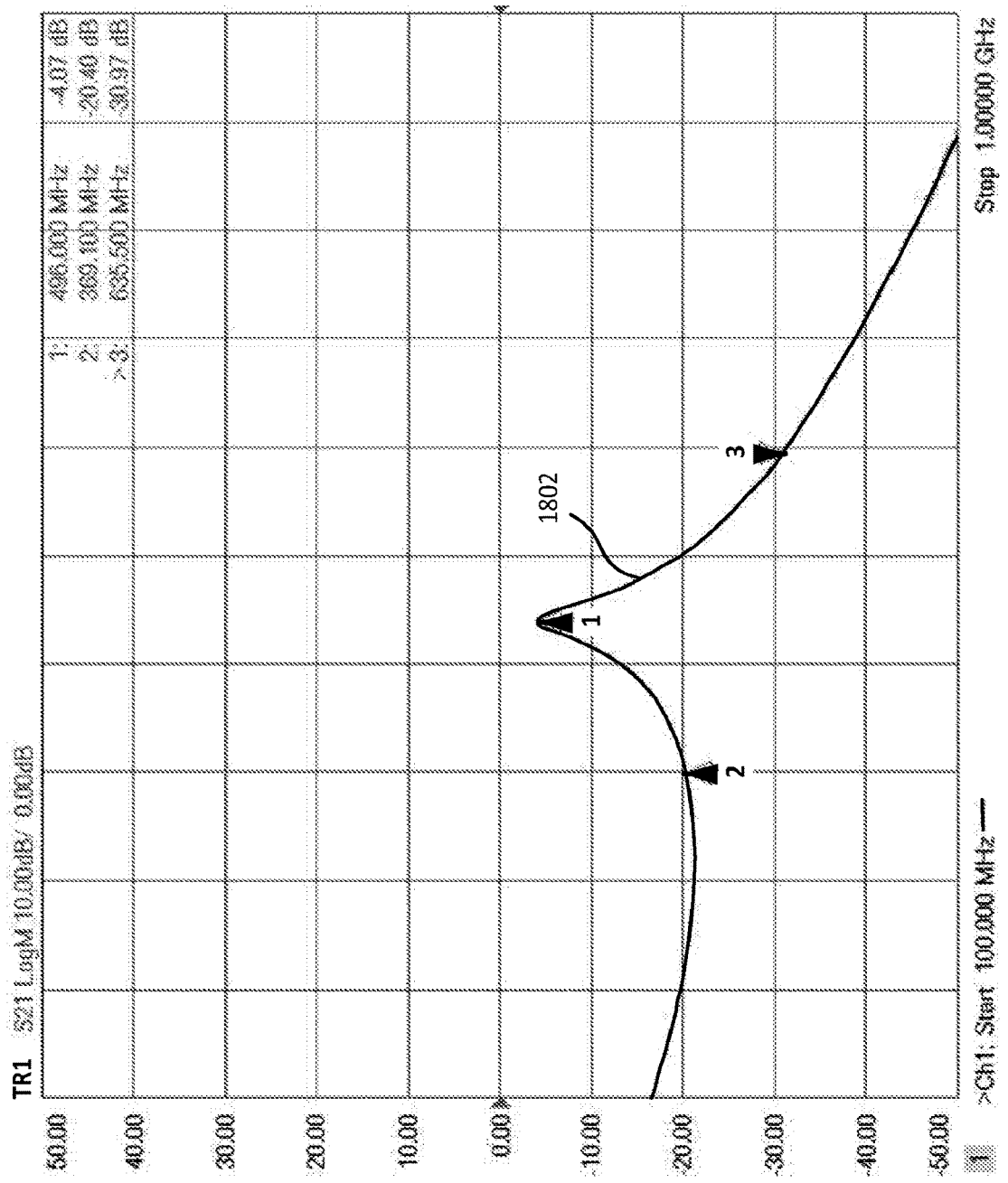
FIG. 18B is a plot of the frequency response of the filter of FIG. 18A.

FIG. 18B is a plot 1802 of the frequency response of filter 1800 of FIG. 18A. As shown, filter 1800 has an insertion loss (relatively acceptable about 4 dB), but has a modest stopband rejection at some frequencies. For example, filter 1800 provides only about 16 dB of rejection at 400 MHz. That is, filter 1800 provides about 16 dB of rejection of an interfering signal at 400 MHz when the center frequency of the filter (center of the bandpass) is 496 MHz.

In one implementation, an additional 9.6 dB of rejection may be achieved at 400 MHz using filter 1800 in conjunction with an adaptive antenna matching circuit (such as matching circuits 1400, 1500, 1600, and/or 1700). That is, the antenna matching circuit provides an additional 9.6 dB of loss, which when combined with the rejection provided by filter 1800 is a total of 25.6 dB at 400 MHz. This additional rejection (provided by the matching antenna filter) is without having to increase the order of the filter, which can increase the insertion loss (at the desired frequency) and can increase the cost of manufacture.

Figure 19:
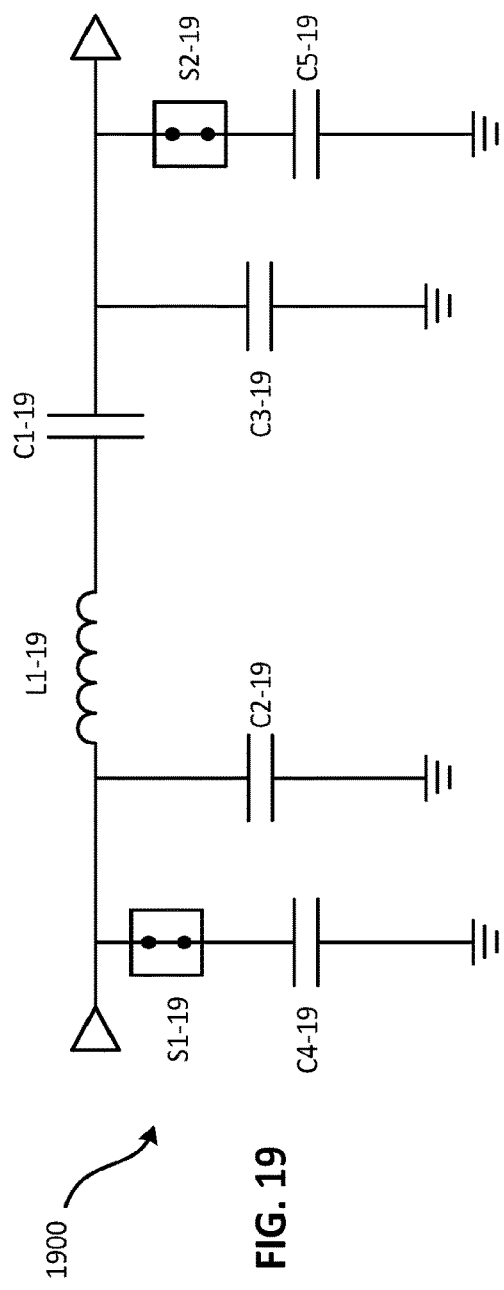
FIG. 19 is a circuit diagram of an example tunable single-stage filter.

FIG. 19 is a circuit diagram of an example tunable single-stage filter 1900 in another implementation. Filter 1900 may correspond, for example, to bandpass filter 252. Filter 1900 is like filter 1800 with the addition of switches S1-19 and S2-19 and capacitors C4-19 and C5-19. More specifically, filter 1900 (like filter 1800) includes a shunt capacitor C2-19 between the input port and ground; and a shunt capacitor C3-19 between the output port and ground. Filter 1900 (like filter 1800) also includes an inductor L1-19 and a capacitor C1-19 between the input port and the output port. Filter 1900 (unlike filter 1800) also includes a shunt capacitor C4-19, between the input port and ground, which can be switched into or out of the circuit by a switch S1-19. Filter 1900 (unlike filter 1800) includes a shunt capacitor C5-19, between the output port and ground, which can be switched into or out of the circuit by a switch S2-19. Filter 1900 (unlike filter 1800) is not a fixed passband filter because it has components (capacitors C4-19 and C5-19) that can be switched into or out of the circuit to change the passband. The topology of filter 1900 can also be considered a single-stage filter.

Switching either or both capacitors C4-19 and/or C5-19 will lower the center of the passband frequency of filter 1900. The value of capacitors and inductors can be chosen to suit the TVWS channel frequencies. In one implementation, capacitors C4-19 and/or C5-19 can be switched into the circuit by controller 212 commanding switches S1-19 and/or S2-19.

Figure 20:
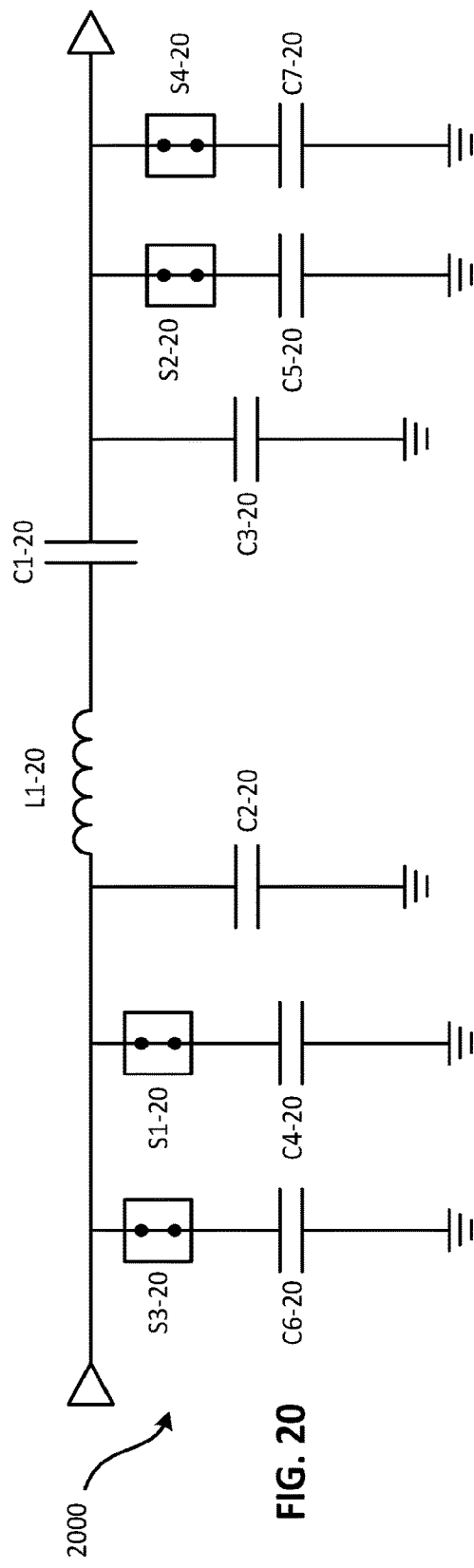
FIG. 20 is a circuit diagram of an example tunable single-section filter.

FIG. 20 is a circuit diagram of an example tunable single-section filter 2000 in another implementation. Filter 2000 may correspond, for example, to bandpass filter 252. Filter 2000 is like filter 1900 with the addition of switches S3-20 and S4-20 and capacitors C6-20 and C7-20. More specifically, filter 2000 (like filters 1800 and 1900) includes a shunt capacitor C2-20 between the input port and ground; and a shunt capacitor C3-20 between the output port and ground. Filter 2000 (like filters 1800 and 1900) also includes an inductor L1-20 and a capacitor C1-20 between the input port and the output port. Filter 2000 (like filter 1900) also includes a shunt capacitor C4-20, between the input port and ground, which can be switched into or out of the circuit by a switch S1-20. Filter 2000 (like filter 1900) includes a shunt capacitor C5-20, between the output port and ground, which can be switched into or out of the circuit by a switch S2-20. Filter 2000 (unlike filter 1900) also includes a shunt capacitor C6-20, between the input port and ground, which can be switched into or out of the circuit by a switch S3-20. Filter 2000 (unlike filter 1900) includes a shunt capacitor C7-20, between the output port and ground, which can be switched into or out of the circuit by a switch S4-20. Filter 2000 is not a fixed passband filter because it has components (capacitors C4-20, C5-20, C6-20, and C7-20) that can be switched into or out of the circuit to change the passband. The topology of filter 2000 can also be considered a single-stage filter.

Switching any of capacitors C4-20, C5-20, C6-20, and/or C7-20 will lower the center of the passband frequency of filter 2000. The value of capacitors and inductors can be chosen to suit the TVWS channel frequencies. Filter 2000 may offer more adaptability than filter 1900 because of the increase in options for switching in or out components. That is, the concept of filter 1900 can be expanded (as shown in filter 2000) to include many switched pairs of capacitors to extend the range of passband frequencies that can be addressed by a tunable filter. In one implementation, capacitors C4-20, C5-20, C6-20, and/or C7-20 can be switched into the circuit by controller 212 commanding switches S1-20, S2-20, S3-20, and/or S4-20.

Figure 21:
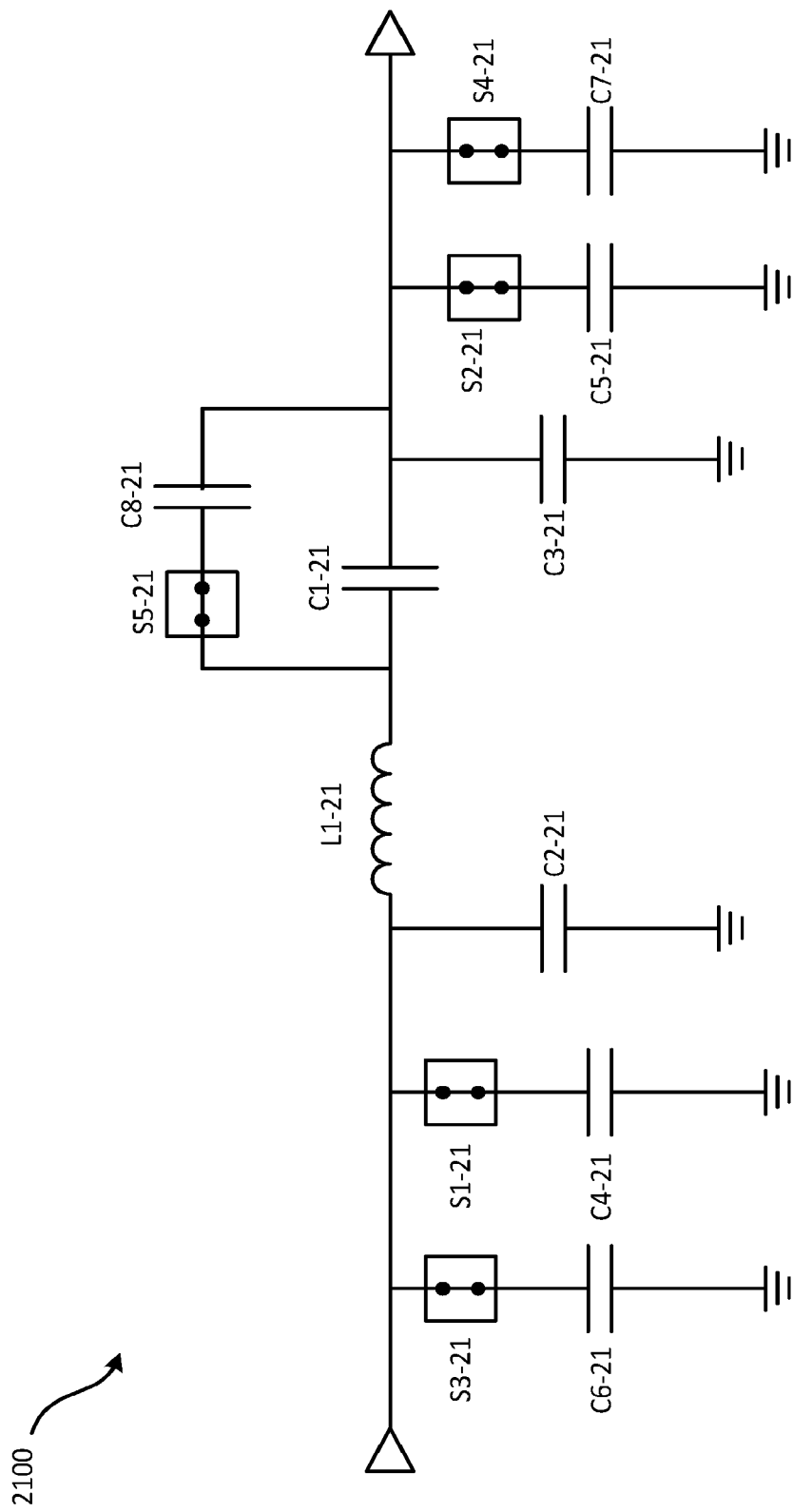
FIG. 21 is a circuit diagram of an example tunable single-section filter.

FIG. 21 is a circuit diagram of an example tunable single-section filter 2100 in another implementation. Filter 2100 may correspond, for example, to bandpass filter 252. Filter 2100 is like filter 2000 with the addition of switch S5-21 and capacitor C8-21. The filter response and center frequency (discussed with respect to filters 1900 and 2000) can be further adjusted by adding (by switch S5-21) one or more capacitors in parallel with capacitor C1-21. As shown with filter 2100, switch S5-21 can be toggled to insert or remove capacitor C8-21 from the circuit. In some implementations, two switches can be added (to each side of capacitor C8-21) to reduce parasitic effects from traces that would otherwise be permanently connected between capacitor C8-21 and capacitor C1-21. In one implementation, inductors may also be switched in parallel or series with the inductor L1-21. Switching in an inductor L1-21, as compared to switching capacitors, may be a less space efficient and increase insertion loss. In one implementation, capacitors C4-21, C5-21, C6-21, C7-21, and/or C8-21 can be switched into the circuit by controller 212 commanding switches S1-21, S2-21, S3-21, S4-21, and/or S5-21.

Figure 22:
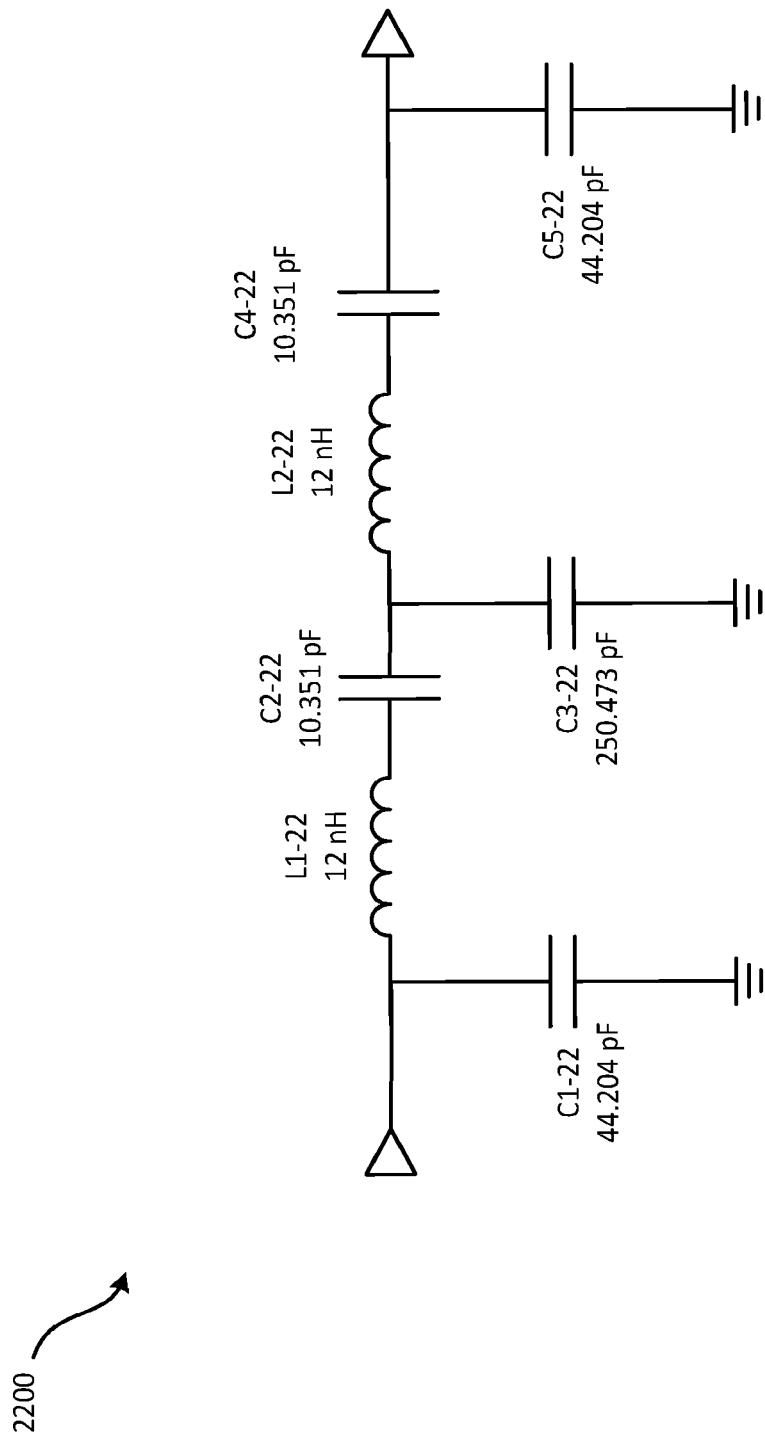
FIG. 22 is a circuit diagram of an example tunable two-section filter.

Higher-order (or higher-stage) filter topologies may deliver increased stopband rejection for applications that require this, at the cost of potentially increasing insertion loss at desired frequencies. FIG. 22 is a circuit diagram of an example tunable two-section filter 2200 in another implementation. Filter 2200 includes a capacitor C1-22 between the input port and ground; an inductor L1-22 and a capacitor C1-22 connected in series between the input port and a middle node; a capacitor C3-22 between the middle node and ground; an inductor L2-22 and a capacitor C4-22 connected in series between the middle node and the output port; and a capacitor C5-22 between the output port and ground. In this implementation, inductor L1-22 is 12 nH, capacitor C1-22 is 44.204 pF, capacitor C2-22 is 10.351 pf, inductor C3-22 is 250.473 pF, inductor L2-22 is 12 nH, capacitor C4-22 is 10.351 pF, and capacitor C5-22 is 44.204 pF.

Figure 23:
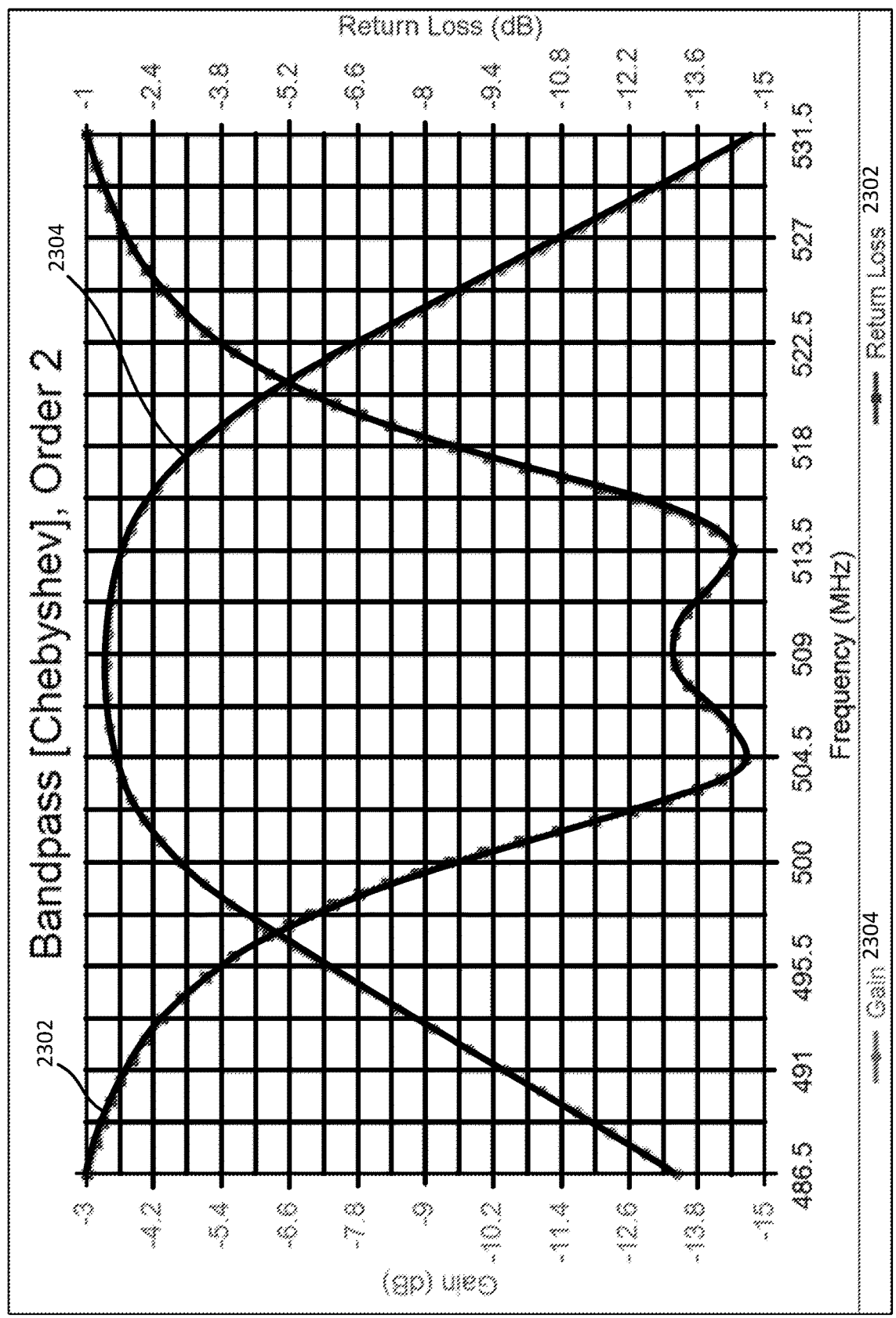
FIGS. 23 and 24 are plots of the gain and return loss of the bandpass filter of FIG. 22.
Figure 24:
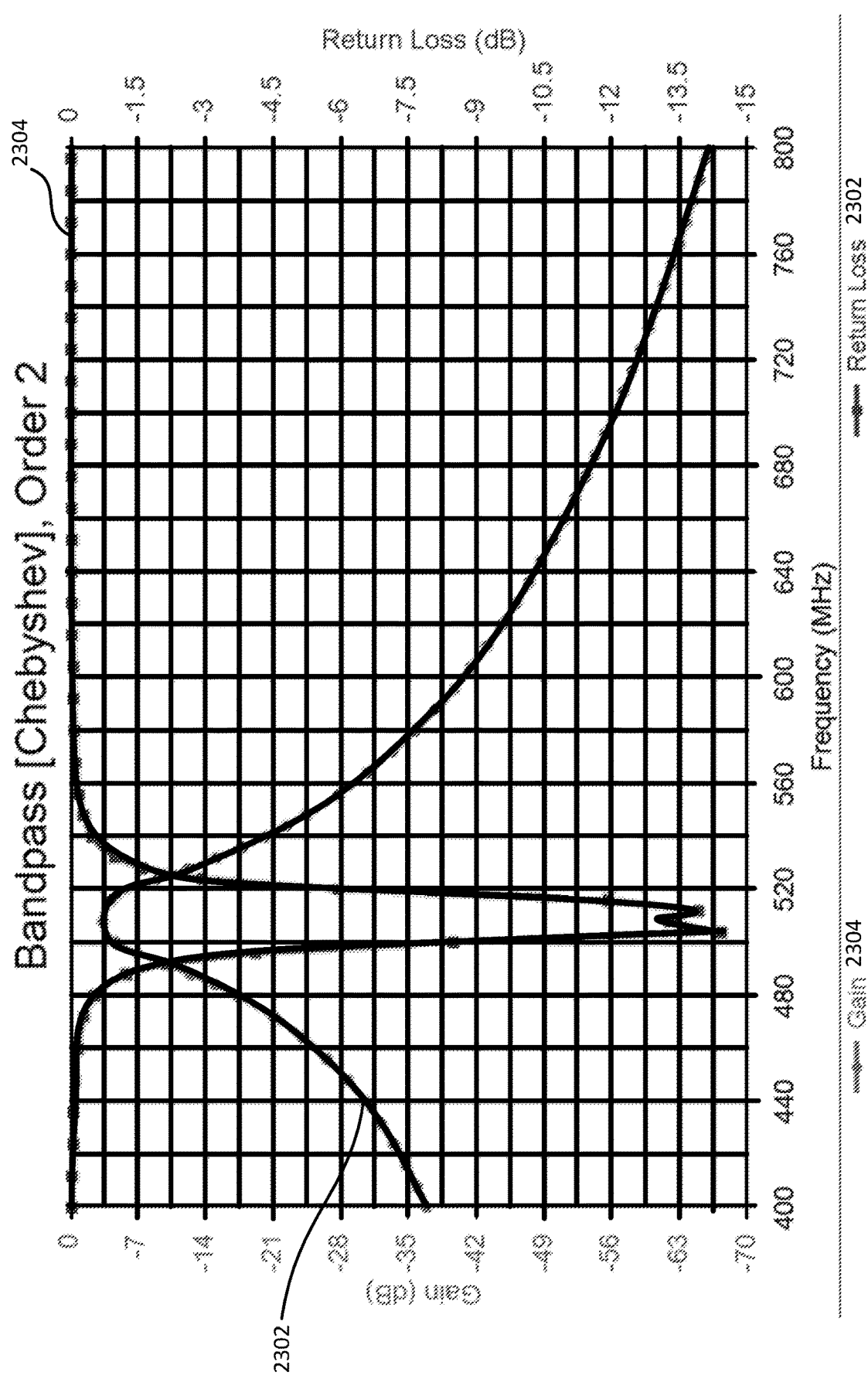

FIGS. 23 and 24 are plots of the gain 2304 and return loss 2302 of the bandpass filter 2200 of FIG. 22. Filter loss is influenced by component Q factor. Discrete inductors (used in the frequency range of 470-790 MHz and frequencies shown in FIGS. 23 and 24) and component values (as shown in filter 2200) are available with Q greater than 160. Bandpass filter 2200 can be fabricated using several approaches. For example, all components (capacitors, inductors, switches) may be discrete parts. Alternatively, inductors may be discrete (to achieve a higher Q than otherwise) and all capacitors and switches may be implemented on a silicon chip. In this case, pins and/or pads of the chip can be exposed on the silicon device to enable connection of the discrete external component to the chip. As another alternative, all components could be implemented in a silicon chip. In this case, the inductor Q values may be lower (as compared to discrete inductors) and insertion loss may be higher, but insertion loss of on-chip inductors may nonetheless meet application-specific goals.

Figure 25:
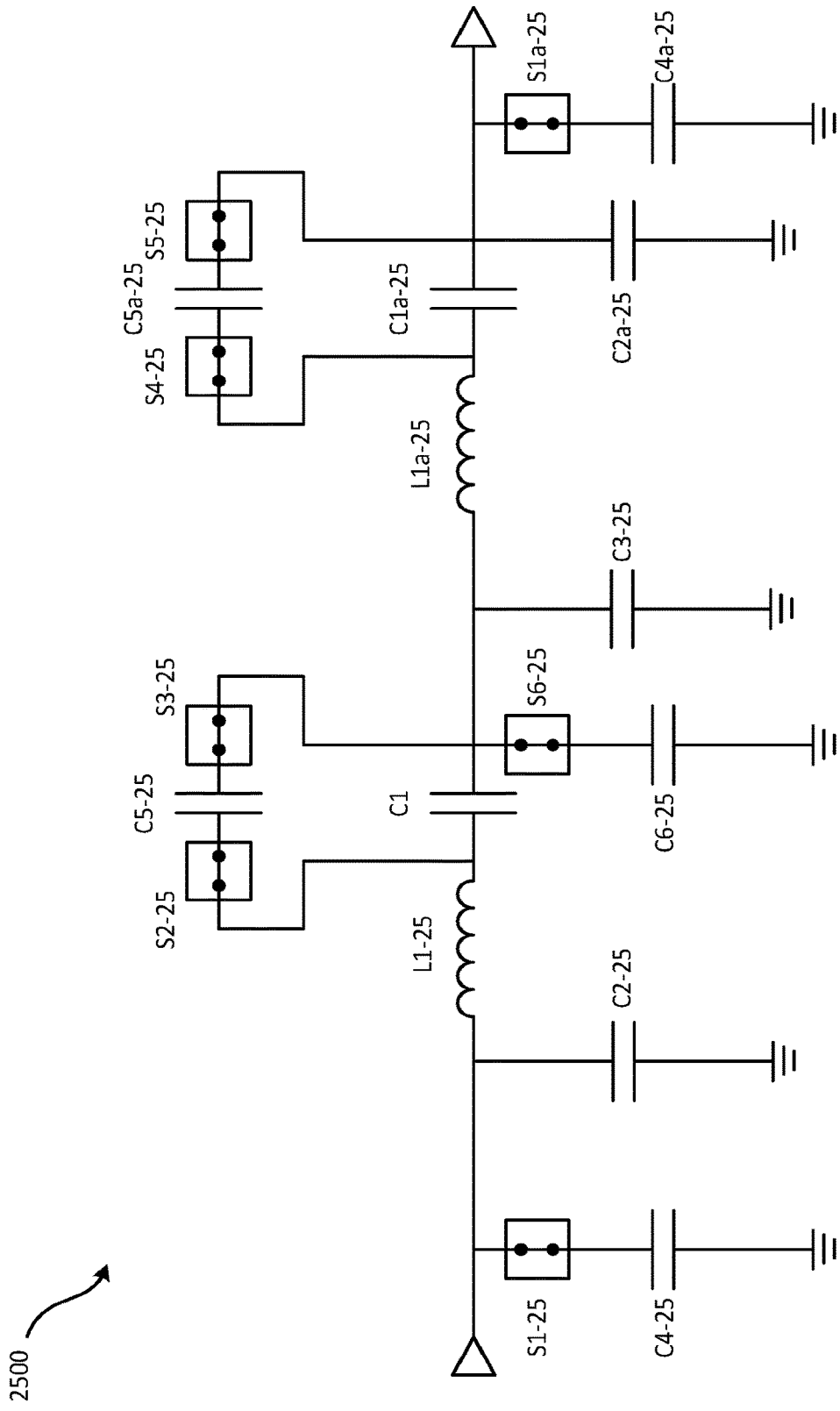
FIG. 25 is a circuit diagram of an example tunable two-section filter 2500.

Higher-order (or higher-stage) filter topologies can also be electronically tuned as illustrated in FIG. 25. FIG. 25 is a circuit diagram of an example tunable two-section filter 2500 in another implementation. Filter 2500 is like filter 2200 with the addition of a capacitor C4a-25 that can be switched into the circuit by switch S1a-25 to be in parallel to capacitor C2a-25; a capacitor C5-25 that can be switched into the circuit by switches S2-25 and S3-25 to be in parallel to capacitor C1-25; a capacitor C5a-25 that can be switched into the circuit by switches S4-25 and S5-25 to be in parallel to capacitor C1a-25; a capacitor C4-25 that can be switched into the circuit by switch 51 to be in parallel to capacitor C2-25; and a capacitor C6-25 that can be switched into the circuit by switch S6 to be in parallel to capacitor C3-25.

In a TVWS radio, bandpass filters may be deployed to mitigate interference in the received signal path. The insertion loss penalty for the bandpass may be tolerable on the received path, but may present problems for the transmit path when a single transmit/receive antenna interface approach is used in the radio modem. Problems that may be encountered with bandpass filter 252 in the transmit path may include the need to generate additional transmit power offset the insertion loss of filter, use of a larger than otherwise needed power amplifier (and a larger chip die), higher cost, and additional power consumption, and shortened battery life.

Figure 26:
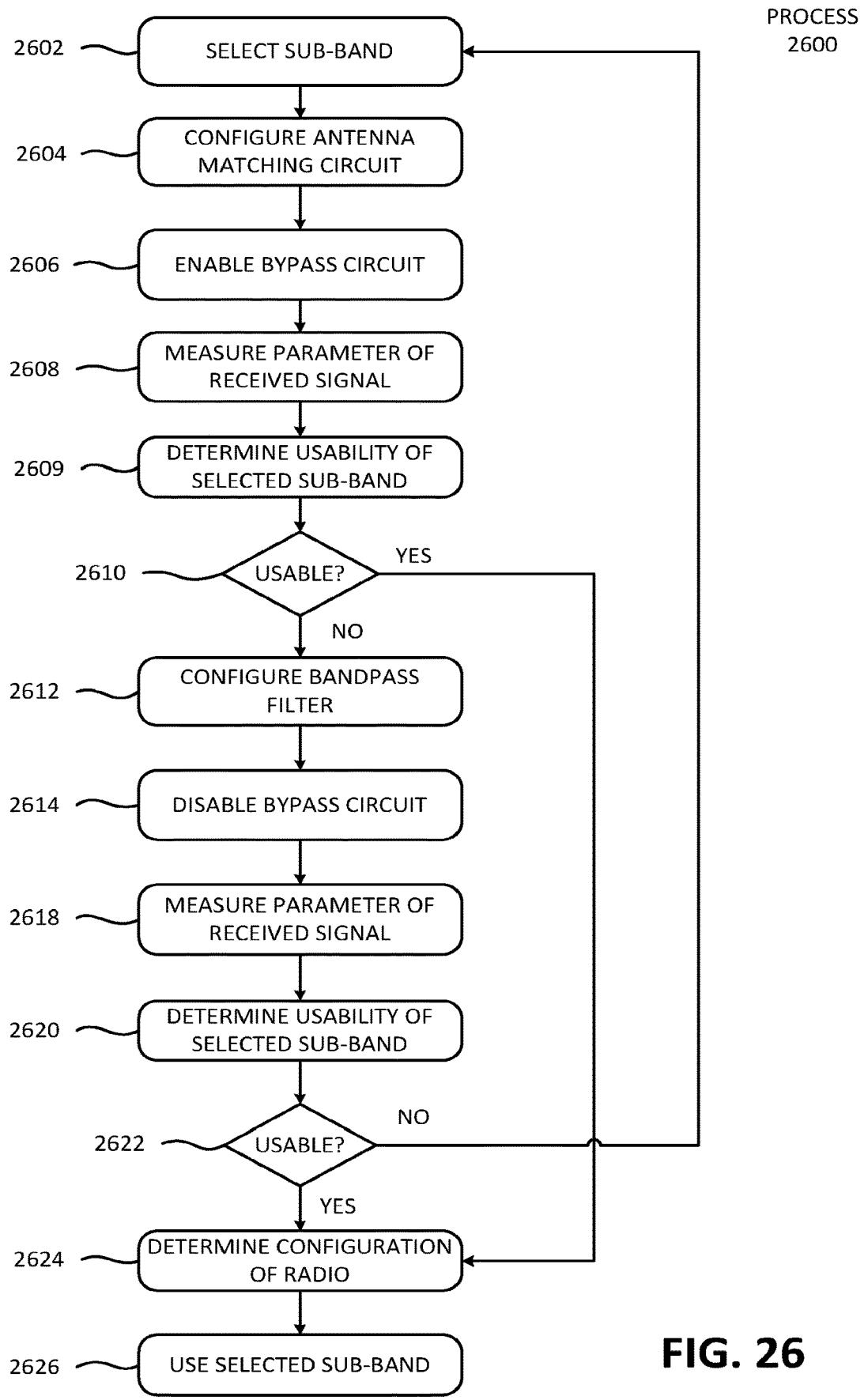
FIG. 26 is a flowchart of an example process for operating a radio described herein.

FIG. 26 is a flowchart of a process 2600 for selecting a TVWS channel in one implementation. Process 2600 may be performed by controller 212 in transceiver 202 when, for example, searching for a TVWS channel. Controller 212 may search for a TVWS channel when the radio is powered up for the first time or when a previously selected channel is determined to be inadequate for various reasons (such as being occupied by a licensed user).

Process 2600 may begin with selecting a sub-band (block 2602). The selected sub-band may be, for example, one of those discussed above: 470-500 MHz, 500-600 MHz, 600-700 MHz, and 700-800 MHz; 470-550 MHz, 550-630 MHz, 630-730 MHz, or 730-790 MHz. In one implementation, controller 212 may select the sub-band in a round robin fashion starting with the lowest sub-band. Alternatively, controller 212 may select one of the sub-bands by determining the location of radio 200 and querying a table (such as one stored in memory 205) based on the location of radio 200. In the following example, assume that controller 212 of radio 200 selects the following sub-band: 470-550 MHz. Also assume that radio 200 includes the FEM 206-x shown in FIG. 2D (i.e., FEM 206-2D). Process 2600 continues to determine whether this sub-band is a band that is already occupied by, for example, a licensed user.

Process 2600 configures the antenna matching circuit (block 2604) based on the selected sub-band. For example, having selected a sub-band of 470-550 MHz, controller 212 configures matching circuit 254 such that antenna 207 of radio 200 is tuned to this sub-band. That is, controller 212 configures matching circuit 254 such that it effectively has component values of matching circuit 1400.

Process 2600 may continue with enabling the bypass circuit (block 2606). In other words, controller 212 configures FEM 206-2D such that filter 252 is not in the RF path between antenna 207 and transceiver 202. That is, bypass circuit 284 is in the RF path between antenna 207 and transceiver 202. As discussed with respect to FIGS. 2C, 2D, and 2E, switches S1 286 and S2 288 can be configured to bypass bandpass filter 252 in the radio-frequency path (so as to include antenna matching circuit 254 and not bandpass filter 252).

Process 2600 continues with measuring a property or parameter of the received signal (a "first signal") (block 2608). The property or parameter may be the SNR and/or RSSI, for example, to determine whether the selected sub-band is occupied and/or usable (block 2609). If the SNR is below a threshold, for example, then the sub-band may be considered usable (block 2610: YES) and process 2600 may determine the configuration of the radio (block 2624) and use the selected sub-band (block 2626). The determination of usability in this example did not employ the bandpass filter 252 in FEM 206-2D. That is, bandpass filter 252 was not in the RF path between antenna 207 and transceiver 202. Usable means that a determination has been made that a sub-band is not occupied by an incumbent or a licensed user.

If the SNR is above a threshold, for example, then the sub-band may be considered potentially unusable (block 2610: NO). Not usable means that a determination has been made that the sub-band is not occupied by an incumbent or licensed user. In this case, however, the high SNR may be the result of interference from an adjacent sub-band and not from a user in the selected sub-band. Alternatively, the SNR may be above the threshold because the sub-band is in use by a licensed user. To help determine whether the selected sub-band is in use or not, controller 212 may determine to switch bandpass filter 252 into the RF path between antenna 207 and transceiver 202 and process 2600 continues with configuring bandpass filter 252 (block 2612). In this example, controller 212 configures bandpass filter 252 to correspond with the selected sub-band (such as 470-550 MHz).

Process 2600 continues with disabling the bypass circuit (block 2614). Controller 212 may then disable bypass circuit 284. In other words, bandpass filter 252 is switched into the RF path between antenna 207 and transceiver 202. As noted above, bandpass filter 252 can provide additional rejection of out-of-band (sub-band) interference. As discussed with respect to FIGS. 2C, 2D, and 2E, switches S1 286 and S2 288 can be configured to include bandpass filter 252 in the radio-frequency path (along with matching circuit 254).

With bandpass filter 252 providing the additional rejection, process 2600 continues with measuring a parameter or property of the received signal ("a second received signal") (block 2618). The parameter or property may be the same as measured previously, such as the SNR and/or RSSI, for example. Measuring the parameter or property may determine whether the selected sub-band is occupied and/or usable (block 2620). If the SNR is below a threshold, for example, then the sub-band may be considered usable (block 2622: YES) and process 2600 may determine the configuration of the radio (block 2624) and use the selected sub-band (block 2626). The determination of usability in this example did employed the bandpass filter 252 in FEM 206-2D. That is, bandpass filter 252 was in the RF path between antenna 207 and transceiver 202 to provide the additional signal rejection.

If the SNR is above a threshold, for example, then the sub-band may be considered unusable (block 2622: NO). For example, the SNR may be above the threshold because the sub-band is in use by a licensed user. As such, process 2600 may start again but with a different selected sub-band (block 2602).

If the sub-band is usable (block 2622: YES), then process 2600 may determine the configuration of the radio (block 2624) and use the selected sub-band (block 2626). As described above, determining the configuration of radio 200 (block 2624) may include, for example, controller 212 sending control signals to FEM 206-x to exclude bandpass filter 252 during transmission; and to include bandpass filter 252 during reception (if doing so would increase a measured parameter, such as SNR, during reception otherwise excluding bandpass filter 252). Determining the configuration of radio 200 may also include controller 212 sending control signals to FEM 206-x to tune matching circuit 254 to the appropriate sub-band during transmission and/or reception. Using the selected sub-band (block 2626) may include using the sub-band by a white-space device for the intended purpose of the white-space device, such as a mobile device or tablet computer transmitting and receiving data. In one implementation, white-space device radio 200 may operate (block 2626) with or without bypass circuit 284 enabled. During operation, the SNR, RSSI, and/or data throughput rate may be determined with the bypass circuit 284 enabled and again without bypass circuit 284 enabled. Controller 212 may choose the state of bypass circuit 284 (enabled or disabled) with the better SNR, RSSI, and/or throughput performance. In one implementation, controller 212 may periodically toggle the state of bypass switch 284 to reassess SNR, RSSI, and/or throughput performance.

One implementation incorporates all or some of matching circuit 254 components into the radio chip package. For example, FEM 206-x may include a chip package having all (or some of) the components of matching circuit 254. As noted above, in such a case one or more components (such as an inductor) may be outside the chip, although in some implementations inductors may be included inside the chip package.

One implementation incorporates all or some of bandpass filter 252 components into the radio chip package. For example, FEM 206-x may include a chip package having all (or some of) the components of bandpass filter 252.

Including inductors in a chip package has historically been challenging. Factors influencing putting inductors on chip or in package include the Q factor (higher Q translates to lower insertion loss but are more difficult to include in a chip); die area die area versus inductor value (large values translate to large area and thus higher cost); and the number of inductors (fewer inductors translates to less die area and thus lower cost). In one implementation, micro-electro-mechanical systems (MEMS) inductors may be added in a chip and/or chip package as a 3D structure. Such an inductor may be, for example, 10 nH with a relatively high Q factor.

Returning to antenna 1302 and matching circuits 1400, 1500, 1600, and 1700, the majority of inductor values are 8 nH or less. A MEMS inductor with (such as one with a value up to 9 nH) with a Q factor of 40 in the 450-800 MHz range may provide low enough insertion loss for the matching circuits discussed above to be incorporated into a chip or chip package. That is, the entire antenna matching circuit (such as circuit 1400, 1500, 1600, and/or 1700 could be implemented on a chip).

Figure 27A:
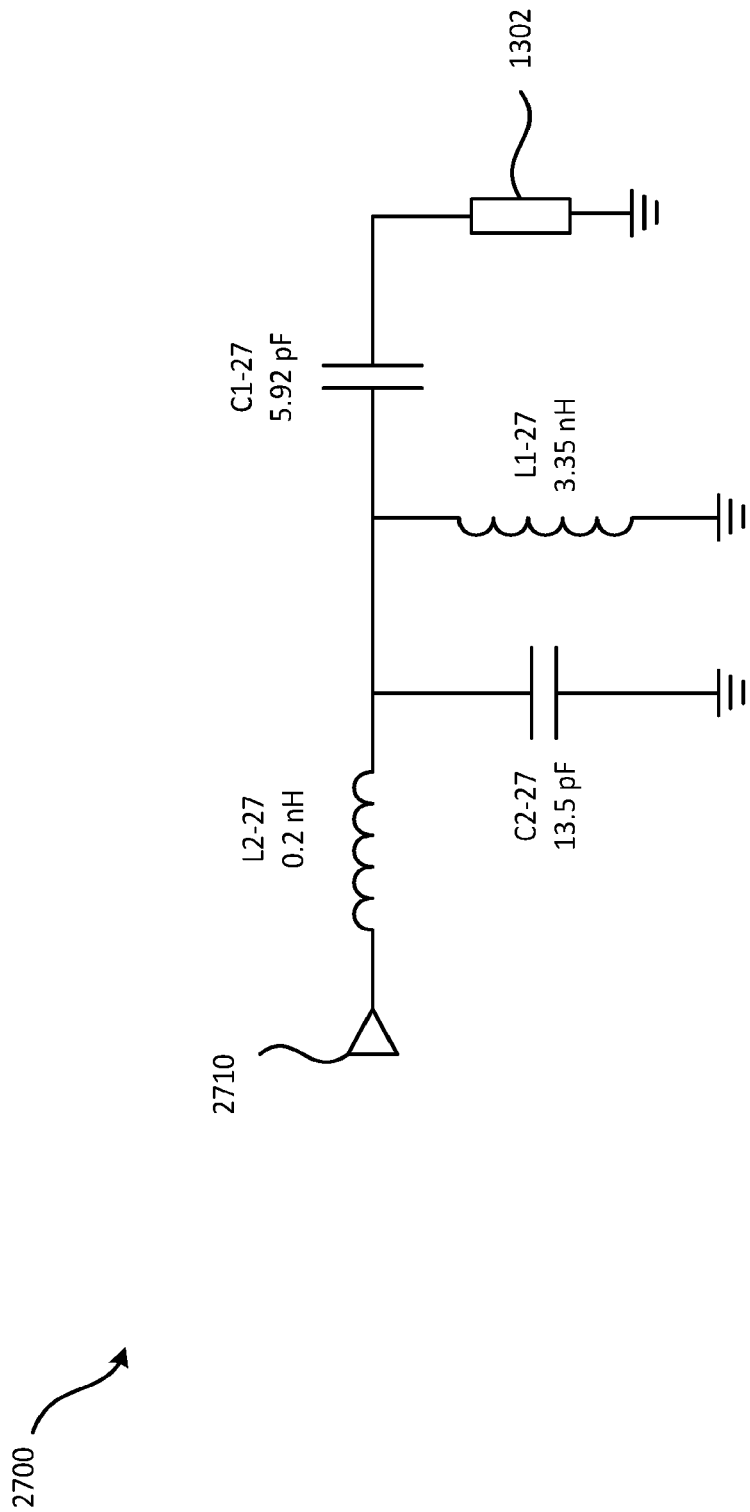
FIG. 27A is a circuit diagram of an example matching circuit for the antenna of FIG. 13.
Figure 27B:
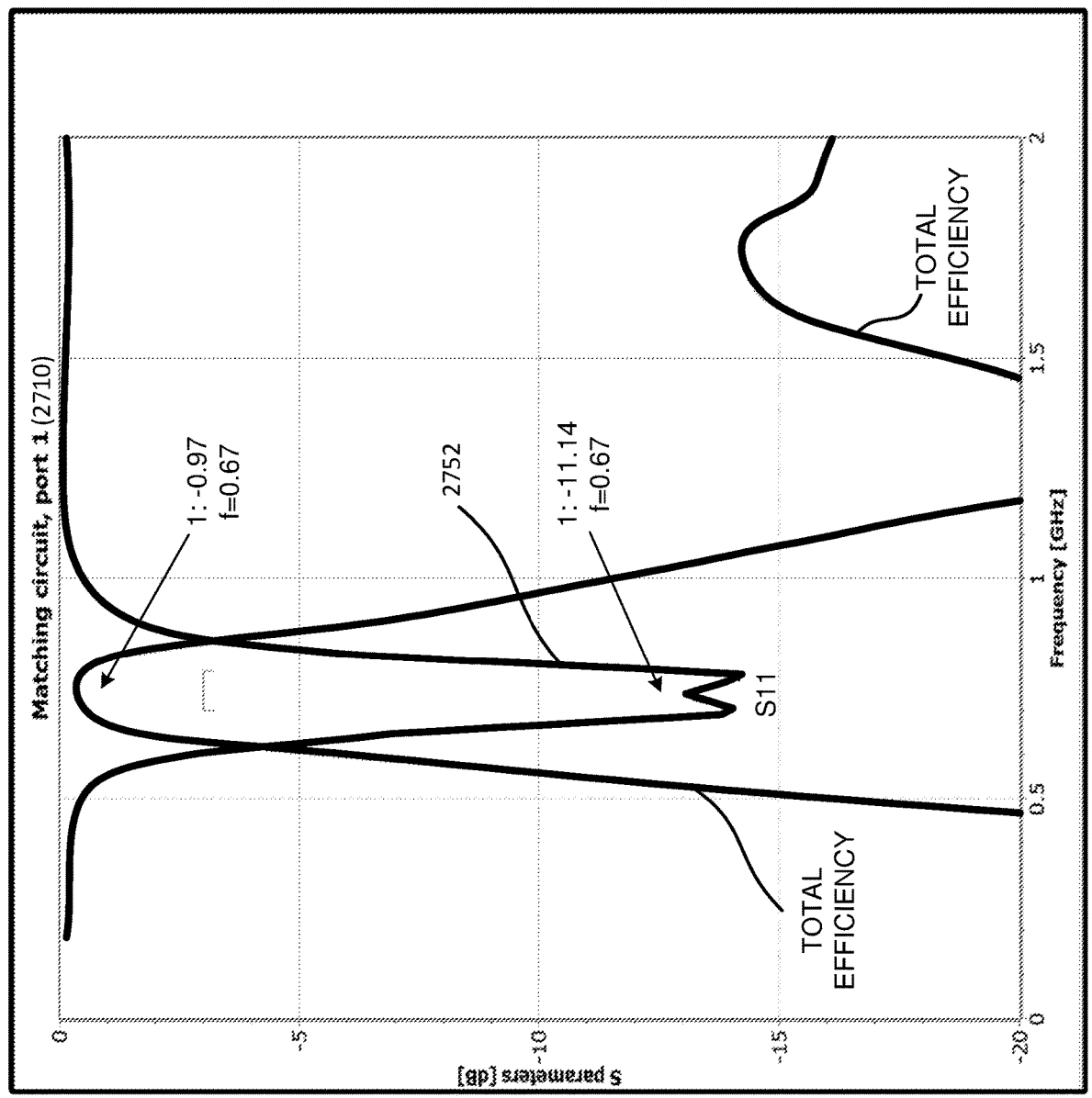
FIG. 27B is a plot of the return loss of the antenna of FIG. 13 paired with the matching circuit of FIG. 27A.
Figure 27C:
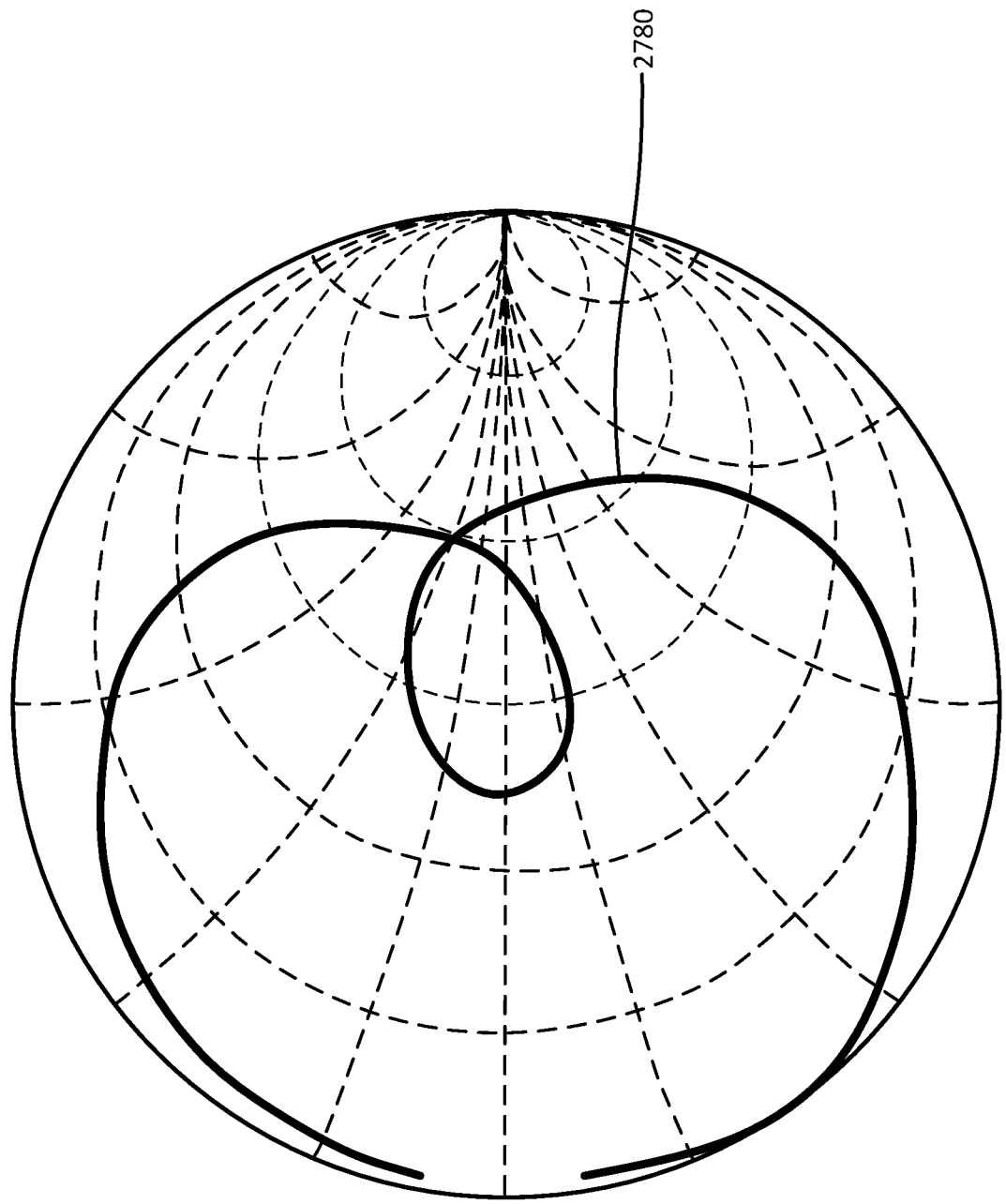
FIG. 27C is a Smith-chart plot of the reflection coefficient of the antenna of FIG. 13 paired with matching circuit of FIG. 27A.

An example of an antenna matching circuit that may be included in a chip (such as all the components on the chip) is shown in FIGS. 27A through 32B. That is, in these examples the inductors may be place in the chip. FIG. 27A is an example matching circuit 2700 for antenna 1302 of FIG. 13. FIG. 27B is a plot of the return loss 2752 (over the sub-band of 700-790 MHz) of antenna 1302 paired with matching circuit 2700. FIG. 27C is a Smith-chart plot of the reflection coefficient 2780 of antenna 1302 paired with matching circuit 2700 (over the sub-band of 700-790 MHz, with a reference impedance of 50Ω). As demonstrated in FIGS. 27B and 27C, matching circuit 2700 paired with antenna 1302 is suitable for the 700-790 MHz frequency range. In matching circuit 2700, inductor L1-27 is 3.35 nH, inductor L2-27 is 0.2 nH, capacitor C1-27 is 5.92 pF, and capacitor C2-27 is 13.5 pF.

Figure 28A:
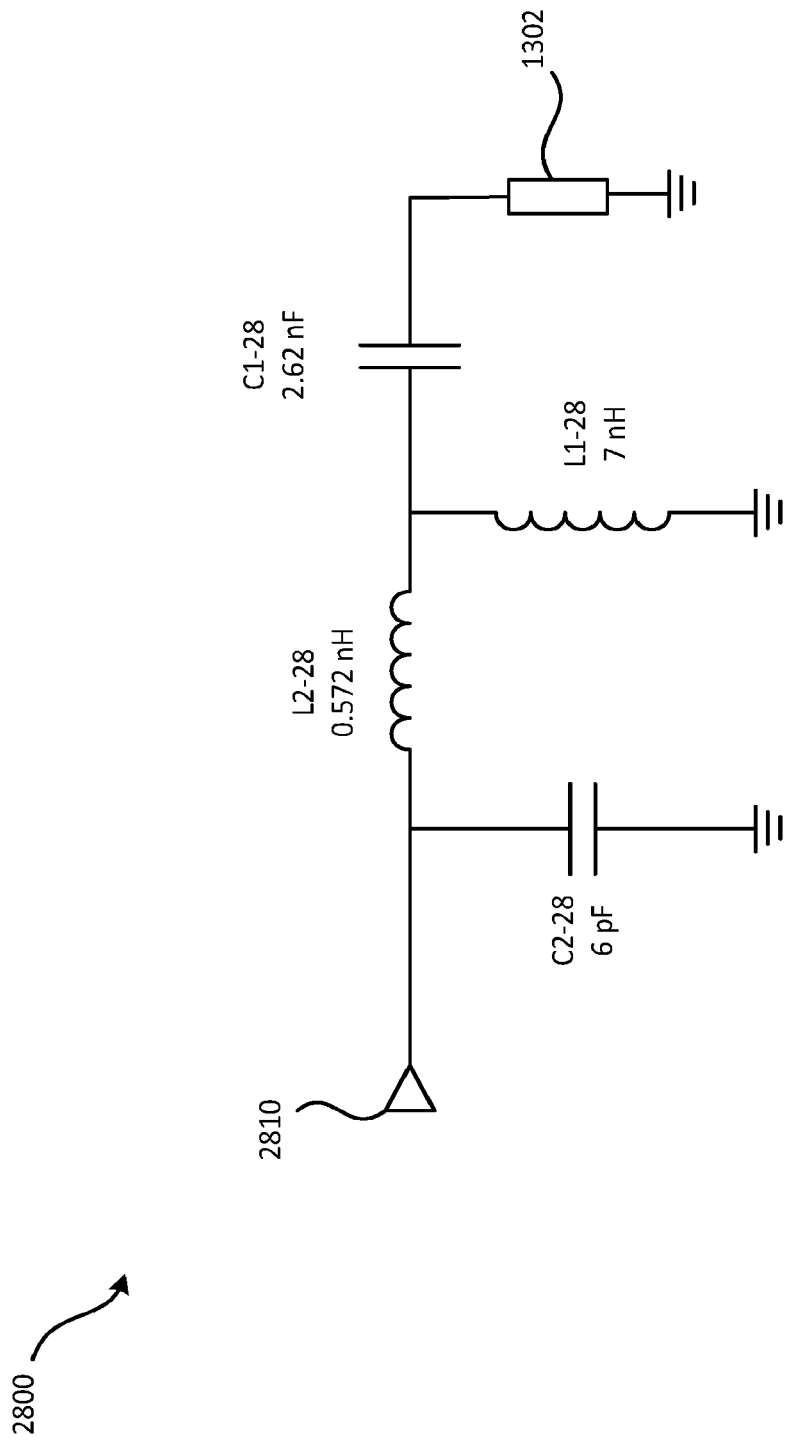
FIG. 28A is a circuit diagram of an example matching circuit for the antenna of FIG. 13.
Figure 28B:
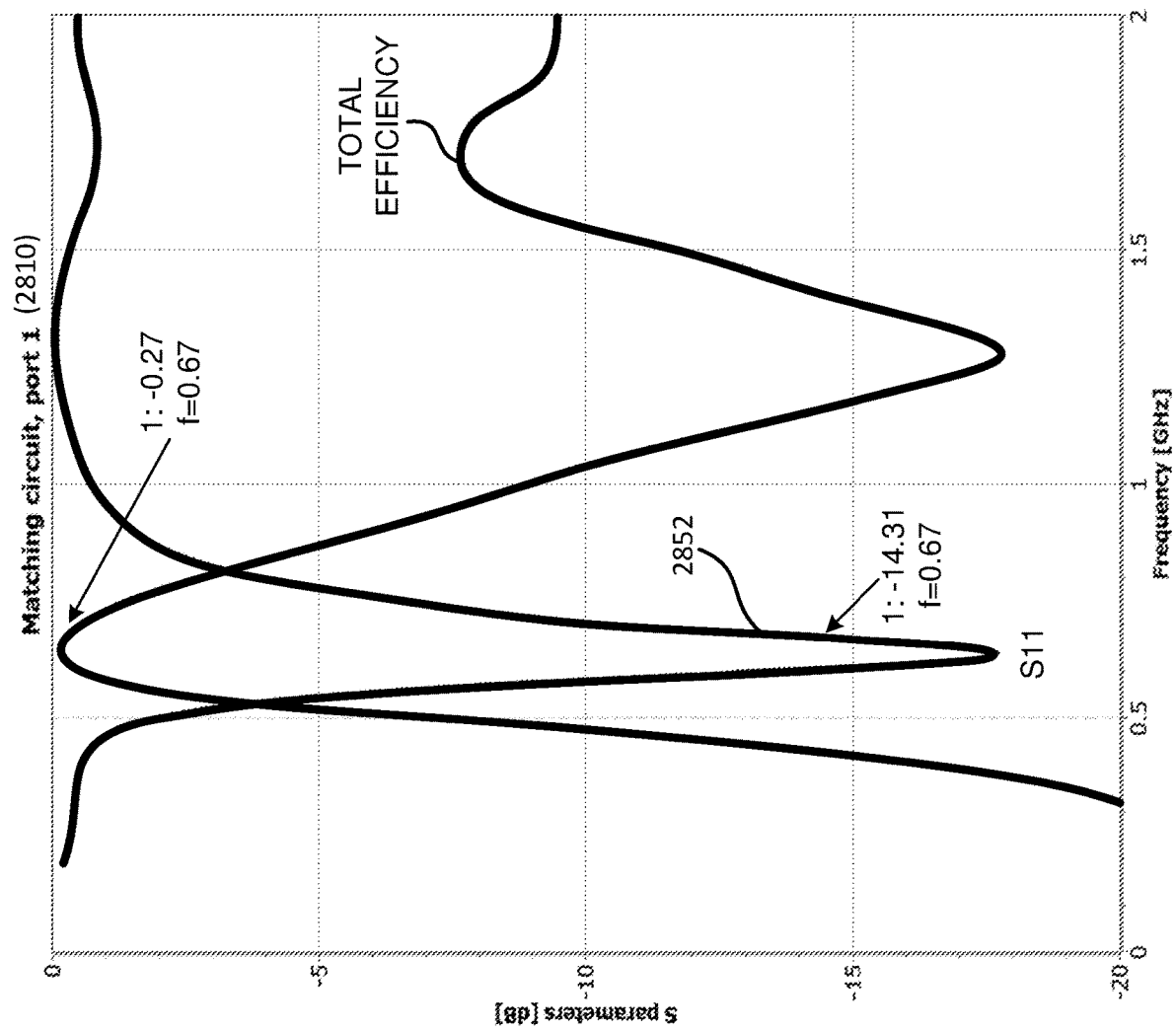
FIG. 28B is a plot of the return loss of the antenna of FIG. 13 paired with the matching circuit of FIG. 28A.
Figure 28C:
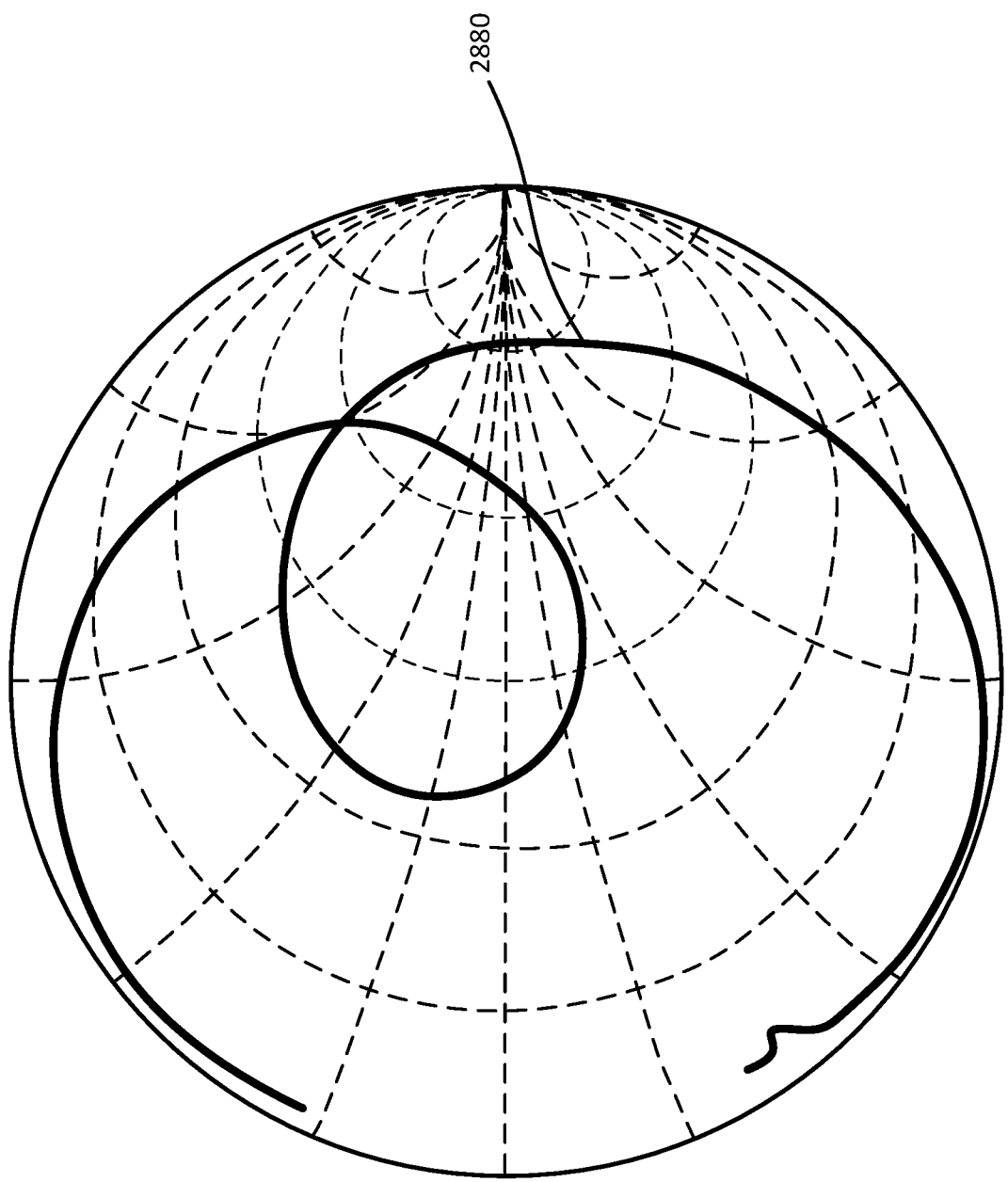
FIG. 28C is a Smith-chart plot of the reflection coefficient of the antenna of FIG. 13 paired with matching circuit of FIG. 28A.

FIG. 28A is an example matching circuit 2800 for antenna 1302 of FIG. 13. FIG. 28B is a plot of the return loss 2852 of antenna 1302 paired with matching circuit 2800 (over the sub-band of 600-700 MHz, with a reference impedance of 50Ω). FIG. 28C is a Smith-chart plot of the reflection coefficient 2880 of antenna 1302 paired with matching circuit 2800 (over the sub-band of 600-700 MHz, with a reference impedance of 50Ω). As demonstrated in FIGS. 28B and 28C, matching circuit 2800 paired with antenna 1302 is suitable for the 600-700 MHz frequency range. In matching circuit 2900, inductor L1-28 is 7 nH, inductor L2-28 is 0.572 nH, capacitor C1-28 is 2.62 nF, and capacitor C2-28 is 6 pF.

Figure 29A:
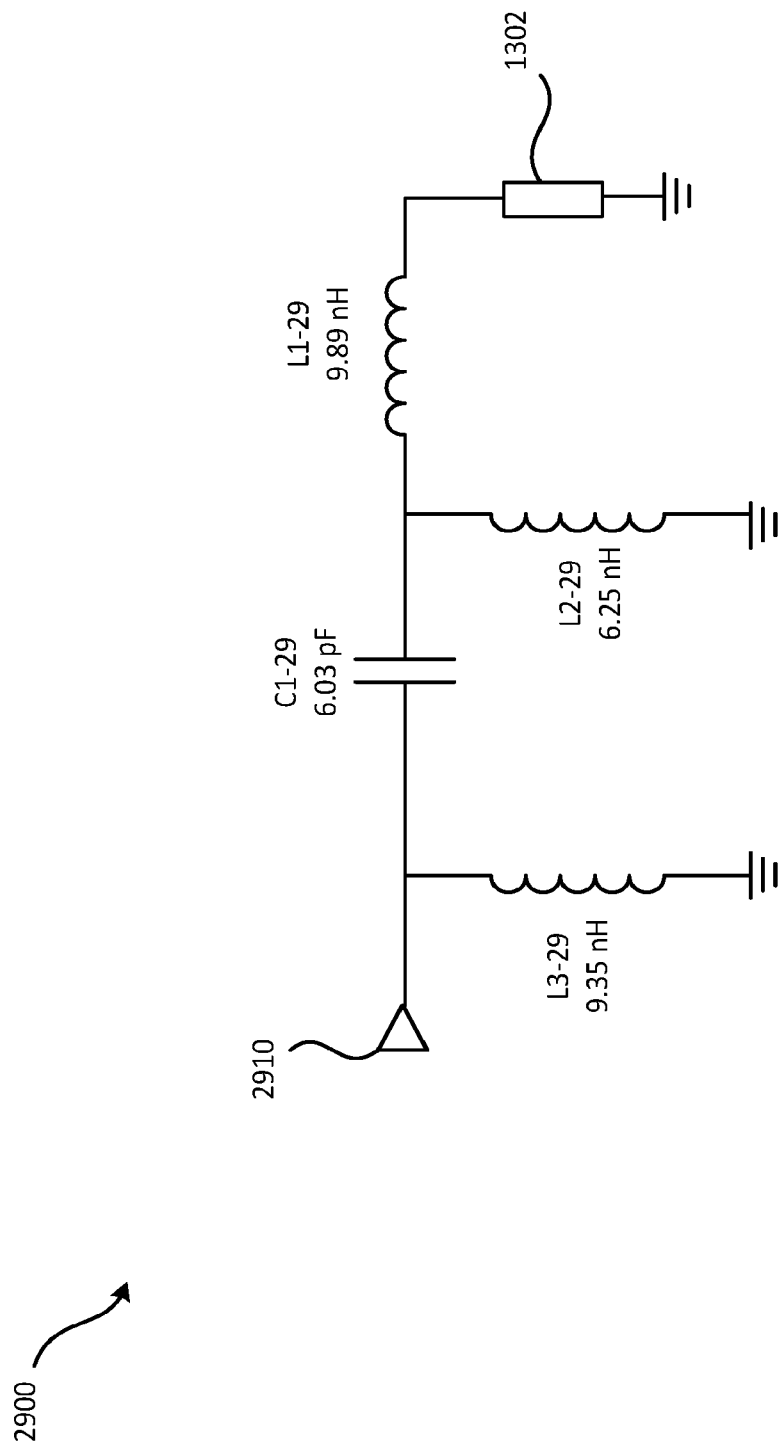
FIG. 29A is a circuit diagram of an example matching circuit for the antenna of FIG. 13.
Figure 29B:
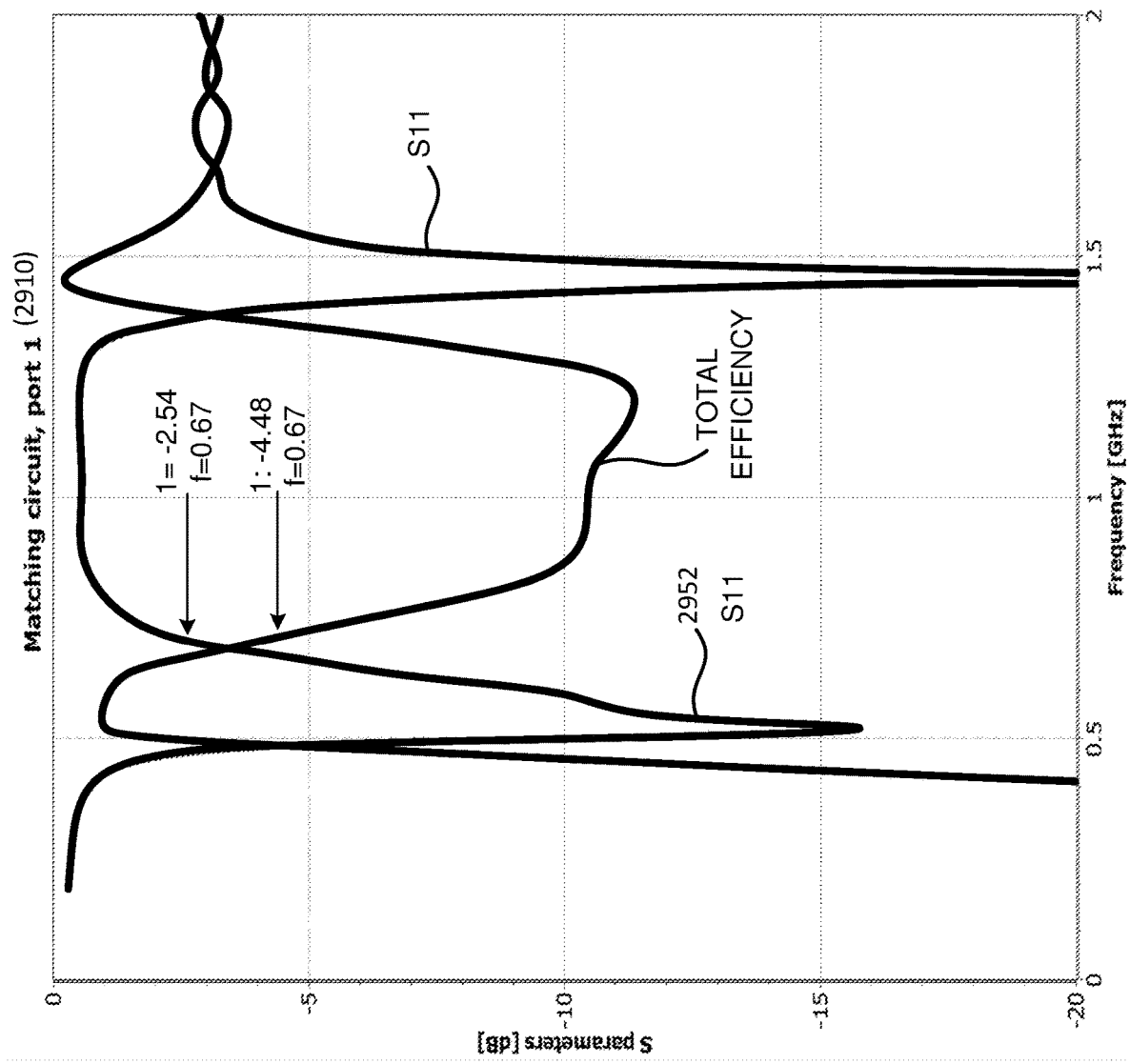
FIG. 29B is a plot of the return loss of the antenna of FIG. 13 paired with the matching circuit of FIG. 29A.

FIG. 29A is an example matching circuit 2900 for antenna 1302 of FIG. 13. FIG. 29B is a plot of the return loss 2952 (over the sub-band of 520-600 MHz) of antenna 1302 paired with matching circuit 2900. As demonstrated in FIG. 29B, matching circuit 2900 paired with antenna 1302 is suitable for the 520-600 MHz frequency range. In matching circuit 2900, inductor L1-29 is 9.89 nH, inductor L2-29 is 6.25 nH, inductor L3-29 is 9.35 nH, and capacitor C1-29 is 6.03 pF.

Figure 30A:
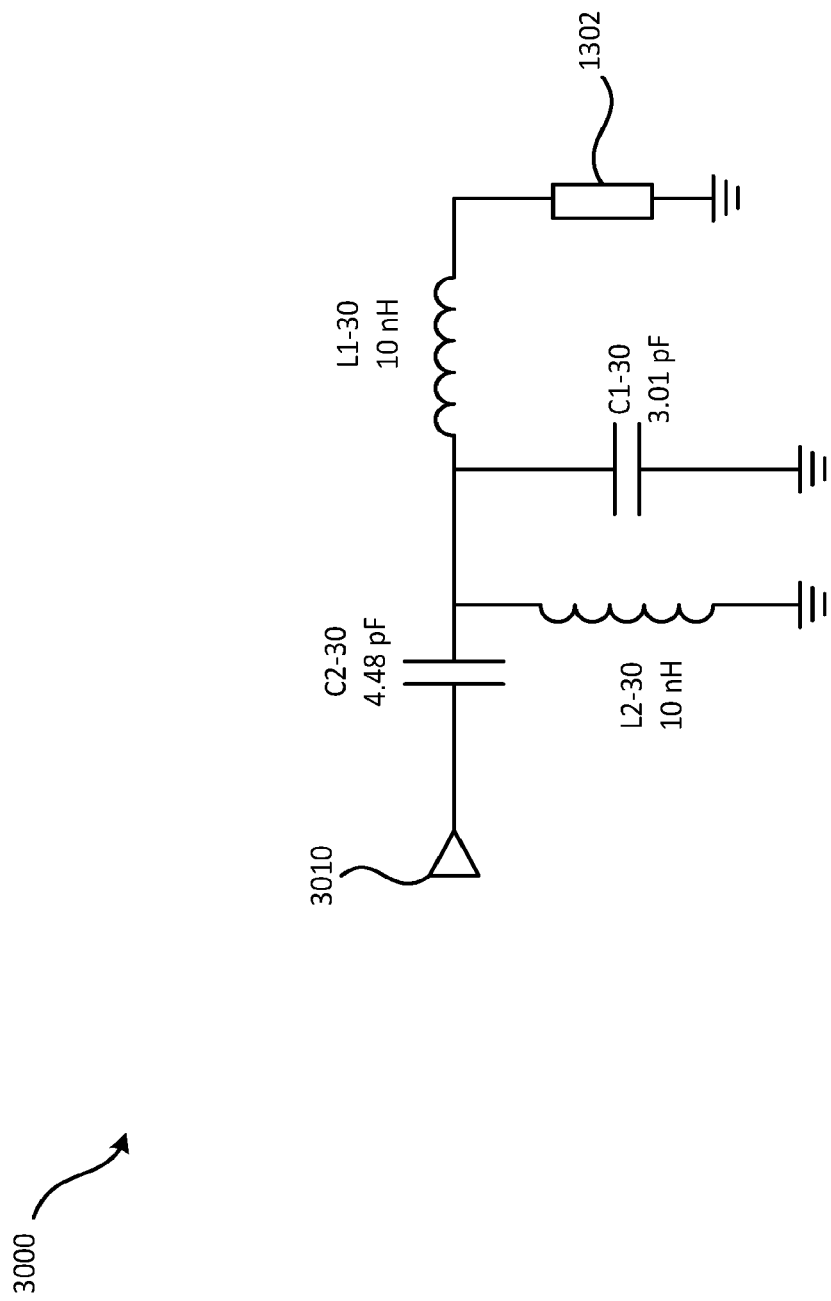
FIG. 30A is a circuit diagram of an example matching circuit for the antenna of FIG. 13.
Figure 30B:
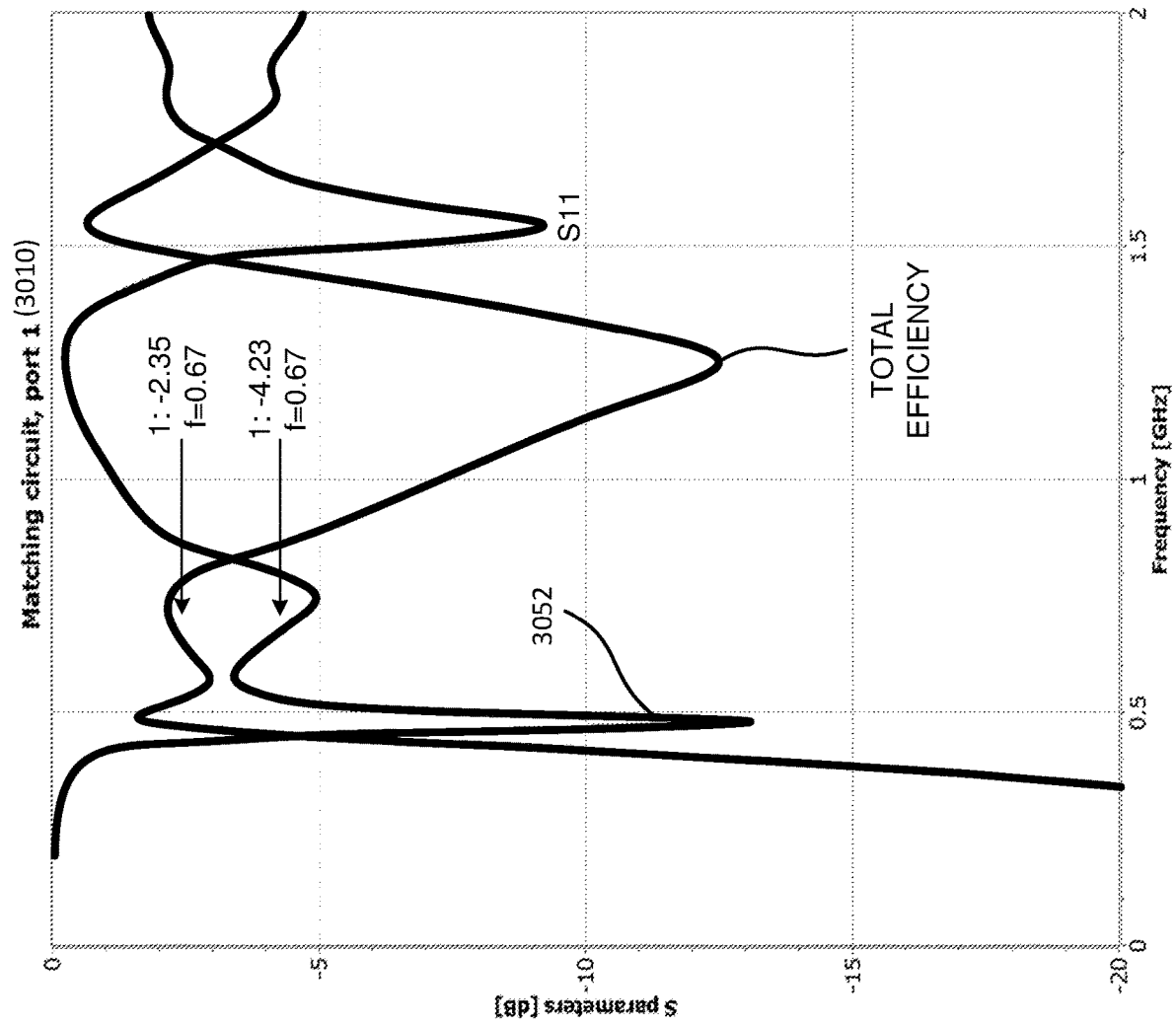
FIG. 30B is a plot of the return loss of the antenna of FIG. 13 paired with the matching circuit of FIG. 30A.

FIG. 30A is an example matching circuit 3000 for antenna 1302 of FIG. 13. FIG. 30B is a plot of the return loss 3052 (over the sub-band of 470-520 MHz) of antenna 1302 paired with matching circuit 3000. As demonstrated in FIG. 30B, matching circuit 3000 paired with antenna 1302 is suitable for the 470-520 MHz frequency range. In matching circuit 3200, inductor L1-30 is 10 nH, inductor L2-10 is 10 nH, capacitor C1-10 is 3.01 pF, and capacitor C2-10 is 4.48 pF.

Figure 31A:
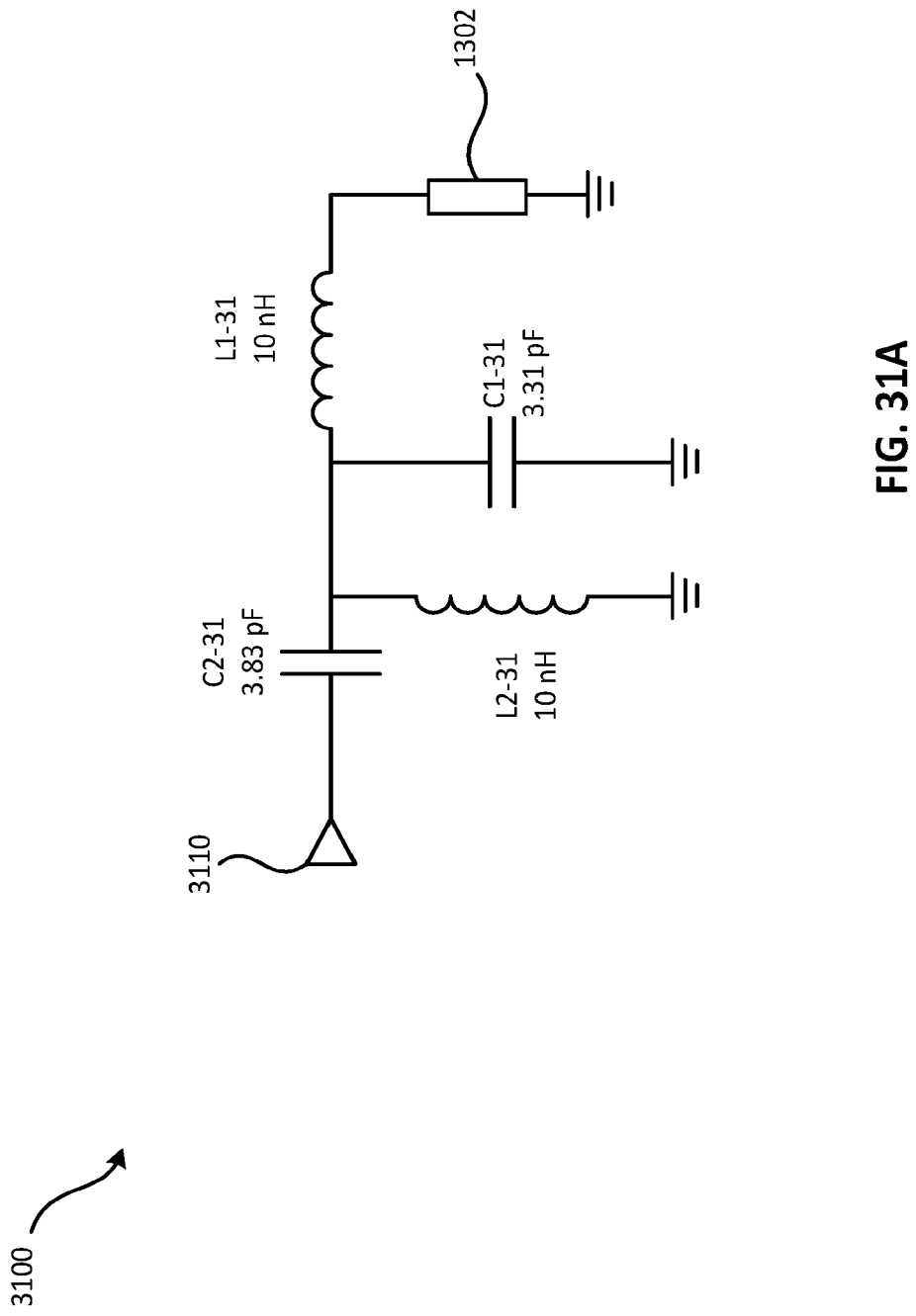
FIG. 31A is a circuit diagram of an example matching circuit for the antenna of FIG. 13.
Figure 31B:
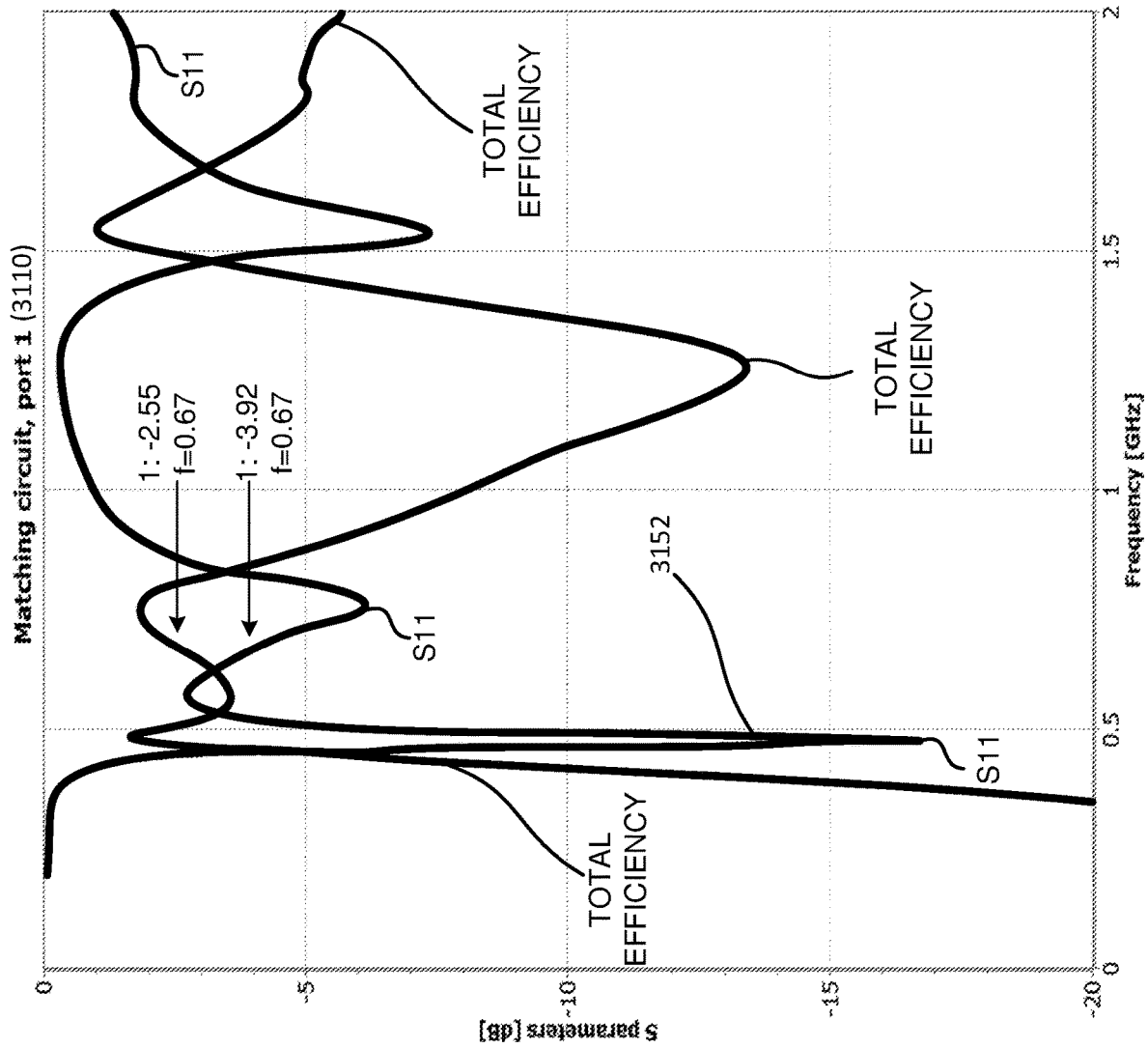
FIG. 31B is a plot of the return loss of the antenna of FIG. 13 paired with the matching circuit of FIG. 31A.

FIG. 31A is an example matching circuit 3100 for antenna 1302 of FIG. 13. FIG. 31B is a plot of the return loss 3152 (over the sub-band of 470-500 MHz) of antenna 1302 paired with matching circuit 3100. As demonstrated in FIG. 32B, matching circuit 3100 paired with antenna 1302 is suitable for the 470-500 MHz frequency range. In matching circuit 3100, inductor L1 is 10 nH, inductor L2 is 10 nH, capacitor C1 is 3.31 pF, and capacitor C2 is 3.83 pF.

Figure 32A:
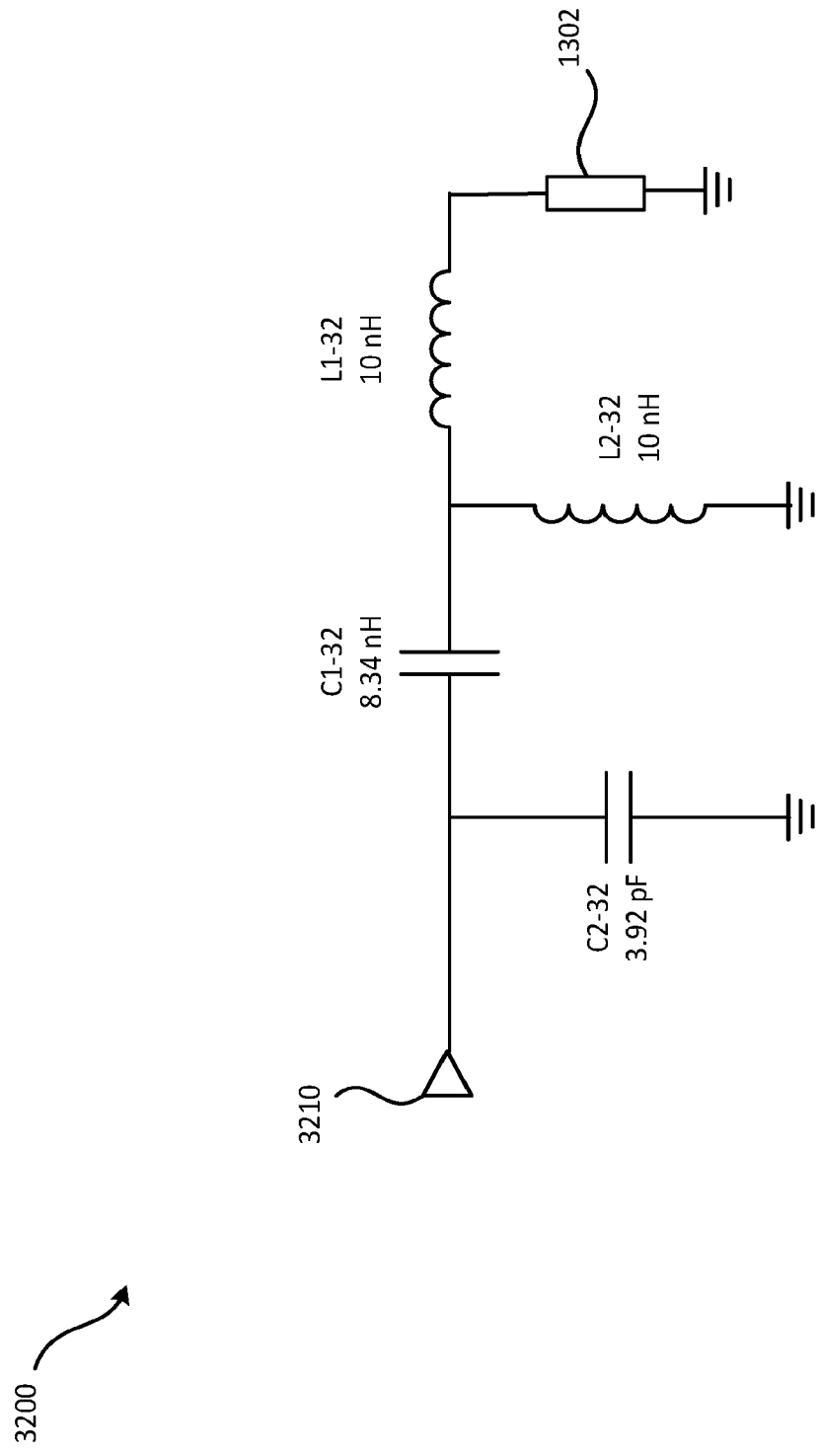
FIG. 32A is a circuit diagram of an example matching circuit for the antenna of FIG. 13.
Figure 32B:
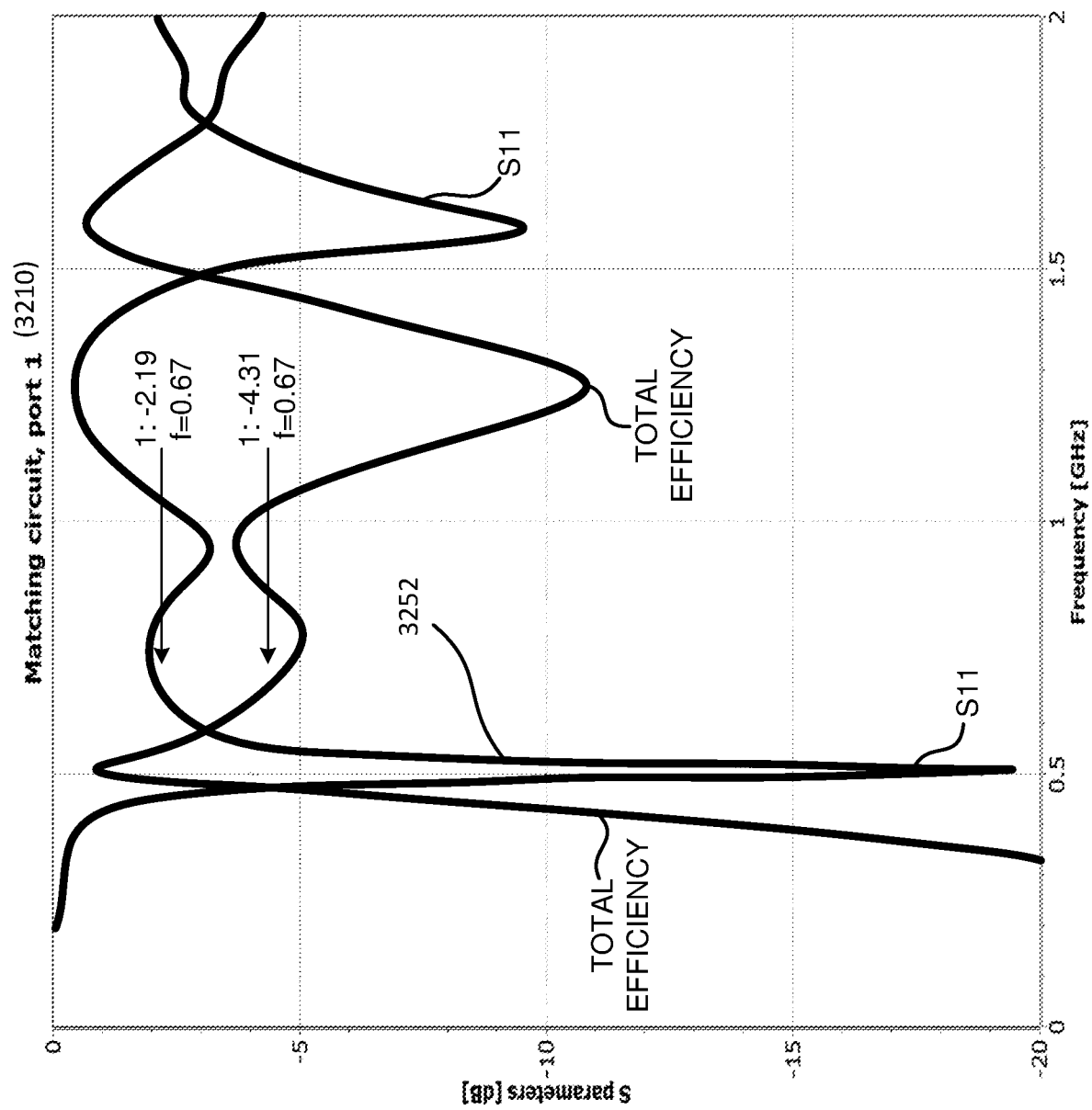
FIG. 32B is a plot of the return loss of the antenna of FIG. 13 paired with the matching circuit of FIG. 32A.

FIG. 32A is an example matching circuit 3200 for antenna 1302 of FIG. 13. FIG. 32B is a plot of the return loss 3252 (over the sub-band of 500-520 MHz) of antenna 1302 paired with matching circuit 3200. As demonstrated in FIG. 32B, matching circuit 3200 paired with antenna 1302 is suitable for the 500-520 MHz frequency range. In matching circuit 3200, inductor L1-31 is 10 nH, inductor L2-31 is 10 nH, capacitor C1-31 is 8.34 pF, and capacitor C2 is 3.92 pF.

FIGS. 27A to 32B demonstrate that a 470-790 MHz antenna can be matched, with excellent efficiency, using inductors that can be integrated on a chip. By comparison, a broadcast TV dongle receiver may only offer −10 dBi antenna efficiency at the lower end of this band.

Bandpass filter 2200 (see FIG. 22) also uses relatively low value inductors (such as 12 nH) that could be incorporated into a chip with a sufficiently high Q and low insertion loss. In one implementation, bandpass filter 2200 is deployed on a chip in a front-end module with the architecture shown in FIG. 2E (with a separate transmit RF path and receive RF path). The receive RF path (being less power constrained for example) may tolerate higher insertion losses, making the use of modest Q factor inductors entirely feasible in this example.

Figure 33:
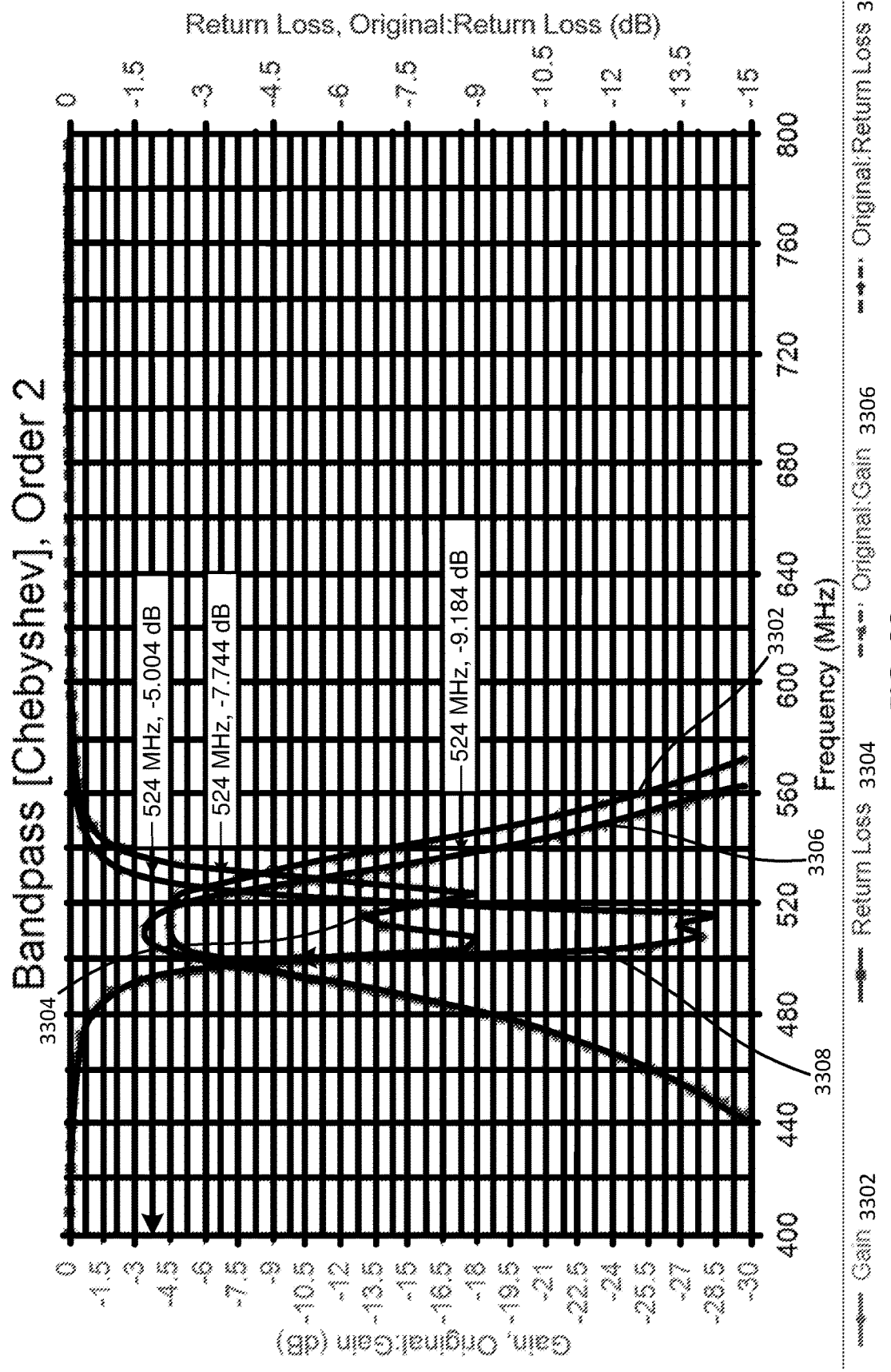
FIG. 33 is a plot of the gain and return loss of the bandpass filter of FIG. 22.
Figure 34:
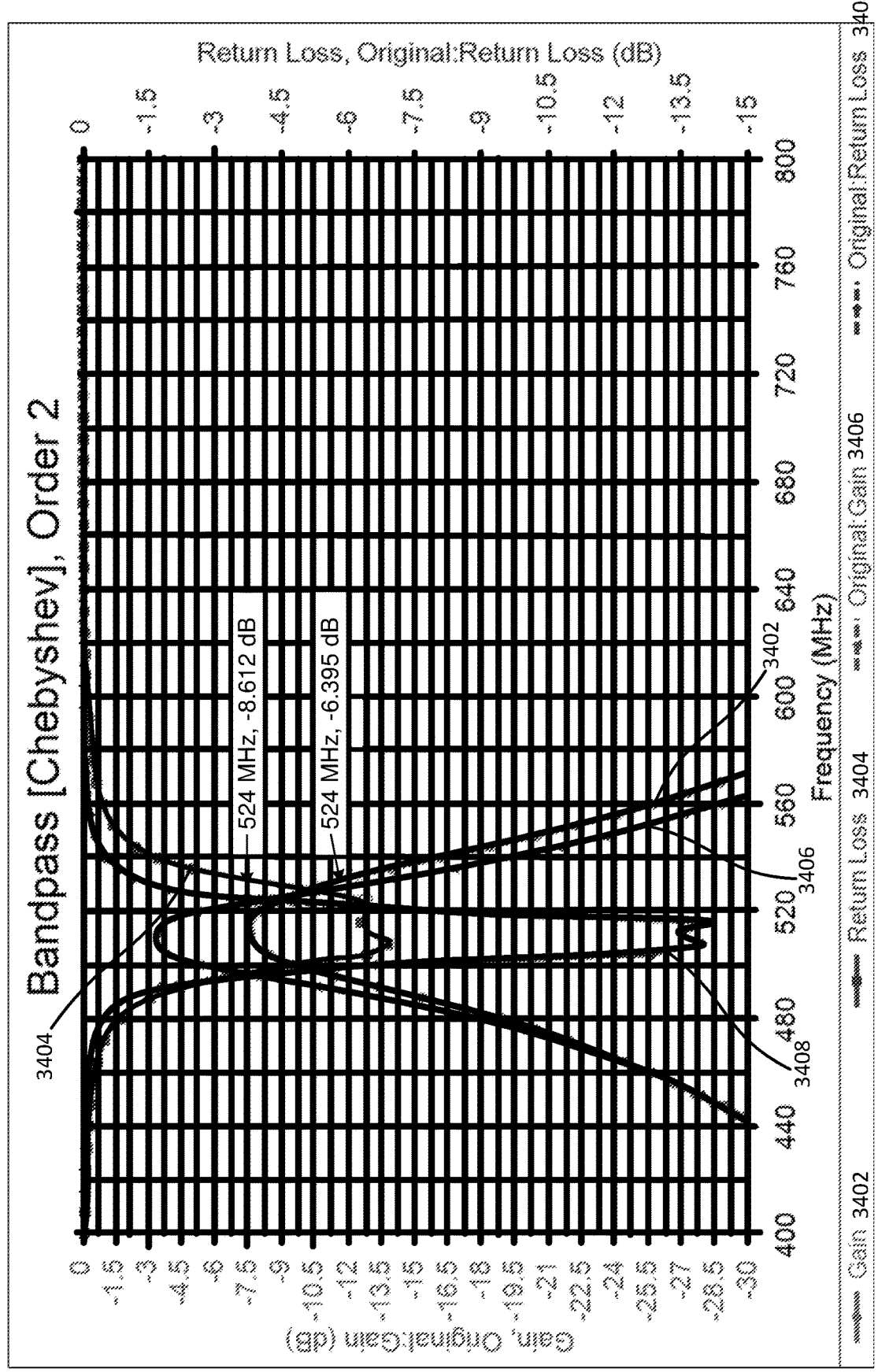
FIG. 34 is a plot of the gain and return loss of bandpass filter of FIG. 22.

In this case, the inductors can be incorporated onto the chip along with the capacitors. In this case, the bandpass filter 2200 of FIG. 22 can be manufactured using lower value inductors to maximize Q and minimize losses. FIGS. 33 and 34 are plots of the gain and return loss of bandpass filter 2200 using 8.2 nH inductors. These plots show the increased losses incurred when the Q factor is reduced to 100 (FIG. 33) and the Q factor is further reduced to 40 (FIG. 34). FIG. 33 shows a 1.5 dB increase in insertion loss (relative to the originally disclosed design with discrete inductors with higher Q factor) using inductor with a Q factor of 100. FIG. 34 shows a 4.3 dB increase in filter insertion loss (relative to the originally disclosed design with discrete inductors with higher Q factor) when the inductor Q factor is reduced to 40.

Implementations disclosed herein, therefore, allow for TVWS sub-band selection with on-chip inductors with Q factors of less than 100; of less than 90; of less than 80; of less than 70; of less than 60; of less than 50; of less than 40; or of less than 30. Implementations disclosed herein also enable TVWS sub-band selection with on-ship inductors, wherein the sub-band, bandwidth of the bandpass filter 252, and/or bandwidth of the matching circuit 254 paired with antenna 207-x is between 40 MHz and 50 MHz wide; 50 MHz and 60 MHz wide; 60 MHz and 70 MHz wide; 70 MHz and 80 MHz wide; 80 MHz and 90 MHz wide; or 90 MHz and 100 MHz wide. Implementations disclosed herein also enable TVWS sub-band selection with on-chip inductors (in any combination of the Q factors previously discussed) of 10 nH or less; of 8 nH or less; or of 6 nH or less.

Incorporating all components into a chip may be feasible for use with radios architected with a separate receive paths and transmit paths (see FIGS. 2D and/or 2E). The implementations disclosed herein make it feasible to deploy the on-chip inductors approach to integrate all (or much of) of the filter (bandpass filter and/or matching circuit) into the RF chip package. Although the realizable filter losses exposed (see FIG. 34) may be higher than preferred, when the system solution is considered as a whole, these implementations make it feasible for complete integration into radio chip packages for radio circuits using the transmit and receive topology disclosed above (see FIGS. 2D and/or 2E).

Combining the results illustrated in FIGS. 31 and 34, one implementation enables a total front-end loss comparable to the lower efficiency wider bandwidth antennas deployed in some TV receiver devices. As shown, insertion losses for the transmit path can be mitigated using a bypass switch for half duplex systems (switch can also be on chip) or by increasing transmit power to offset losses (where system link design and thermal topics permit).

Implementations disclosed herein enables the integration of all the antenna matching and all of the bandpass filter matching on the radio chip (effectively integrating the circuitry shown in FIGS. 2D and 2E in the chip package. The stopband rejection properties may be preserved in these cases (in that rejection of stopband signals).

In some implementations, matching circuit 254 and/or bandpass filter 252 components are external to the chip package, which can allow for higher Q external inductors (or large value capacitors) to be deployed if desired. The possibility also exists for the chip to include all these parts in the chip package and include RF bypass switches to enable the option of using either the internal (lower Q) inductors or the alternative externally placed discrete (higher Q) inductors. The term "channel" is interchangeable with the term "sub-band" as used herein.

Referring to process 2600, in one implementation, measuring a parameter of a signal (blocks 2608 and 2618) and determining the usability of a selected sub-band (block 2609 and 2620) may include methods and systems disclosed in U.S. Pat. No. 9,386,558 (assigned to Microsoft Corporation of Redmond, Wash.), such as measuring power level and phase of a received signal.

No element, act, or instruction used in the description of the present application should be construed as critical or essential to the invention unless explicitly described as such. As used herein, the articles "a" and "the" and the term "one of" are intended to include one or more items. Further, the phrase "based on" means "based, at least in part, on" unless explicitly stated otherwise. Additionally, "exemplary" means "an example."

In the preceding specification, various preferred implementations are described with reference to the accompanying drawings. It will, however, be evident that various modifications and changes may be made thereto, and additional implementations may be implemented, without departing from the broader scope of the invention as set forth in the claims that follow. The specification and drawings are accordingly to be regarded in an illustrative rather than restrictive sense.

The invention claimed is:
1. A device comprising:
   a controller to select a sub-band in a frequency band;
   a controller interface to configure an antenna matching circuit based on the selected sub-band and to configure a bandpass filter based on the selected sub-band; and a receiver to receive a first signal in the selected sub-band through a first radio-frequency path from an antenna of the device, the first radio-frequency path including the antenna matching circuit and not including the bandpass filter, wherein the receiver is configured to measure a parameter of the received first signal;

wherein the receiver is configured to receive a second signal in the selected sub-band through a second radio-frequency path from the antenna, the second radio-frequency path including the antenna matching circuit and the bandpass filter, and wherein the receiver is configured to measure a parameter of the received second signal, and wherein the controller is configured to determine whether the selected sub-band is usable based on the measured parameter of the received first signal, and the controller is configured to determine whether the selected sub-band is usable based on the measured parameter of the received second signal.

2. The device of claim 1, wherein when the controller does not determine that the selected sub-band is usable based on the measured parameter of the received first signal, the controller is configured to determine that the selected sub-band is usable based on the measured parameter of the received second signal.

3. The device of claim 1, wherein the receiver is configured to measure a signal-to-noise ratio (SNR) or a received signal strength indicator (RSSI) as the parameter of the received first signal or as the parameter of the received second signal.

4. The device of claim 1 further comprising:
switches to bypass the bandpass filter via the first radio-frequency path when the receiver receives the first signal through the first radio-frequency path.

5. The device of claim 4,
wherein the switches are configured to include the bandpass filter in the second radio-frequency path when the receiver receives the second signal through the second radio-frequency path.

6. The device of claim 1, further comprising:
a transmitter to transmit, through the first radio-frequency path on the selected sub-band when determined that the selected sub-band is usable.

7. The device of claim 6, further comprising:
switches to bypass the bandpass filter via the first radio-frequency path when the transmitter transmits through the first radio-frequency path.

8. The device of claim 7, wherein the bandpass filter includes an on-chip inductor and the antenna matching circuit includes an on-chip inductor.

9. The device of claim 8, wherein the on-chip inductor has a Q factor of less than 100 and the sub-band is 50 MHz wide or wider.

10. The device of claim 1, wherein the frequency band is a television white space frequency band.

11. A method comprising:
selecting a sub-band in a frequency band;
configuring an antenna matching circuit based on the selected sub-band;
configuring a bandpass filter based on the selected sub-band;
receiving a first signal in the selected sub-band through a first radio-frequency path from an antenna, the first radio-frequency path including the antenna matching circuit and not including the bandpass filter;
measuring a parameter of the received first signal;
receiving a second signal in the selected sub-band through a second radio-frequency path from the antenna, the second radio-frequency path including the antenna matching circuit and the bandpass filter;
measuring a parameter of the received second signal;
determining whether the selected sub-band is usable based on the measured parameter of the received first signal; and
determining whether the selected sub-band is usable based on the measured parameter of the received second signal.

12. The method of claim 11, further comprising:
determining that the selected sub-band is usable based on the measured parameter of the received second signal when determined that the sub-band is not usable based on the measured parameter of the received first signal.

13. The method of claim 11, wherein measuring the parameter of the received first signal or measuring the parameter of the received second signal includes measuring a signal-to-noise ratio (SNR) or a received signal strength indicator (RSSI).

14. The method of claim 11, wherein receiving the first signal in the selected sub-band through the first radio-frequency path from the antenna comprises:
configuring switches to bypass the bandpass filter via the first radio-frequency path.

15. The method of claim 11, wherein receiving the second signal in the selected sub-band through the second radio-frequency path from the antenna comprises:
configuring switches to include the bandpass filter in the second radio-frequency path.

16. The method of claim 11, wherein when determined that the selected sub-band is usable, the method further comprises:
transmitting, through the first radio-frequency path.

17. The method of claim 16, further comprising:
configuring switches to bypass the bandpass filter in the radio-frequency path.

18. The method of claim 17, wherein the bandpass filter includes an on-chip inductor and the antenna matching circuit includes an on-chip inductor.

19. The method of claim 18, wherein the sub-band is at least 50 MHz wide and the on-chip inductor has a Q factor of less than 100.

20. The method of claim 10, wherein the frequency band is an unlicensed frequency band.

* * * * *